United States Patent
Sakamoto

(10) Patent No.: US 11,405,982 B2
(45) Date of Patent: Aug. 2, 2022

(54) CONTROL APPARATUS FOR HEATER

(71) Applicant: DENSO CORPORATION, Kariya (JP)

(72) Inventor: Yuki Sakamoto, Kariya (JP)

(73) Assignee: DENSO CORPORATION, Kariya (JP)

(*) Notice: Subject to any disclaimer, the term of this patent is extended or adjusted under 35 U.S.C. 154(b) by 373 days.

(21) Appl. No.: 16/782,341

(22) Filed: Feb. 5, 2020

(65) Prior Publication Data

US 2020/0275527 A1 Aug. 27, 2020

(30) Foreign Application Priority Data

Feb. 26, 2019 (JP) .............................. JP2019-032661

(51) Int. Cl.
*H05B 1/02* (2006.01)
*H02H 7/20* (2006.01)
*H02H 1/00* (2006.01)

(52) U.S. Cl.
CPC ......... *H05B 1/0202* (2013.01); *H02H 1/0007* (2013.01); *H02H 7/20* (2013.01)

(58) Field of Classification Search
CPC .......... H02H 1/0007; H02H 3/08; H02H 3/16; H02H 7/20; H05B 1/0202; H05B 1/0236
USPC ............................................ 219/494; 361/79
See application file for complete search history.

(56) References Cited

U.S. PATENT DOCUMENTS

| | | | |
|---|---|---|---|
| 2002/0000436 A1* | 1/2002 | Hashimoto | G01N 27/122 219/508 |
| 2006/0249532 A1* | 11/2006 | Bourget | G05D 23/1928 222/54 |
| 2015/0068278 A1 | 3/2015 | Yazawa et al. | |
| 2018/0195933 A1* | 7/2018 | Miyagawa | G01N 27/04 |

FOREIGN PATENT DOCUMENTS

| | | | | |
|---|---|---|---|---|
| EP | 1864429 B1 * | 4/2011 | | H04L 12/10 |
| JP | 11-006812 | 1/1999 | | |
| JP | 11006812 A * | 1/1999 | | F02D 41/1494 |

* cited by examiner

*Primary Examiner* — Kevin J Comber
(74) *Attorney, Agent, or Firm* — Nixon & Vanderhye P.C.

(57) ABSTRACT

A control apparatus for a heater is equipped with a high-side wiring line that is connected between the heater and a power supply, a low-side wiring line that is connected between the heater and a grounded portion, a sense wiring line that is connected between the heater and a heater electrode of the heater, and a fault detector for detecting a fault in any one of the wiring lines respectively connected to the heater. The fault detector is configured to identify a mode of a fault that has occurred and a location where the fault has occurred, based on a high-side voltage, a low-side voltage, a sense voltage, a high-side current and a low-side current.

8 Claims, 30 Drawing Sheets

FIG.14

| | NORMAL | FAULT IN HIGH-SIDE WIRING LINE | | | | FAULT IN SENSE WIRING LINE | | | FAULT IN LOW-SIDE WIRING LINE | | | |
|---|---|---|---|---|---|---|---|---|---|---|---|---|
| | | OPEN-CIRCUIT | SHORT-TO-POWER | SHORT-TO-GROUND | | OPEN-CIRCUIT | SHORT-TO-POWER | SHORT-TO-GROUND | OPEN-CIRCUIT | SHORT-TO-POWER | | SHORT-TO-GROUND |
| | | | | WITHOUT PROTECTION | WITH PROTECTION | | | | | WITHOUT PROTECTION | WITH PROTECTION | |
| WHEN HEATER IS OFF | | | | | | | | | | | | |
| HIGH-SIDE VOLTAGE | NORMAL | NORMAL | HI ABNORMAL | NORMAL | NORMAL | NORMAL | HI ABNORMAL | NORMAL | NORMAL | HI ABNORMAL | HI ABNORMAL | NORMAL |
| SENSE VOLTAGE | NORMAL | NORMAL | HI ABNORMAL 1 | NORMAL | NORMAL | NORMAL | HI ABNORMAL 2 | NORMAL | NORMAL | HI ABNORMAL 2 | HI ABNORMAL | NORMAL |
| LOW-SIDE VOLTAGE | NORMAL | NORMAL | NORMAL | NORMAL | NORMAL | NORMAL | NORMAL | NORMAL | NORMAL | NORMAL | NORMAL | NORMAL |
| HIGH-SIDE CURRENT | NORMAL | NORMAL | HI ABNORMAL | NORMAL | NORMAL | NORMAL | HI ABNORMAL | NORMAL | NORMAL | NORMAL | NORMAL | NORMAL |
| LOW-SIDE CURRENT | NORMAL | NORMAL | LO ABNORMAL | NORMAL | NORMAL | NORMAL | LO ABNORMAL | NORMAL | NORMAL | LO ABNORMAL | NORMAL | NORMAL |
| CURRENT DEVIATION | NORMAL | NORMAL | NORMAL | NORMAL | NORMAL | NORMAL | NORMAL | NORMAL | NORMAL | NORMAL | NORMAL | NORMAL |
| WHEN HEATER IS ON | | | | | | | | | | | | |
| HIGH-SIDE VOLTAGE | NORMAL | NORMAL | NORMAL | LO ABNORMAL | LO ABNORMAL | HI ABNORMAL | NORMAL | NORMAL | HI ABNORMAL | NORMAL | NORMAL | NORMAL |
| SENSE VOLTAGE | NORMAL | LO ABNORMAL | NORMAL | LO ABNORMAL | LO ABNORMAL | NORMAL | HI ABNORMAL | NORMAL | HI ABNORMAL | HI ABNORMAL | HI ABNORMAL | NORMAL |
| LOW-SIDE VOLTAGE | NORMAL | NORMAL | NORMAL | NORMAL | LO ABNORMAL | NORMAL | NORMAL | NORMAL | NORMAL | HI ABNORMAL | HI ABNORMAL | NORMAL |
| HIGH-SIDE CURRENT | NORMAL | LO ABNORMAL | NORMAL | LO ABNORMAL | NORMAL | LO ABNORMAL | NORMAL | NORMAL | LO ABNORMAL | LO ABNORMAL | LO ABNORMAL | NORMAL |
| LOW-SIDE CURRENT | NORMAL | LO ABNORMAL | NORMAL | LO ABNORMAL | NORMAL | NORMAL | NORMAL | LO ABNORMAL | LO ABNORMAL | NORMAL | NORMAL | LO ABNORMAL |
| CURRENT DEVIATION | NORMAL | NORMAL | NORMAL | HI ABNORMAL | NORMAL | NORMAL | NORMAL | HI ABNORMAL | NORMAL | NORMAL | NORMAL | HI ABNORMAL |

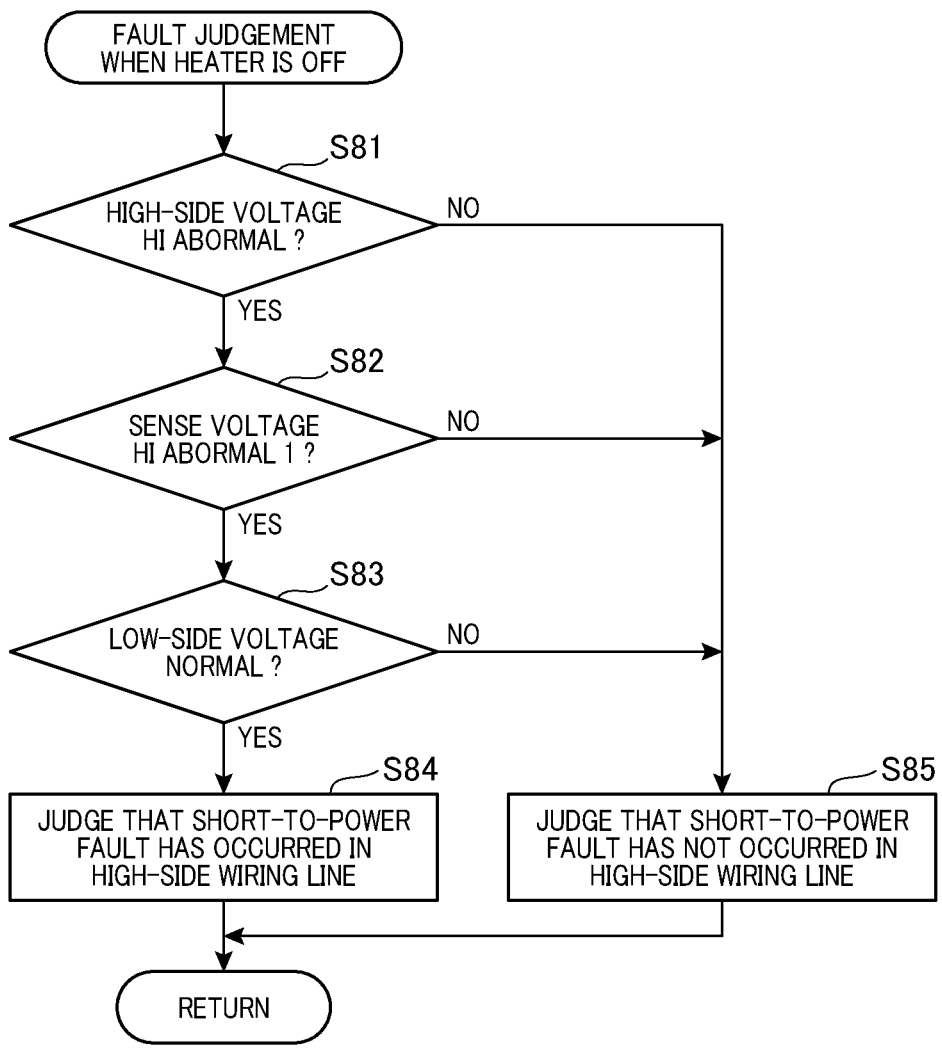

FIG.26

| | | NORMAL | FAULT IN HIGH-SIDE WIRING LINE | | | | FAULT IN SENSE WIRING LINE | | | FAULT IN LOW-SIDE WIRING LINE | | | |
|---|---|---|---|---|---|---|---|---|---|---|---|---|---|
| | | | OPEN-CIRCUIT | SHORT-TO-POWER | SHORT-TO-GROUND | | OPEN-CIRCUIT | SHORT-TO-POWER | SHORT-TO-GROUND | OPEN-CIRCUIT | SHORT-TO-POWER | | SHORT-TO-GROUND |
| | | | | | WITHOUT PROTECTION | WITH PROTECTION | | | | | WITHOUT PROTECTION | WITH PROTECTION | |
| WHEN HEATER IS OFF | HIGH-SIDE VOLTAGE | NORMAL | NORMAL | NORMAL | LO ABNORMAL | LO ABNORMAL | NORMAL | NORMAL | NORMAL | NORMAL | NORMAL | NORMAL | NORMAL |
| | SENSE VOLTAGE | NORMAL | LO ABNORMAL | NORMAL | LO ABNORMAL 1 | LO ABNORMAL 1 | LO ABNORMAL 1 | NORMAL | LO ABNORMAL | NORMAL | NORMAL | NORMAL | LO ABNORMAL 2 |
| | LOW-SIDE VOLTAGE | NORMAL | LO ABNORMAL | NORMAL | LO ABNORMAL | NORMAL | NORMAL | NORMAL | LO ABNORMAL | LO ABNORMAL | NORMAL | NORMAL | HI ABNORMAL |
| | HIGH-SIDE CURRENT | NORMAL | NORMAL | NORMAL | HI ABNORMAL | NORMAL | NORMAL | NORMAL | HI ABNORMAL | NORMAL | NORMAL | NORMAL | NORMAL |
| | LOW-SIDE CURRENT | NORMAL | NORMAL | NORMAL | NORMAL | NORMAL | NORMAL | NORMAL | NORMAL | NORMAL | NORMAL | NORMAL | NORMAL |
| | CURRENT DEVIATION | NORMAL | NORMAL | NORMAL | HI ABNORMAL | NORMAL | NORMAL | NORMAL | HI ABNORMAL | NORMAL | NORMAL | NORMAL | NORMAL |
| WHEN HEATER IS ON | HIGH-SIDE VOLTAGE | NORMAL | NORMAL | NORMAL | LO ABNORMAL | LO ABNORMAL | NORMAL | NORMAL | NORMAL | HI ABNORMAL | NORMAL | NORMAL | NORMAL |
| | SENSE VOLTAGE | NORMAL | LO ABNORMAL | LO ABNORMAL | LO ABNORMAL | LO ABNORMAL | NORMAL | HI ABNORMAL | NORMAL | NORMAL | HI ABNORMAL | HI ABNORMAL | NORMAL |
| | LOW-SIDE VOLTAGE | NORMAL | LO ABNORMAL | NORMAL | NORMAL | NORMAL | NORMAL | LO ABNORMAL | NORMAL | LO ABNORMAL | HI ABNORMAL | LO ABNORMAL | NORMAL |
| | HIGH-SIDE CURRENT | NORMAL | LO ABNORMAL | LO ABNORMAL | NORMAL | NORMAL | LO ABNORMAL | NORMAL | NORMAL | LO ABNORMAL | LO ABNORMAL | LO ABNORMAL | NORMAL |
| | LOW-SIDE CURRENT | NORMAL | LO ABNORMAL | NORMAL | LO ABNORMAL | LO ABNORMAL | NORMAL | NORMAL | NORMAL | NORMAL | NORMAL | NORMAL | NORMAL |
| | CURRENT DEVIATION | NORMAL | NORMAL | NORMAL | HI ABNORMAL | NORMAL | NORMAL | NORMAL | HI ABNORMAL | NORMAL | NORMAL | NORMAL | HI ABNORMAL |

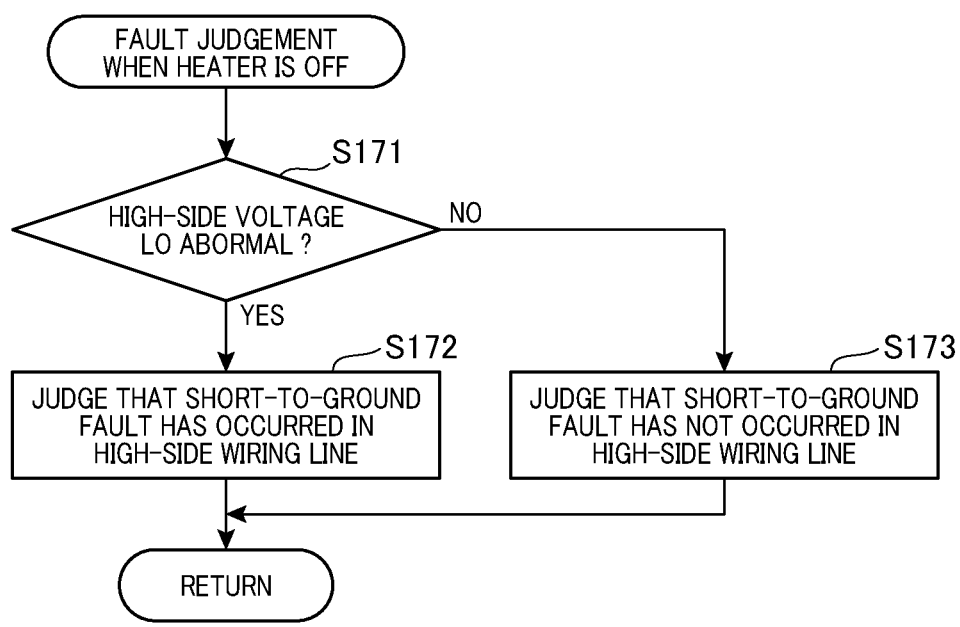

FIG.30

OPEN-CIRCUIT FAULT IN HIGH-SIDE WIRING LINE

WHEN HEATER IS OFF
- HIGH-SIDE VOLTAGE = NORMAL
- SENSE VOLTAGE = LO ABNORMAL 1
- LOW-SIDE VOLTAGE = LO ABNORMAL
- HIGH-SIDE CURRENT = NORMAL

WHEN HEATER IS ON
- HIGH-SIDE VOLTAGE = NORMAL
- SENSE VOLTAGE = LO ABNORMAL
- LOW-SIDE VOLTAGE = LO ABNORMAL

→ R1

SHORT-TO-POWER FAULT IN HIGH-SIDE WIRING LINE

WHEN HEATER IS ON
- SENSE VOLTAGE = NORMAL
- HIGH-SIDE CURRENT = LO ABNORMAL

→ R2

SHORT-TO-GROUND FAULT IN HIGH-SIDE WIRING LINE

WHEN HEATER IS OFF
- HIGH-SIDE VOLTAGE = LO ABNORMAL

WHEN HEATER IS ON
- HIGH-SIDE VOLTAGE = LO ABNORMAL

→ R3

OPEN-CIRCUIT FAULT IN SENSE WIRING LINE

WHEN HEATER IS OFF
- SENSE VOLTAGE = LO ABNORMAL 1
- LOW-SIDE VOLTAGE = NORMAL

WHEN HEATER IS ON
- SENSE VOLTAGE = LO ABNORMAL
- HIGH-SIDE CURRENT = NORMAL
- LOW-SIDE CURRENT = NORMAL

→ R4

SHORT-TO-POWER FAULT IN SENSE WIRING LINE

WHEN HEATER IS ON
- SENSE VOLTAGE = HI ABNORMAL
- LOW-SIDE VOLTAGE = NORMAL
- LOW-SIDE CURRENT = NORMAL

→ R5

SHORT-TO-GROUND FAULT IN SENSE WIRING LINE

WHEN HEATER IS OFF
- HIGH-SIDE VOLTAGE = NORMAL
- SENSE VOLTAGE = LO ABNORMAL 1
- LOW-SIDE VOLTAGE = LO ABNORMAL
- HIGH-SIDE CURRENT = HI ABNORMAL

WHEN HEATER IS ON
- HIGH-SIDE VOLTAGE = NORMAL
- SENSE VOLTAGE = LO ABNORMAL
- HIGH-SIDE CURRENT = NORMAL
- LOW-SIDE CURRENT = LO ABNORMAL

→ R6

OPEN-CIRCUIT FAULT IN LOW-SIDE WIRING LINE

WHEN HEATER IS OFF
- SENSE VOLTAGE = NORMAL
- LOW-SIDE VOLTAGE = LO ABNORMAL

WHEN HEATER IS ON
- SENSE VOLTAGE = HI ABNORMAL
- LOW-SIDE VOLTAGE = NORMAL
- LOW-SIDE CURRENT = LO ABNORMAL

→ R7

SHORT-TO-POWER FAULT IN LOW-SIDE WIRING LINE

WHEN HEATER IS ON
- LOW-SIDE VOLTAGE = HI ABNORMAL

→ R8

SHORT-TO-GROUND FAULT IN LOW-SIDE WIRING LINE

WHEN HEATER IS OFF
- SENSE VOLTAGE ≠ LO ABNORMAL 1
- HIGH-SIDE CURRENT = HI ABNORMAL

WHEN HEATER IS ON
- SENSE VOLTAGE = NORMAL
- LOW-SIDE CURRENT = LO ABNORMAL

→ R9

→ R0

CONTROL APPARATUS FOR HEATER

CROSS-REFERENCE TO RELATED APPLICATION

This application is based on and claims the benefit of priority from earlier Japanese Patent Application No. 2019-32661 filed on Feb. 26, 2019, the description of which is incorporated herein by reference.

BACKGROUND

Technical Field

The present disclosure relates to a control apparatus for a heater.

Related Art

A gas sensor for detecting the concentration of nitrogen oxide, etc., in the exhaust gas of a vehicle, or a Particulate Matter (PM) sensor for detecting the concentration of particulate matter in the exhaust gas, for example, is provided with a heater which heats a part of the sensor. The heater is an electric heater, which generates heat by Joule heating. Hence the heater is connected to a pair of wiring lines, to be supplied with electric power.

If a fault occurs in a part of the wiring line, the heater cannot be operated normally. Modes of fault that can occur in wiring line include a short-to-power fault, which causes the wiring line to be short-circuited to the potential of the power supply, a short-to-ground fault, which causes the wiring line to be short-circuited to ground potential, and an open-circuit fault, in which the wiring line has broken.

BRIEF DESCRIPTION OF THE DRAWINGS

In the accompanying drawings:

FIG. 14 is a diagram showing a relationship between the modes and locations of occurrences of fault in wiring lines and combinations of judgement results obtained by comparing parameters consisting of the high-side voltage, etc., with threshold values;

FIG. 15 is a flow diagram showing a flow of processing executed by the control apparatus;

FIG. 26 is a diagram showing a relationship between the modes and locations of occurrences of fault in a wiring line and combinations of judgement results obtained by comparing parameters consisting of the high-side voltage, etc., with threshold values;

FIG. 29 is a flow diagram showing a flow of processing executed by the control apparatus; and FIG. 30 is a diagram showing a method of identifying the mode and location of a fault, in the form of a logic circuit diagram.

DESCRIPTION OF SPECIFIC EMBODIMENTS

Figure 1:
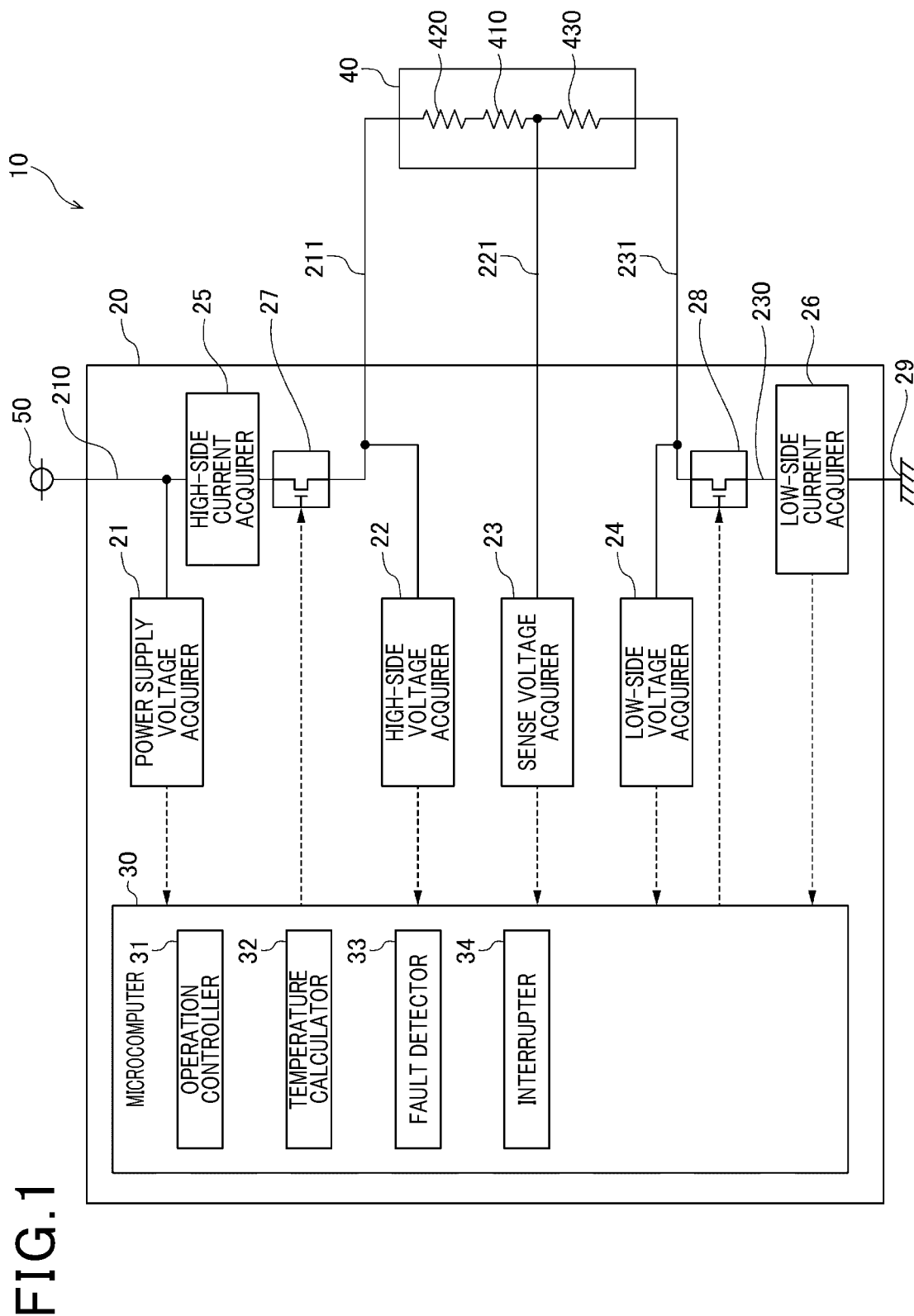
FIG. 1 is a diagram conceptually illustrating a control apparatus according to a first embodiment, and a heater that is the object of control by the control apparatus.

In Japanese Patent No. 214975, a control apparatus for controlling a heater is proposed which has a function of detecting a wiring line fault. The control apparatus measures the value of the output terminal voltage and the value of current flowing through the heater, in a condition in which the heater is energized and in a condition in which the heater is not energized, respectively, and based on a plurality of measurements obtained thereby, the control apparatus detects occurrence of a fault and the mode of the fault.

For example, as the drive circuit is turned on and off, the output terminal voltage changes between a high potential level and a low potential level, and if the current flowing through the heater when the drive circuit is turned on is less than a predetermined lower limit current value, then occurrence of an open-circuit fault is detected. If the output terminal voltage level remains at the high potential level irrespective of whether the drive circuit is on or off, then occurrence of a short-to-power fault is detected. Furthermore, if the output terminal voltage remains at a low potential level irrespective of whether the drive circuit is on or off, then occurrence of a short-to-ground fault is detected.

With this method, occurrence of a fault in a wiring line can be detected, together with detecting whether the mode of the fault is that of an open-circuit fault, a short-to-power fault, or a short-to-ground fault.

However, with the detection method described in Japanese Patent No. 214975, if the current and voltage values are not acquired when the drive circuit is on and when the drive circuit is off, respectively, then the above-describe fault modes cannot be detected. For example, while the drive circuit remains in the on condition, a short-to-power fault cannot be detected.

Furthermore, with the detection method described in Japanese Patent No. 214975, if an open-circuit fault is detected, it is not possible to identify which of the pair of wiring lines connected to the heater has caused that fault. In order to enable quick repair after a fault occurs, it is preferable to be able to identify not only the fault mode but also the location where the fault has occurred.

Hence, the heater control apparatus described in Japanese Patent No. 214975 has room for further improvement in its method of detecting a fault in a wiring line.

In view of the above, it is desired to have a control apparatus that is capable of identifying in detail the mode of a fault that has occurred in a wiring line, and the location where the fault has occurred.

Embodiments will be described in the following referring to the accompanying drawings. In order to facilitate understanding of the description, constituent elements that are the same throughout the drawings will be denoted by the same reference numerals as far as possible, and redundant description will be omitted.

First Embodiment

A first embodiment will be described. A control apparatus 10 according to the present embodiment is configured as a device for controlling a heater 40. Before describing the control apparatus 10 the configuration of the heater 40, which is the control object, will first be described.

The heater 40 is an electric heater for heating a sensor element of a gas sensor provided in a vehicle (not shown), for maintaining the sensor at an appropriate temperature. The gas sensor is provided in the exhaust passage of the vehicle, for measuring the concentration of specific components contained in the exhaust gas discharged from the internal combustion engine, specifically, nitrogen oxides. The gas sensor has a solid electrolyte made of zirconia, for example, and measures the concentration of nitrogen oxide by utilizing the property that oxygen ions can pass through the solid electrolyte. The heater 40 serves to heat a part of the solid electrolyte that functions as a sensor element, to maintain that part at an active temperature, and is built into the gas sensor. Since a known type of configuration for such a gas sensor may be utilized, specific description will be omitted.

A sensor that is provided with the heater 40 may be of a different type from the above gas sensor. For example, the heater 40 may be provided in a PM sensor which detects the concentration of particulate matter contained in the exhaust gas. As is well known, it is necessary to periodically remove particulate matter that has become deposited on the detection part of a PM sensor. The accumulated particulate matter can be burned and removed, through heating the detection part of the PM sensor by the heater 40.

Figure 2:
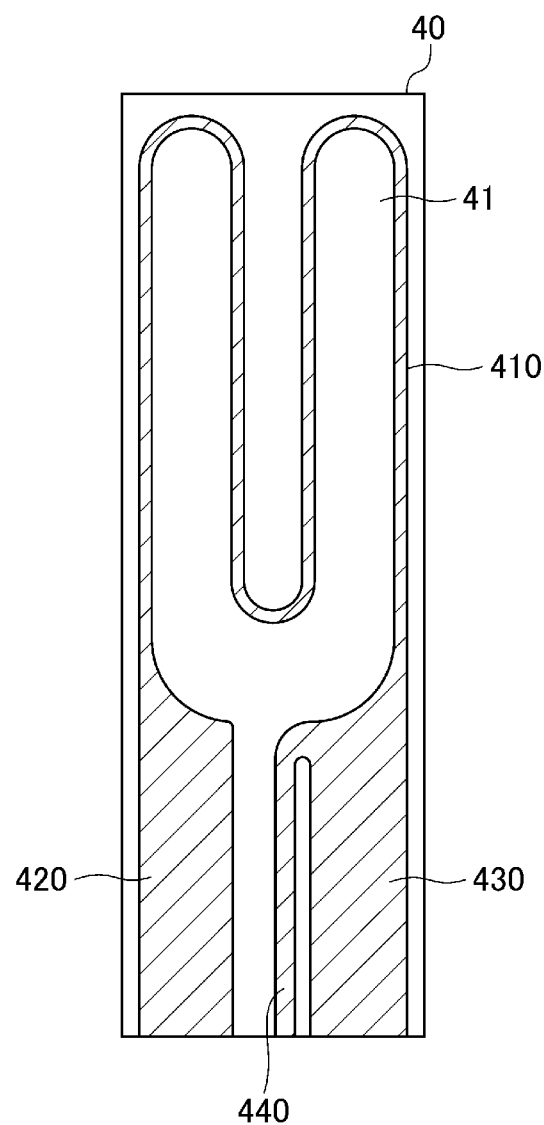
FIG. 2 is a diagram showing the configuration of the heater shown in FIG. 1.

As shown in FIG. 2 the heater 40 has a configuration in which an electrode pattern such as a heating electrode 410 is printed on the surface of a substrate 41. The substrate 41 is a flat plate member formed of alumina. The substrate 41 is disposed at a position adjacent to a solid electrolyte layer, in the gas sensor.

A heating electrode 410, a pair of lead electrodes 420 and 430, and a sense electrode 440 are formed on the substrate 41. These electrodes are formed overall as a single electrode pattern, on one surface of the substrate 41, for example by screen printing. In FIG. 1, the heating electrode 410 and the lead electrodes 420 and 430 are schematically shown as respective resistors, connected in series.

The heating electrode 410 is formed near one end of the substrate 41, with respect to the longitudinal direction. The heating electrode 410 is a portion that generates Joule heat by electric power supplied from the exterior, i.e., which functions as a "heating portion". The heating electrode 410 is formed at a position corresponding to a part of the solid electrolyte of the gas sensor that functions as a sensor element.

The lead electrode 420 is connected to one end of the heating electrode 410 in the electrode pattern. The lead electrode 420 is connected to a high-side wiring line 211 (described hereinafter) and to the heating electrode 410. The lead electrode 430 is a portion that is connected to the other end of the heating electrode 410, in the electrode pattern. The lead electrode 430 is connected to a low-side wiring line 231 described hereinafter and to the heating electrode 410. The shape of the lead electrode 430 is substantially identical to that of the lead electrode 420. Hence, both have equal resistance values.

The width of the electrode pattern in the lead electrodes 420 and 430 is greater than the width of the electrode pattern in the heating electrode 410. For that reason, when the heater 40 is energized, the Joule heat that is generated in the lead electrodes 420 and 430 is less than the Joule heat generated in the heating electrode 410.

The sense electrode 440 is connected between a sense wiring line 221, described hereinafter, and a position in the electrode pattern that is close to the connection between the heating electrode 410 and the lead electrode 430. The width of the electrode pattern in the sense electrode 440 is narrower than the width of the electrode pattern in the lead electrodes 420 and 430. Irrespective of whether or not the heater 40 is energized, almost no current flows through the sense electrode 440. The sense electrode 440 is formed as an electrode pattern for measuring the potential at the connection portion between the heating electrode 410 and the lead electrode 430. If the sense wiring line 221 is defined as a "wiring line connected to the heat generating portion of the heater 40", the sense electrode 440 can be regarded as being part of the sense wiring line 221.

When a voltage is applied between the lead electrode 420 and the lead electrode 430, a current flows through the heat generating electrode 410, which is the heat generating portion, and Joule heat is generated. That is, the sensor element is heated by the heater 40. The control apparatus 10 according to the present embodiment is configured as a device that controls the generation of heat by the heater 40 through adjustment of the power supplied to the heater 40.

The configuration of the control apparatus 10 will be described referring to FIG. 1. The control apparatus 10 includes a main body 20, a high-side wiring line 211, a sense wiring line 221, a low-side wiring line 231, and a microcomputer 30.

The main body 20 is a housing that contains the main components of the control apparatus 10. The microcomputer 30 and a high-side switch 27, etc., described hereinafter, are housed inside the main body 20.

In FIG. 1, reference numeral 50 denotes a power source for supplying electric power to the heater 40. This power source is also referred to as the "power supply 50" in the following. The power supply 50 is a DC voltage source. One end of a wiring line 210 is connected to the power supply 50. The other end of the wiring line 210 is connected to the high-side switch 27. Irrespective of whether the high-side switch 27 is in the open or closed state, the wiring line 210 is maintained at the potential of the power supply 50.

The high-side wiring line 211, together with the wiring line 210 described above, connects the heater 40 to the power supply 50. One end of the high-side wiring line 211 is connected to the lead electrode 420 of the heater 40. The other end of the high-side wiring line 211 is connected to the high-side switch 27. That is, the heater 40 and the power supply 50 are connected via the wiring line 210, the high-side switch 27, and the high-side wiring line 211.

The high-side switch 27 executes switching operations for opening and closing the connection between the wiring line 210 and the high-side wiring line 211, in accordance with a drive signal that is inputted from the exterior. The high-side switch 27 is disposed between the power supply 50 and the high-side wiring line 211.

While the drive signal is on, the high-side switch 27 is closed, that is, is on, and while the drive signal is off, the high-side switch 27 is open, that is, is off. The high-side switch 27 is a semiconductor switch such as a MOS transistor, for example, but it would be equally possible for it to be an intelligent power module or intelligent power device incorporating a protection circuit, or the like. The operation of the high-side switch 27 is controlled by the microcomputer 30.

In FIG. 1, reference numeral 29 designates a grounded part of the control apparatus 10, that is, a portion that is electrically grounded, represented schematically. This portion is also referred to as the "grounded portion 29" in the following. One end of the wiring line 230 is connected to the grounded portion 29. The other end of the wiring line 230 is connected to the low-side switch 28. Irrespective of whether the low-side switch 28 is in the open or closed state, the potential of the wiring line 230 remains at the potential of the grounded portion 29.

The low-side wiring line 231 and the wiring line 230, described above, are connected between the heater 40 and the grounded portion 29. One end of the low-side wiring line 231 is connected to the lead electrode 430 of the heater 40. The other end of the low-side wiring line 231 is connected to the low-side switch 28. That is, the heater 40 and the grounded portion 29 are connected via the wiring line 230, the low-side switch 28, and the low-side wiring line 231. The low-side wiring line 231 and the high-side wiring line 211, described above, constitute a pair of wiring lines for supplying power to the heater 40.

The low-side switch 28 executes changeover between opening and closing of the connection between the wiring line 230 and the low-side wiring line 231, in accordance with an externally inputted drive signal. The low-side switch 28 is disposed between the low-side wiring line 231 and the grounded portion 29.

When the drive signal is on, the low-side switch 28 is closed, that is, on, and when the drive signal is off, the low-side switch 28 is open, that is, off. The low-side switch 28 is a semiconductor switch such as a MOS transistor, for example, but it would be equally possible for it to be an intelligent power module or intelligent power device incorporating a protection circuit, or the like. The operation of the low-side switch 28 is controlled by the microcomputer 30.

The sense wiring line 221 is connected to the heat generating portion of the heater 40, that is, to the heat generating electrode 410. One end of the sense wiring line 221 is connected to the sense electrode 440 of the heater 40. The other end of the sense wiring line 221 is connected to a sense voltage acquirer 23, described hereinafter. The sense wiring line 221 is used, in conjunction with the above-described sense electrode 440, as a wiring line for measuring the voltage at the point of connection between the heating electrode 410 and the lead electrode 430.

Inside the main body 20, a power supply voltage acquirer 21, a high-side voltage acquirer 22, a sense voltage acquirer 23, a low-side voltage acquirer 24, a high-side current acquirer 25, and a low-side current acquirer 26 are provided, as measurement circuits for measuring and acquiring the currents and voltages of respective parts.

The power supply voltage acquirer 21 is a measurement circuit for acquiring the voltage of the wiring line 210, that is, the potential difference between the wiring line 210 and the grounded portion 29. That voltage can be referred to as the voltage generated by the power supply 50. The power supply voltage acquirer 21 inputs a signal corresponding to the voltage of the wiring line 210 to the microcomputer 30. The microcomputer 30 acquires the voltage of the wiring line 210 by performing A/D conversion of the signal that is inputted from the power supply voltage acquirer 21.

The high-side voltage acquirer 22 is a measurement circuit for acquiring the voltage of the high-side wiring line 211, that is, the potential difference between the high-side wiring line 211 and the grounded portion 29. The high-side voltage acquirer 22 inputs a signal corresponding to the voltage of the high-side wiring line 211 to the microcomputer 30. The microcomputer 30 acquires the voltage of the high-side wiring line 211 by performing A/D conversion of the signal that is inputted from the high-side voltage acquirer 22. Hereinafter, this voltage is also referred to as the "high-side voltage".

The sense voltage acquirer 23 is a measurement circuit for acquiring the voltage of the sense wiring line 221, that is, the potential difference between the sense wiring line 221 and the grounded portion 29. The sense voltage acquirer 23 inputs a signal corresponding to the voltage of the sense wiring line 221 to the microcomputer 30. The microcomputer 30 acquires the voltage of the sense wiring line 221 by performing A/D conversion of the signal that is inputted from the sense voltage acquirer 23. Hereinafter, this voltage is also referred to as the "sense voltage". It can also be considered that the sense voltage acquired by the sense voltage acquirer 23 is the potential difference between the grounded portion 29 and the point of connection between the heating electrode 410 and the lead electrode 430.

The low-side voltage acquirer 24 is a measurement circuit for acquiring the voltage of the low-side wiring line 231, that is, the potential difference between the low-side wiring line 231 and the grounded portion 29. The low-side voltage acquirer 24 inputs a signal corresponding to the voltage of the low-side wiring line 231 to the microcomputer 30. The microcomputer 30 acquires the voltage of the low-side wiring line 231 by performing AD conversion of the signal that is inputted from the low-side voltage acquirer 24. Hereinafter, this voltage is also referred to as the "low-side voltage".

The high-side current acquirer 25 acquires the current flowing from the power supply 50 to the high-side wiring line 211. The high-side current acquirer 25 inputs a signal corresponding to the current to the microcomputer 30. The microcomputer 30 acquires the value of the current flowing from the power supply 50 to the high-side wiring line 211 by performing A/D conversion of the signal that is inputted from the high-side current acquirer 25. Hereinafter, this current is also referred to as the "high-side current".

The low-side current acquirer 26 acquires the current flowing from the low-side wiring line 231 to the grounded portion 29. The low-side current acquirer 26 inputs a signal corresponding to that current to the microcomputer 30. The microcomputer 30 acquires the value of the current that flows from the low-side wiring line 231 to the grounded portion by performing A/D conversion of the signal that is inputted from the low-side current acquirer 26. Hereinafter, that current is also referred to as the "low-side current".

The microcomputer 30 executes overall control of the entire operation of the control apparatus 10. The microcomputer 30 is configured as a computer system that includes a central processing unit (CPU), a read-only memory (ROM), a random-access memory (RAM), an A/D converter circuit, a D/A converter circuit, etc. The microcomputer 30 includes an operation controller 31, a temperature calculator 32, a fault detector 33 and an interrupter 34, as functional control blocks.

The operation controller 31 transmits drive signals to each of the high-side switch 27 and the low-side switch 28, for controlling the operations of these. The electric power supplied to the heater 40 is adjusted by the operation controller 31, to thereby adjust the amount of heat generated by the heater 40. Specific contents of processing performed by the operation controller 31 are described hereinafter.

The temperature calculator 32 calculates the temperature of the sensor element of the sensor that is provided for the heater 40. The temperature of the sensor element is approximately equal to the temperature of the heat generating portion of the heater 40. For that reason, the temperature calculator 32 of this embodiment is configured such that the temperature of the heat generating part of the heater 40 is calculated, and the calculated value is used as the temperature of the sensor element.

Figure 3:
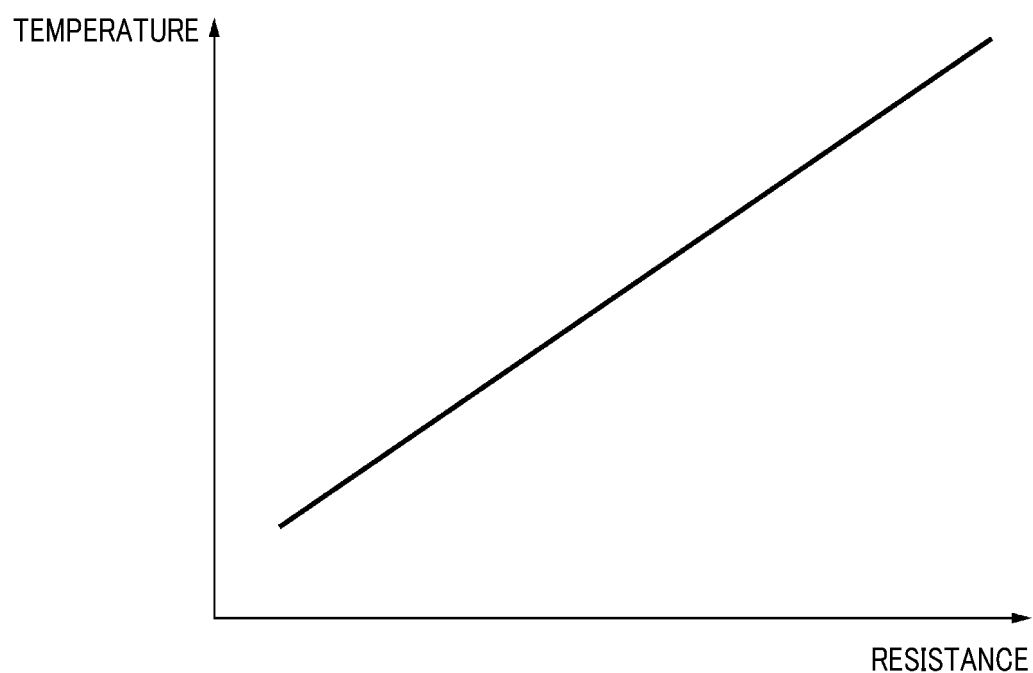
FIG. 3 is a diagram showing the relationship between the resistance of the heater and temperature.

As shown in FIG. 3, the resistance value of the heater 40 increases in accordance with increase in temperature of the heat generating portion of the heater 40. That correspondence between temperature and the resistance value is stored beforehand in the microcomputer 30, as a map.

The temperature calculator 32 calculates the temperature of the heat generating part of the heater 40 by applying the resistance value of the heat generating part of the heater 40 in referring to the map.

The value of resistance between the high-side wiring line 211 and the low-side wiring line 231 may be used directly as the resistance value of the heat generating part of the heater 40, however in that case the resistance values of the lead electrodes 420 and 430, which are at a relatively low temperature, are included as errors, thus making it difficult to accurately calculate the temperature of the heat generating portion of the heater 40.

Hence with this embodiment, after calculating the resistance value of the heat generating electrode 410, the temperature of the heat generating portion is calculated based on that resistance value. The resistance value of the heating electrode 410 is calculated based on the acquired values of the high-side voltage, the low-side voltage, the sense voltage, and the high-side current. The influence of the resistance values of the lead electrodes 420 and 430 can thereby be eliminated, and the temperature of the heater 40 can be calculated with a high degree of accuracy.

The fault detector 33 executes fault detection processing for each of the wiring lines connected to the heater 40. Here, "each of the wiring lines connected to the heater 40" refers to the high-side wiring line 211, the sense wiring line 221 and the low-side wiring line 231 of this embodiment. The fault modes that are detected by the fault detector 33, and the detection methods thereof, are described hereinafter.

The interrupter 34 is a part that executes processing for blocking the supply of power to the heater 40 when a fault is detected by the fault detector 33. The interrupter 34 interrupts the supply of power to the heater 40, by opening at least one of the high-side switch 27 and the low-side switch 28. Specific contents of the processing performed by the interrupter 34 are described hereinafter.

An overview of processing performed by the control apparatus 10 will be described. FIG. 4(A) shows an example of time-axis variation of the drive signal transmitted from the operation controller 31 to the high-side switch 27. FIG. 4(B) shows an example of time-axis variation of the drive signal transmitted from the operation controller 31 to the low-side switch 28. FIG. 4(C) shows an example of time-axis variation of the high-side voltage, FIG. 4(D) shows an example of time-axis variation of the sense voltage, and FIG. 4(E) shows an example of time-axis variation of the low-side voltage. FIG. 4(F) shows an example of time-axis variation of the high-side current, and FIG. 4(G) shows an example of time-axis variation of the low-side current.

Figure 4:
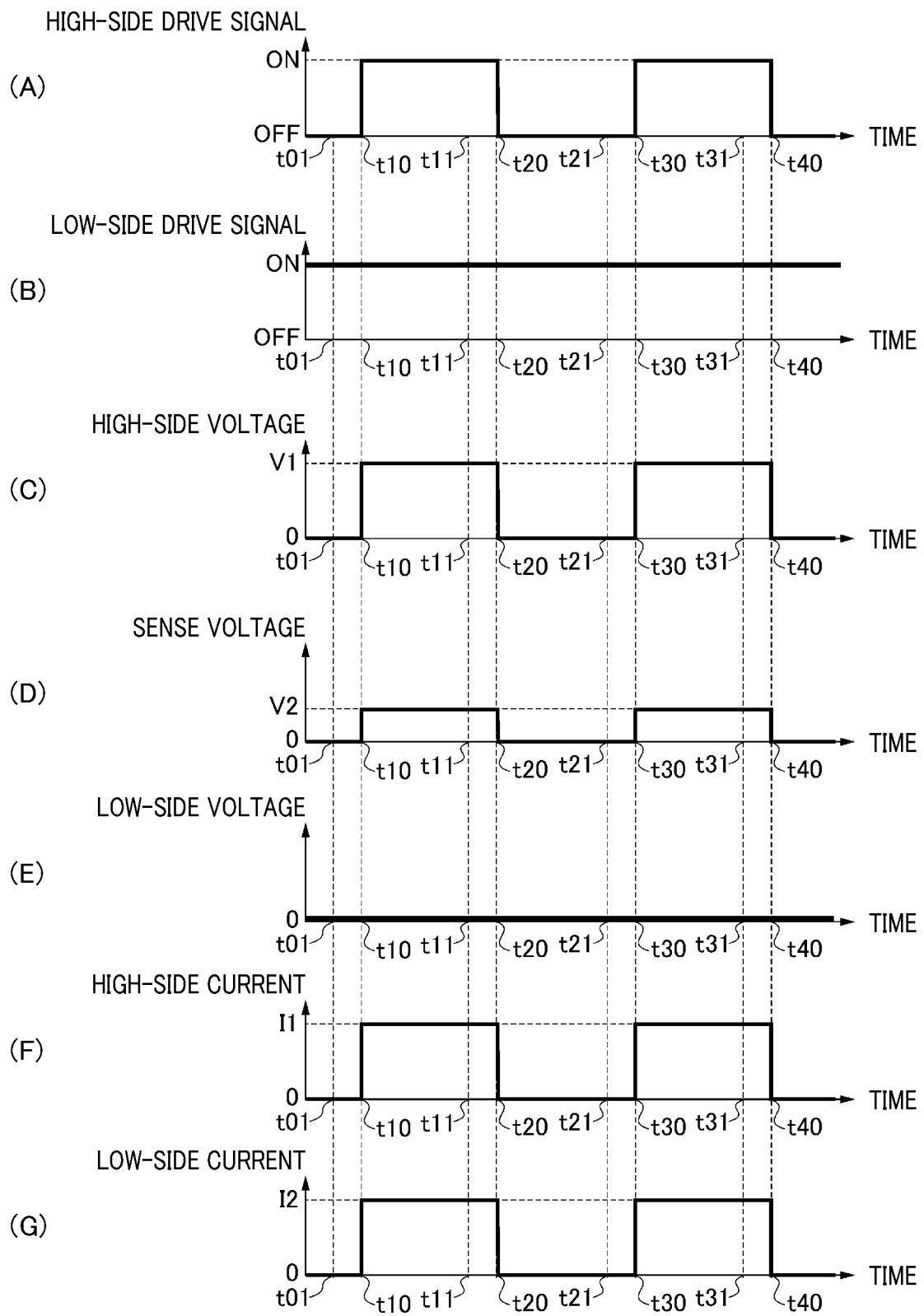
FIG. 4 is a timing diagram showing an example of time-axis relationships of high-side voltage, etc., in the first embodiment.

The control apparatus 10 according to the present embodiment is configured as what is referred to as a "high-side drive type" control apparatus, which causes the high-side switch 27 to perform switching operations while maintaining the low-side switch 28 turned on. For that reason, with the present embodiment, the heater 40 is turned on when the high-side switch 27 is on, and is turned off when the high-side switch 27 is off. In the example of FIG. 4, the drive signal to the high-side switch 27 is turned on during the period from time t10 to time t20 and the period from time t30 to time t40, while at other times, the high-side switch 27 is turned off. On the other hand, the drive signal to the low-side switch 28 remains always turned on.

As shown in FIG. 4(C), during the periods when the high-side switch 27 is on, the high-side voltage is V1. During the period when the high-side switch 27 is off, the high-side voltage is zero. V1 is approximately equal to the voltage supplied from the power supply 50.

As shown in FIG. 4(D), the sense voltage is V2 during the periods when the high-side switch 27 is on. The sense voltage is zero during the periods when the high-side switch 27 is off. The voltage V2 is lower than V1 described above. The difference between V2 and V1 corresponds to the voltage drop in the heating electrode 410 and the lead electrode 420.

As shown in FIG. 4(E), the low-side voltage is always zero, that is, the same voltage as that of the grounded portion 29, irrespective of the state of the high-side switch 27.

As shown in FIG. 4(F), the high-side current is I1 during the periods when the high-side switch 27 is on. During the periods when the high-side switch 27 is off, the high-side current is zero.

As shown in FIG. 4(G), the low-side current is I2 during the periods when the high-side switch 27 is on. During the periods when the high-side switch 27 is off, the low-side current is zero. If no wiring line fault has occurred and the heater 40 is operating normally, I1 and I2 are equal to one other.

It should be noted that the acquisition of the high-side voltage by the high-side voltage acquirer 22 is not performed continuously, but is performed repetitively at specific timings. With the present embodiment, acquisition of the high-side voltage, etc., is performed once in each of the periods in which the high-side switch 27 is on and once in each of the periods in which the high-side switch 27 is off, respectively.

In FIG. 4, the timings at which the values of the high-side voltage, the sense voltage, the low-side voltage, the high-side current, and the low-side current are acquired in periods when the high-side switch 27 is on are shown as the time points t11 and t31. Both of these are set as time points at which a predetermined period has elapsed since the high-side switch 27 was turned on.

Furthermore in FIG. 4, the timings at which the values of the high-side voltage, the sense voltage, the low-side voltage, the high-side current, and the low-side current are acquired in periods when the high-side switch 27 is off are shown as the time points t01 and t21. Both of these are set as times at which a predetermined period has elapsed since the high-side switch 27 was turned off.

The time points for acquiring the current and voltage values may be changed as appropriate. For example, if the periods during which the high-side switch 27 is on are relatively long, the high-side voltage, etc., may be acquired a plurality of times during each of these periods.

In the example of FIG. 4, the periods during which the high-side switch 27 is on are approximately equal to the periods during which the high-side switch 27 is off. That is, the duty cycle of the drive signal is 50%. The operation controller 31 adjusts the amount of heat generated by the heater 40 by appropriately varying the duty cycle of the drive signal, to bring the temperature of the heat generation section of the heater 40 into coincidence with a predetermined target temperature.

Figure 5:
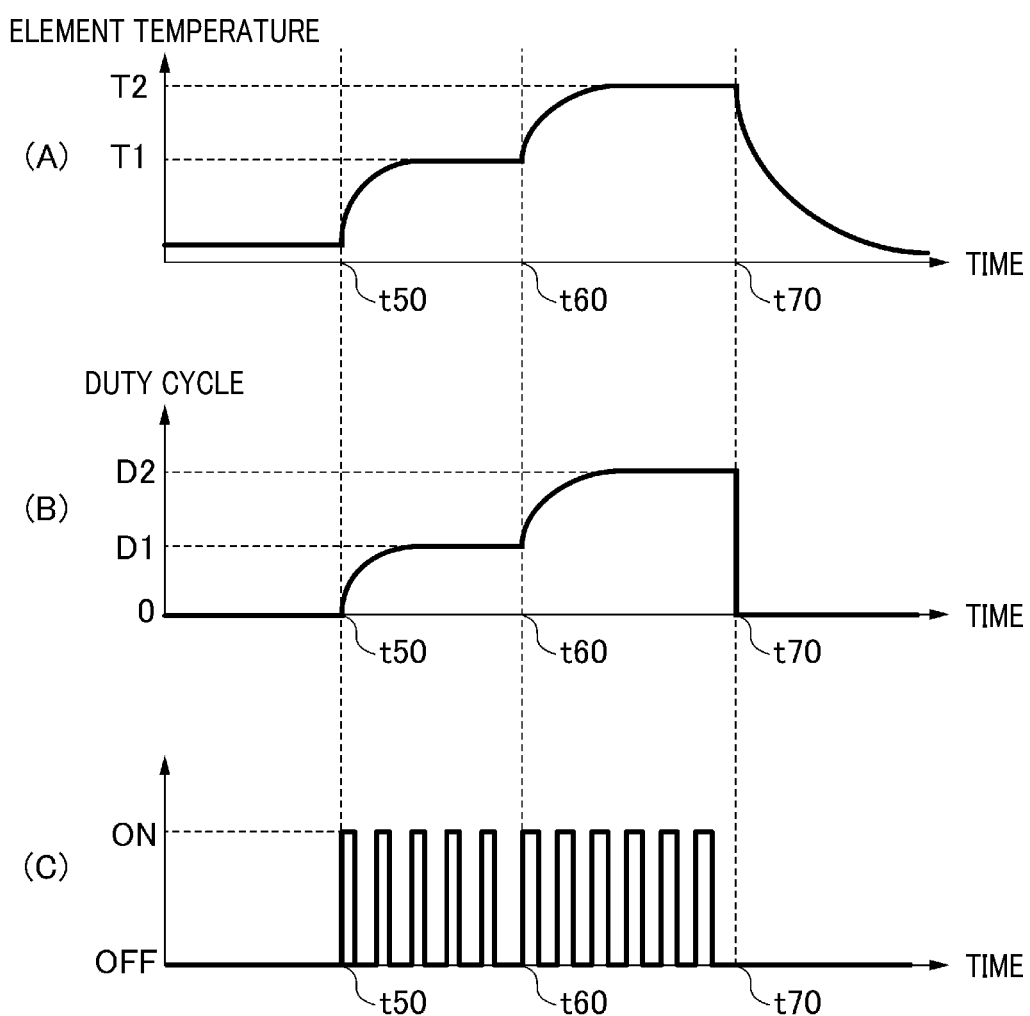
FIG. 5 is a timing diagram showing an example of time-axis relationships of sensor element temperature, etc.

An example of control performed by the operation controller 31 will be described referring to FIG. 5. FIG. 5(A) shows an example of time-axis variation of the temperature of the gas sensor element. As described above, the temperature is approximately equal to the temperature of the heat generating portion of the heater 40, i.e., to the temperature of the heat generating electrode 410.

FIG. 5(B) shows an example of time-axis variation of the duty cycle of the drive signal that is inputted to the high-side switch 27. FIG. 5(C) shows an example of time-axis variation of the drive signal that is inputted to the high-side switch 27.

In the period extending up to time point t50, the internal combustion engine of the vehicle is halted, and the sensor element is not being heated by the heater 40. When the ignition switch of the vehicle is turned on and the internal combustion engine is started, at time point t50, heating of the sensor element by the heater 40 commences.

In the period from time point t50 to time point t60, preliminary heating of the sensor element is performed, in order to prevent the sensor element from being damaged by incident moisture and from being contaminated by contaminants contained in the moisture. During this period, the duty cycle of the drive signal is adjusted such that the temperature of the element coincides with T1, which is a predetermined target temperature. In the example of FIG. 5, the duty cycle during this period is D1.

The period from time point t60 to time point t70 is a period in which the temperature of the sensor element is made to coincide with the final target temperature, and in which measurement is performed by means of the sensor element. During this period, the duty cycle of the drive signal is adjusted such that the temperature of the sensor element matches a final target temperature T2. In the example of FIG. 5, the duty cycle in this period is D2, which is greater than D1. T2 is a temperature which is higher than T1, and is set at an activation temperature, whereby the solid electrolyte of the sensor element becomes active, or at a higher temperature.

Following time point t70, the drive signal that is inputted to the high-side switch 27 is turned off, and heating by the heater 40 is halted. In this example, measurement of the nitrogen oxide concentration by the gas sensor is performed only during the period from time points t60 to t70. In the periods when measurement of the nitrogen oxide concentration is unnecessary, heating by the heater 40 is halted.

Furthermore, if the sensor that is provided with the heater 40 is a PM sensor, similar control to that described above can be performed. For example, T1 in FIG. 5(A) can be set as a temperature for removing moisture in a part of the sensor where particulate matter becomes deposited. Moreover, T2 in FIG. 5(A) can be set as a temperature for removal of deposited particulate matter by incineration. In that case, the concentration of particulate matter is detected during the period following time t70, when heating by the heater 40 has ended.

Figure 6:
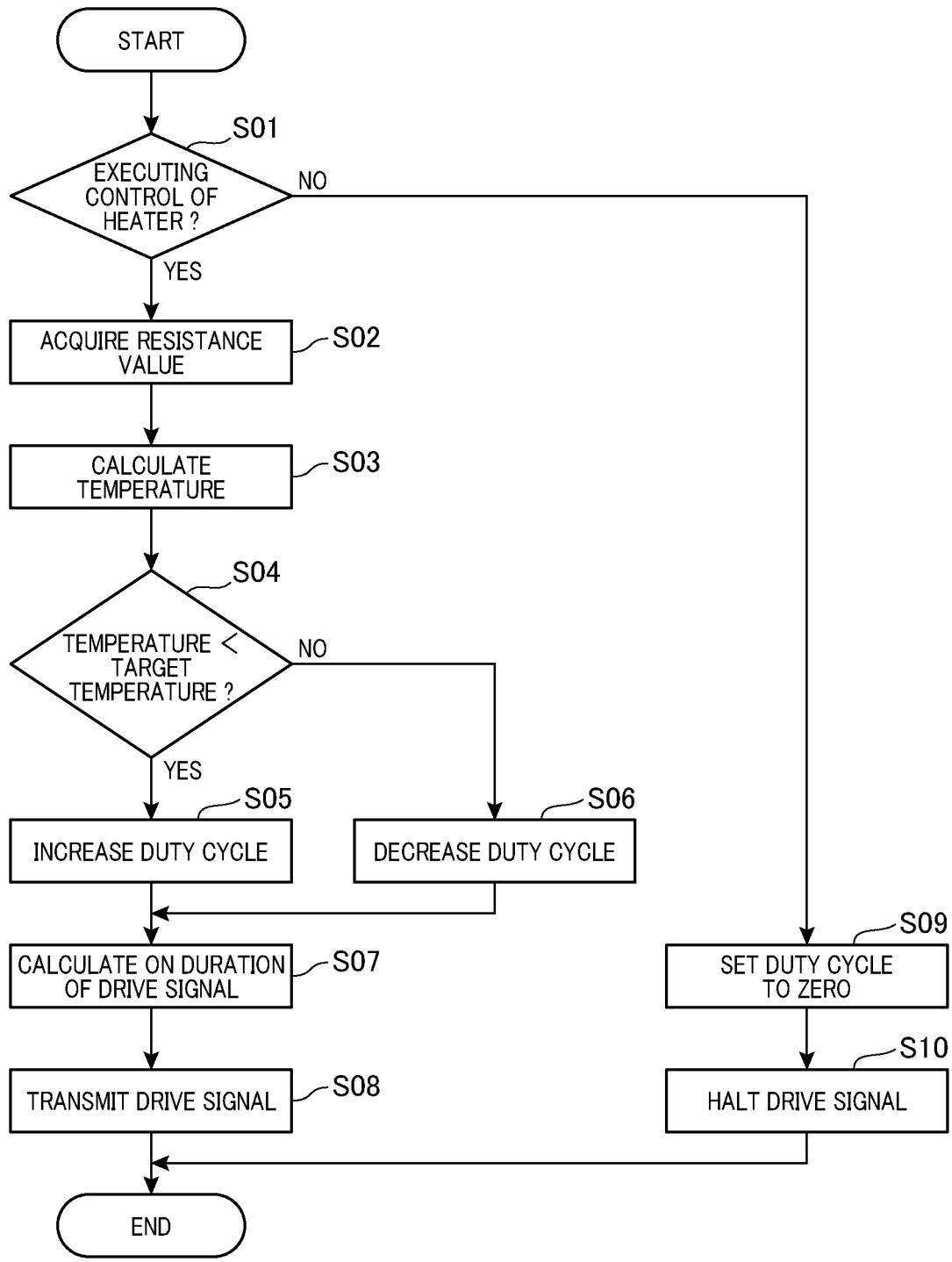
FIG. 6 is a flow diagram showing a flow of processing executed by the control apparatus.

The flow of processing executed by the microcomputer 30 for implementing control as described above will be described referring to FIG. 6. The processing sequence shown in FIG. 6 is repeated by the microcomputer 30 each time a predetermined control cycle elapses.

In the first step S01 of the processing sequence, a decision is made as to whether the heater 40 is to be controlled. Here, if the ignition switch of the vehicle is on, then it is determined that the heater 40 is in a controlled condition, i.e., is in a condition for generating heat, and operation proceeds to step S02. If the ignition switch is off, it is determined that the system is not in a condition where heating is required, and operation proceeds to step S09.

In step S02, processing for acquiring the resistance value of the heating electrode 410 is performed. Firstly, the resistance value between the high-side wiring line 211 and the low-side wiring line 231 is calculated, based on the values of the high-side voltage, the low-side voltage, and the high-side current. That resistance value corresponds to the "total resistance" of the heater 40.

The resistance value of the lead electrode 430 is then calculated, based on the values of the sense voltage, the low-side voltage, and the high-side current. The value calculated here can be considered to also be the resistance value of the lead electrode 420.

The resistance value of the heating electrode 410 is then calculated, by subtracting the resistance value of the lead electrode 420 and the resistance value of the lead electrode 430 from the above total resistance.

In step S03 following step S02, processing for calculating the temperature of the heat generating electrode 410, which is the heat generating part, is performed. As described above, the temperature of the heating electrode 410 is calculated by using the resistance value acquired in step S02 in referring to the correspondence map shown in FIG. 3. The processing of steps S02 and S03 is performed by the temperature calculator 32.

In step S04 following step S03, a decision is made as to whether the temperature of the heating electrode 410 is lower than the currently set target temperature. If the temperature of the heating electrode 410 is lower than the target temperature, operation proceeds to step S05. In step S05, processing is executed for increasing the duty cycle of the drive signal that is inputted to the high-side switch 27, from its current value.

If it is determined in step S04 that the temperature of the heating electrode 410 is equal to or higher than the target temperature, operation proceeds to step S06. In step S06, processing is executed for lowering the duty cycle of the drive signal that is inputted to the high-side switch 27, from its current value.

In step S07 following steps S05 and S06, the length of time for which the heater 40 is to be energized is set in accordance with the above duty cycle. In step S08 following step S07, transmission of the drive signal to the high-side switch 27 is started. Supplying of electric power to the heater 40 for the time that has been set in step S07 is thereby repetitively performed. That is, energization of the heater 40 is performed in accordance with the duty cycle that has been set in step S05. As a result, the temperature of the heating electrode 410 is brought close to the target temperature.

If operation proceeds from step S01 to step S09, then the duty cycle of the drive signal that is inputted to the high-side switch 27 is set to zero. That is, the length of time for which the heater 40 is to be energized is set to zero.

In step S10, following step S09, transmission of the drive signal to the high-side switch 27 is halted. At this time, if transmission of the drive signal has already been halted, that state is maintained.

Figure 7:
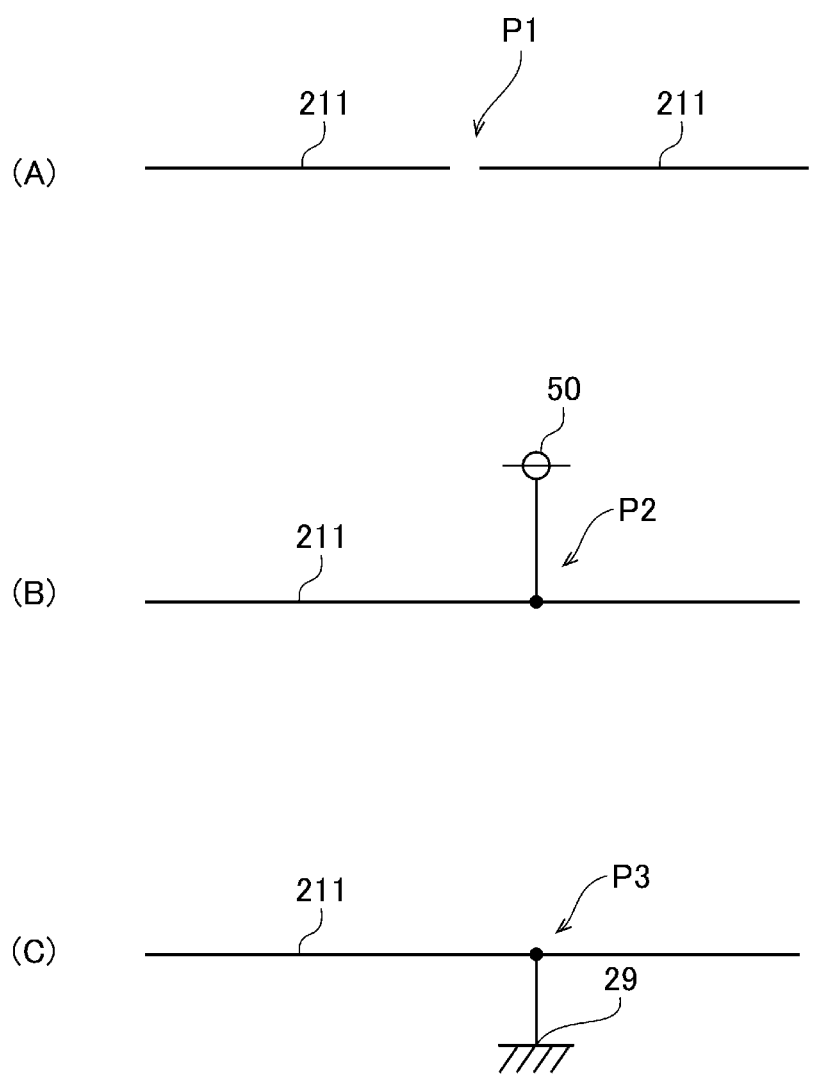
FIG. 7 is a diagram for describing modes of fault that can occur in a wiring line.

It should be noted that a fault such as an open-circuit fault may occur in the three wiring lines connected to the heater 40, that is, the high-side wiring line 211, the sense wiring line 221 and the low-side wiring line 231. The types of faults that can occur in these wiring lines will be described referring to FIG. 7.

FIG. 7(A) shows an example in which an open-circuit fault has occurred in the high-side wiring line 211. In this example, the high-side wiring line 211 is damaged and has broken at a location indicated as P1. In such a condition, power cannot be supplied to the heater 40. A fault that causes a wiring line to break is also referred to as a "open-circuit fault" in the following. An open-circuit fault may occur not only in the high-side wiring line 211 but also in the sense wiring line 221 and in the low-side wiring line 231.

FIG. 7(B) shows an example where a power supply fault has occurred in the high-side wiring line 211. In this example, the high-side wiring line 211 and the power supply 50 are short-circuited at a location indicated as P2. In such a condition, the potential of the high-side wiring line 211 is always the same as that of the power supply 50, irrespective of the state of the high-side switch 27, so that the supplying of power to the heater 40 cannot be performed properly. A fault in which a wiring line is short-circuited to the potential of the power supply 50 is hereinafter also referred to as a "short-to-power fault". A short-to-power fault can occur not only in the high-side wiring line 211 but also in the sense wiring line 221 and the low-side wiring line 231.

FIG. 7(C) shows an example in which a short-circuit to ground has occurred in the high-side wiring line 211. In this example, the high-side wiring line 211 and the grounded portion 29 are short-circuited at a location indicated as P3. In such a condition, the potential of the high-side wiring line 211 is held identical to that of the grounded portion 29, irrespective of the state of the high-side switch 27, so that power cannot be appropriately supplied to the heater 40. A fault in which a wiring line is short-circuited to the potential of the grounded portion 29 is hereinafter also referred to as a "short-to-ground fault". A short-to-ground fault can occur not only in the high-side wiring line 211 but also in the sense wiring line 221 and the low-side wiring line 231.

When any of the faults described above occurs in a high-side wiring line 211, etc. the fault detector 33 provided in the microcomputer 30 identifies the mode and location of the fault. With the present embodiment, identifying the "fault mode" signifies identifying which one of a short-to-power fault, a short-to-ground fault and an open-circuit fault has occurred. In addition, with the present embodiment, identifying the "fault location" signifies identifying the one of the high-side wiring line 211, the sense wiring line 221 and the low-side wiring line 231 in which the fault has occurred.

In that way, the wiring line fault modes that can be identified by the fault detector 33 include a short-to-power fault, which is a condition whereby a wiring line has become short-circuited to the potential of the power supply 50, a short-to-ground fault, which is a condition whereby a wiring line has become short-circuited to the potential of the grounded portion 29, and an open-circuit fault, which is a condition whereby a wiring line has broken.

If a short-to-ground fault has occurred in the high-side wiring line 211 and the high-side switch 27 is on, an overcurrent will flow through that switch. Hence the high-side switch 27 may be provided with a protection circuit or the like, as described above. An example in which the high-side switch 27 is provided with a protection circuit will be described referring to FIG. 8.

Figure 8:
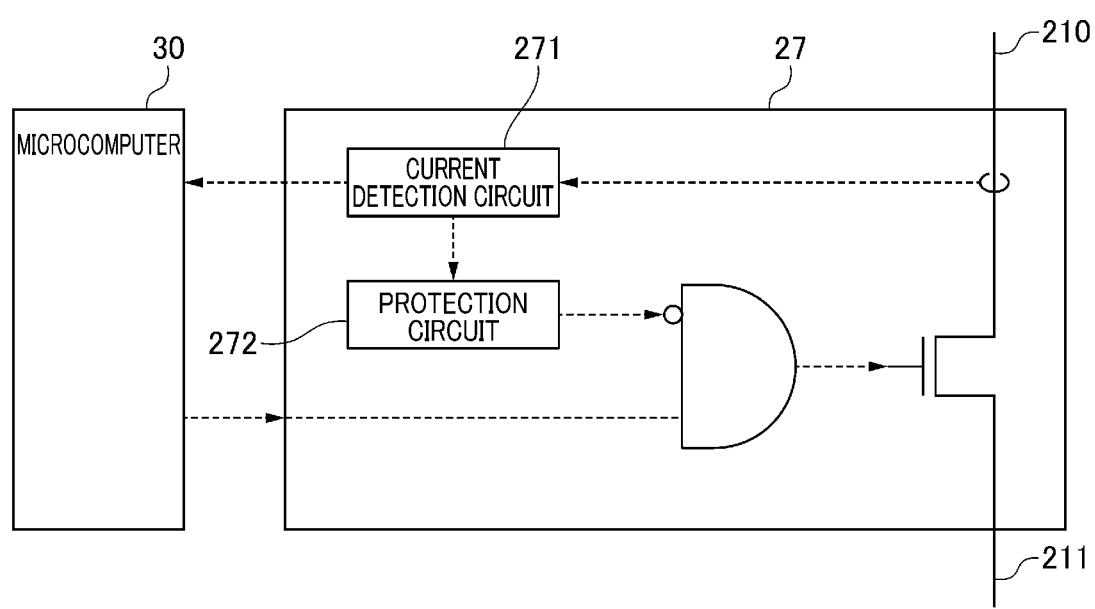
FIG. 8 is a diagram for describing a case in which a high-side switch has a protection circuit.

In the example of FIG. 8, the high-side switch 27 is configured as an intelligent power module that includes a current detection circuit 271 and a protection circuit 272.

The current detection circuit 271 serves to detect the value of current supplied from the wiring line 210. The value of current detected by the current detection circuit 271 is inputted to the microcomputer 30 and the protection circuit 272.

The protection circuit 272 serves to switch off the high-side switch 27 when the value of the current detected by the current detection circuit 271 exceeds a predetermined upper limit value. The above upper limit value is set beforehand, as a value that is higher than the current which is supplied to the heater 40 when functioning in a normal condition. If a short-to-ground fault has occurred in the high-side wiring line 211 and the high-side switch 27 is switched on, an overcurrent flows through the wiring line 210. Since the value of current detected by the current detection circuit 271 at this time exceeds the upper limit value, the high-side switch 27 is immediately turned off by the protection circuit 272. This prevents an overcurrent from continuing to flow through the high-side switch 27.

It should be noted that the current detection circuit 271 may be provided integrally with the protection circuit 272. Furthermore, it would be equally possible for the value of current detected by the current detection circuit 271 not to be transmitted to the microcomputer 30.

Figure 9:
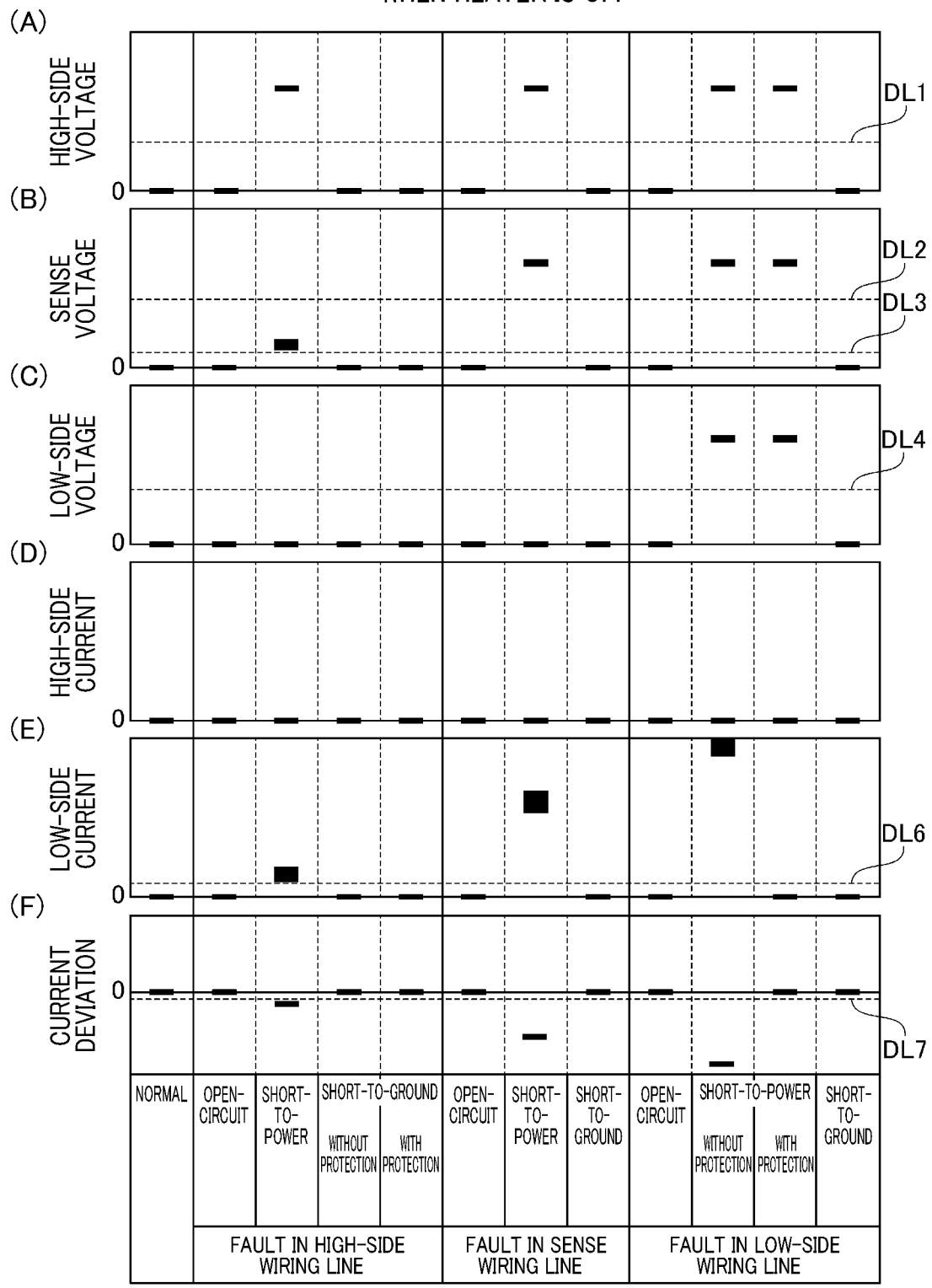
FIG. 9 is a diagram showing a table of values taken by a high-side voltage, etc., for the cases in which respective modes of fault occur in a wiring line.

A fault detection method that is implemented by the fault detector 33 will next be described. FIG. 9 shows respective ranges of values that the high-side voltage, etc., can take when the high-side switch 27 is off, that is, when the heater 40 is not energized.

FIG. 9(A) shows the ranges of values that the high-side voltage can take. The leftmost part of the diagram shows the range of high-side voltage values that can be measured during normal operation, that is, when no fault has occurred in any of the wiring lines.

The second part from the left in FIG. 9(A) shows the range of high-side voltage values that can be measured when an open-circuit fault has occurred in the high-side wiring line 211. The third part from the left in FIG. 9(A) shows the range of high-side voltage values that can be measured when a short-to-power fault has occurred in the high-side wiring line 211.

The fourth and fifth parts from the left in FIG. 9(A) indicate respective ranges of values of the high-side voltage that can be measured when a short-to-ground fault has occurred in the high-side wiring line 211. Of these, the fourth part from the left shows the range of values of the high-side voltage when the high-side switch 27 and the low-side switch 28 are not provided with protection circuits 272, while the fifth part from the left shows the range of values of the high-side voltage when the high-side switch 27 and the low-side switch 28 are provided with protection circuits 272.

The sixth part from the left in FIG. 9(A) shows the range of high-side voltage values that can be measured when an open-circuit fault occurs in the sense wiring line 221. The seventh part from the left in FIG. 9(A) shows the range of high-side voltage values that can be measured when a short-to-power fault has occurred in the sense wiring line 221. The eighth part from the left in FIG. 9(A) shows the range of high-side voltage values that can be measured when a short-to-ground fault has occurred in the sense wiring line 221.

The ninth part from the left in FIG. 9(A) shows the range of high-side voltage values that can be measured when an open-circuit fault occurs in the low-side wiring line 231.

The tenth and eleventh parts from the left in FIG. 9(A) show respective ranges of high-side voltage values that can be measured when a short-to-power fault has occurred in the low-side wiring line 231. Of these, the tenth part from the left shows the range of high-side voltage values when the high-side switch 27 and the low-side switch 28 are not provided with protection circuits 272, while the eleventh part from the left shows the range of high-side voltage values when the high-side switch 27 and the low-side switch 28 are provided with protection circuits 272.

The twelfth part from the left in FIG. 9(A) shows the range of high-side voltage values that can be measured when a short-to-ground fault has occurred in the low-side wiring line 231.

In FIG. 9(B), the ranges of values that can be taken by the sense voltage in each case are shown in the same manner as for FIG. 9(A) described above. Similarly, FIG. 9(C) shows the ranges of values that can be taken by the low-side voltage, and FIG. 9(D) shows the ranges of values that can be taken by the high-side current. FIG. 9(E) shows the ranges of values that can be taken by the low-side current, and FIG. 9(F) shows the ranges of values that can be taken by the current deviation. The "current deviation" is a value obtained by subtracting the low-side current value from the high-side current value.

As shown in FIG. 9, when the heater 40 is off, in a normal condition, each of the high-side voltage, the sense voltage and the low-side voltage are zero. Both the high-side current and the low-side current are zero, since the path through which the current flows is blocked by the high-side switch 27.

When the heater 40 is off and an open-circuit fault occurs in the high-side wiring line 211, each of the high-side voltage, the sense voltage, the low-side voltage, the high-side current and the low-side current become zero. That is, the state is the same as the normal condition.

Since the high-side voltage acquirer 22 is configured as what is known as a "voltage divider circuit", the high-side wiring line 211 is connected to ground via a resistor (not shown) that is included in the voltage divider circuit. For that reason, when the heater 40 is off and an open-circuit fault has occurred in the high-side wiring line 211, the high-side voltage becomes zero as described above. In the present embodiment, the power supply voltage acquirer 21, the sense voltage acquirer 23 and the low-side voltage acquirer 24 are also configured with respective voltage divider circuits, similar to that of the high-side voltage acquirer 22.

When the heater 40 is off and a short-to-power fault has occurred in the high-side wiring line 211, the values of the high-side voltage and the sense voltage become higher than normal, due to the effects of the short-to-power fault. At this time, no current flows in any part of the high-side wiring line 211 that is closer to the power supply 50 than the location of the short-to-power fault, so that the value of the high-side current is zero. On the other hand, since a current flows between the short-to-power fault location and the grounded portion 29, the value of the low-side current becomes higher than in the normal condition. Since the low-side wiring line 231 is connected to the grounded portion 29, the low-side voltage remains zero.

When the heater 40 is off and a short-to-ground fault has occurred in the high-side wiring line 211, each of the high-side voltage, the sense voltage, the low-side voltage, the high-side current and the low-side current become zero. That is, the state is the same as in the normal condition. This remains true irrespective of whether or not the high-side switch 27, etc., have a protection circuit 272.

When the heater 40 is off and an open-circuit fault has occurred in the sense wiring line 221, each of the high-side voltage, the sense voltage, the low-side voltage, the high-side current and the low-side current become zero. That is, the state is the same as in the normal condition.

When the heater 40 is off and a short-to-power fault has occurred in the sense wiring line 221, the values of the high-side voltage and the sense voltage become higher than normal, due to the effects of the fault. At this time, since no current flows from the short-to-power fault location to the high-side wiring line 211 side, the value of the high-side current is zero. On the other hand, since a current flows between the short-to-power fault location and the grounded portion 29, the value of the low-side current is higher than that in the normal condition. Since the low-side wiring line 231 is connected to the grounded portion 29, the low-side voltage remains zero.

When the heater 40 is off and a short-to-ground fault has occurred in the sense wiring line 221, the values of each of the high-side voltage, the sense voltage, the low-side voltage, the high-side current and the low-side current become zero. That is, the state is the same as in the normal condition.

When the heater 40 is off and an open-circuit fault has occurred in the low-side wiring line 231, the values of each of the high-side voltage, the sense voltage, the low-side voltage, the high-side current and the low-side current become zero. That is, the state is the same as in the normal condition.

When the heater 40 is off and a short-to-power fault has occurred in the low-side wiring line 231, the values of the high-side voltage, the sense voltage, and the low-side voltage become higher than normal, due to the effects of the fault. At this time, since no current flows from the short-to-power fault location to the high-side wiring line 211 side, the value of the high-side current becomes zero. On the other hand, since the power supply fault position and the grounded portion 29 are short-circuited, an overcurrent flows between the two if the low-side switch 28 does not include a protection circuit 272. For that reason, the value of the low-side current becomes higher than that in the normal condition. If the low-side switch 28 includes a protection circuit 272, the overcurrent will be immediately interrupted. Hence, the value of the low-side current becomes zero.

When the heater 40 is off and a short-to-ground fault has occurred in the low-side wiring line 231, the respective values of the high-side voltage, the sense voltage, the low-side voltage, the high-side current and the low-side current become zero. That is, the state is the same as in the normal condition.

As described above, when the heater 40 is off and a fault has occurred, the combination of respective values of the high-side voltage, the sense voltage, the low-side voltage, the high-side current and the low-side current becomes different from the combination of these values during the normal condition, with the different combination of values being dependent on the type and location of the fault. Hence, the fault detector 33 of the present embodiment identifies the mode of a fault that has occurred in any one of the wiring lines, and the location where the fault has occurred, based on the high-side voltage, the sense voltage, the low-side voltage, the high-side current and the low-side current. "Any one of the wiring lines" here refers to the high-side wiring line 211, the sense wiring line 221 and the low-side wiring line 231 of this embodiment, however it would be equally possible for only part of these wiring lines to be subjected to fault detection. Furthermore, although with this embodiment the "mode" of fault is any one of an open-circuit fault, a short-to-power fault and a short-to-ground fault, it would be equally possible for only some of these modes to be identified as a fault mode.

The dotted line DL1 shown in FIG. 9(A) indicates a threshold value that is set for judging whether the high-side voltage has a normal value or an abnormal value, when the heater 40 is off. The threshold is set as a value that is higher than the normal high-side voltage and lower than the value taken by the high-side voltage when a short-to-power fault has occurred in any of the high-side wiring line 211, etc. As described hereinafter, the fault detector 33 determines whether the high-side voltage value is normal or abnormal by comparing it with the above-described threshold value. The "abnormal value" in this case is "HI abnormal", described hereinafter.

Dotted lines DL2 and DL3 shown in FIG. 9(B) indicate threshold values that are set for judging whether the sensor voltage has a normal value or an abnormal value, when the heater 40 is off. With this embodiment, since there are two possible values of the sense voltage at the time of a fault, two threshold values are set, for respectively distinguishing these sense voltage values. The threshold value indicated by the dotted line DL2 is set higher than the value attained by the sense voltage when a short-to-power fault has occurred in the high-side wiring line 211 and lower than the value attained by the sense voltage when a short-to-power fault has occurred in the sense wiring line 221 or in the low-side wiring line 231. The threshold indicated by the dotted line DL3 is set as a value that is higher than the value attained by the sense voltage when in the normal condition and is lower than the value attained by the sense voltage when a short-to-power fault has occurred in the high-side wiring line 211. The fault detector 33 judges whether the sense voltage has a normal value or an abnormal value by comparing the acquired sense voltage with these two threshold values. The "abnormal value" in this case covers two types of abnormality, i.e., a "HI abnormal 1" and "HI abnormal 2", described hereinafter.

The dotted line DL4 shown in FIG. 9(C) indicates a threshold value that is set for judging whether the low-side voltage has a normal value or an abnormal value, when the heater 40 is off. The threshold value is set such as to be higher than the value attained by the low-side voltage when in the normal condition and to be lower than the value attained by the low-side voltage when a short-to-power fault has occurred in the low-side wiring line 231. The fault detector 33 determines whether the low-side voltage has a normal value or an abnormal value by comparing the acquired low-side voltage with the above threshold value. The "abnormal value" in this case is "HI abnormal", described hereinafter.

As shown in FIG. 9(D), when the heater 40 is off, the value of the high-side current is always the same as in the normal condition, irrespective of whether a fault has occurred. For that reason, no dotted line indicating a judgement threshold for the high-side current is shown in FIG. 9(D).

The dotted line DL6 shown in FIG. 9(E) indicates a threshold value that is set for judging whether the low-side current has a normal value or an abnormal value, when the heater 40 is off. The threshold value is set such as to be higher than the value attained by the low-side current when in the normal condition, to be lower than the value attained by the low-side current when a short-to-power fault has occurred in either the high-side wiring line 211 or the sense wiring line 221, and to be lower than the value attained by the low-side current when a short-to-power fault has occurred in the high-side wiring line 231 and the low-side switch 28 is not provided with a protection circuit 272. The fault detector 33 determines whether the low-side current has a normal value or an abnormal value by comparing the acquired low-side current with the above threshold value. The "abnormal value" in this case is "HI abnormal", described hereinafter.

The dotted line DL7 shown in FIG. 9(F) indicates a threshold value that is set for judging whether the current deviation has a normal value or an abnormal value, when the heater 40 is off. The threshold is set at a value that is lower than the value attained by the current deviation when in the normal condition and is higher than the value attained by the current deviation when a short-to-power fault has occurred in either the high-side wiring line 211 or the sense wiring line 221, and higher than the value attained by the current deviation when a short-to-power fault has occurred in the high-side wiring line 231 and the low-side switch 28 is not provided with a protection circuit 272. The fault detector 33 determines whether the current deviation has a normal value or an abnormal value by comparing the calculated current deviation with the above threshold value. The "abnormal value" in this case is "LO abnormal", described hereinafter.

Figure 10:
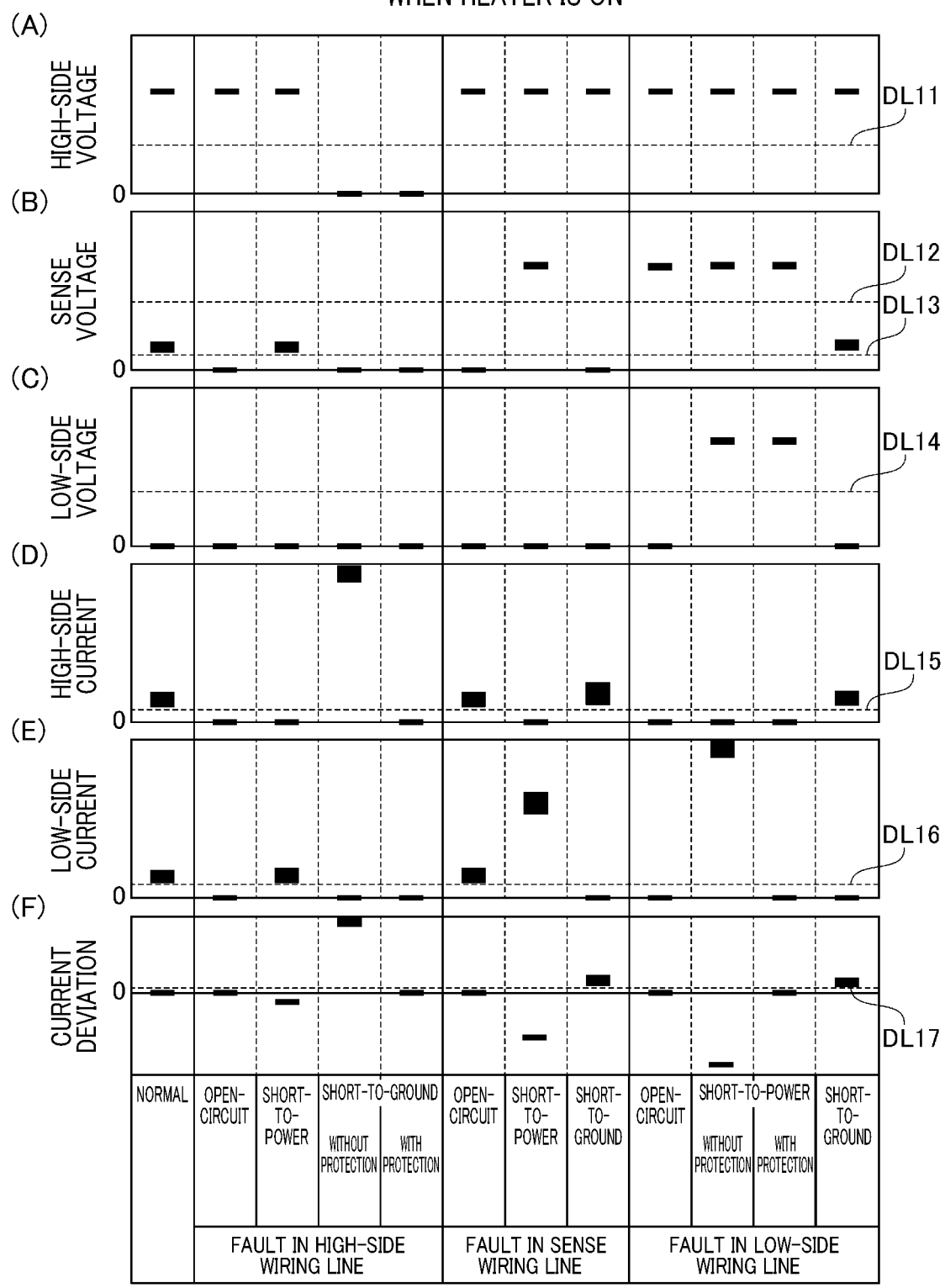
FIG. 10 is a diagram showing a table of values taken by a high-side voltage, etc., for the cases in which respective modes of fault occur in a wiring line.

FIG. 10 shows the ranges of values that can be taken by each of the high-side voltage, etc., when the high-side switch 27 is on, that is, when the heater 40 is energized, with the values being shown by the same method as for FIG. 9.

As shown in FIG. 10, when the heater 40 is on and the condition is normal, the high-side voltage is higher than zero and is approximately equal to the voltage of the power supply 50. The sense voltage is also higher than zero, however since a current flows through the heater 40 and a voltage drop occurs, the sense voltage become lower than the voltage of the power supply 50. Since the low-side wiring line 231 is connected to the grounded portion 29, the low-side voltage is zero. Since a current flows through the heater 40, the high-side current and the low-side current are both higher than zero, and are mutually identical.

If an open-circuit fault has occurred in the high-side wiring line 211 and the heater 40 is on, the high-side voltage become approximately equal to the voltage of the power supply 50, that is, the same value as in the normal condition. On the other hand, since the voltage of the power supply 50 is not applied to the part of the wiring which is on the side of the grounded portion 29, with respect to the open-circuit location, and the grounded portion 29 is at ground potential, both the sense voltage and the low-side voltage are zero. The values of both the high-side current and the low-side current are zero, since the current is interrupted by the break.

When the heater 40 is on and a short-to-power fault has occurred in the high-side wiring line 211, the voltage of the power supply 50 is applied to the high-side wiring line 211, as occurs in the normal condition. Hence the respective values of the high-side voltage, the sense voltage, and the low-side voltage are the same as in the normal condition. At this time, a current flows through the heater 40, however since the location of the short-to-power fault and the power supply 50 are at the same potential, the value of the high-side current is zero. On the other hand, since a current flows between the short-to-power fault location and the grounded portion 29 in the same manner as in the normal condition, the value of the low-side current is the same as that during the normal condition.

When the heater 40 is on and a short-to-ground fault has occurred in the high-side wiring line 211, the values of each of the high-side voltage, the sense voltage, and the low-side voltage become zero, due to the effects of the fault. Since the power supply 50 and the short-to-ground fault location become short-circuited, if the high-side switch 27 does not incorporate a protection circuit 272, an overcurrent flows between the power supply 50 and the short-to-ground fault location. For that reason, the value of the high-side current becomes higher than in the normal condition. If the high-side switch 27 incorporates a protection circuit 272, the overcurrent is immediately interrupted. Hence the value of the high-side current becomes zero. Since the location of the short-to-ground fault is at the same potential as the grounded portion 29, the value of the low-side current is zero.

When the heater 40 is on and an open-circuit fault has occurred in the sense wiring line 221, the respective values of the high-side voltage and the low-side voltage are the same as during the normal condition. On the other hand, since the wiring portion between the sense voltage acquirer 23 and the open-circuit location is connected to ground via the voltage divider circuit in the sense voltage acquirer 23, the value of the sense voltage is zero. The open circuit of the sense wiring line 221 does not affect the current that flows through the heater 40. Hence the respective values of the high-side current and the low-side current are the same as in the normal condition.

When the heater 40 is turned on and a short-to-power fault has occurred in the sense wiring line 221, the value of the sense voltage becomes higher than that during the normal condition, due to the effects of the fault. The respective values of the high-side voltage and the low-side voltage are the same as in the normal condition. At this time, since the short-to-power fault location and the power supply 50 are at the same potential, no current flows between them, and the value of the high-side current is zero. On the other hand the value of the low-side current is higher than that in the normal condition, since the sense voltage becomes increased due to the short-to-power fault.

When the heater 40 is on and a short-to-ground fault has occurred in the sense wiring line 221, the sense voltage becomes zero due to the effects of the fault. Both the high-side voltage value and the low-side voltage value are the same as in the normal condition. At this time, since the sense voltage is lower than normal, the value of the high-side current is slightly higher than normal. Moreover since the short-to-ground fault location and the grounded portion 29 are at the same potential, the value of the low-side current is zero.

When the heater 40 is on and an open-circuit fault has occurred in the low-side wiring line 231, the potential of the wiring portion that is on the power supply 50 side of the open-circuit location becomes the same as that of the power supply 50. For that reason, the high-side voltage has the same value as during the normal condition, and the sense voltage has a higher value than that during the normal condition. On the other hand the value of the low-side voltage becomes zero. Furthermore, since the current is interrupted by the break, the respective values of the high-side current and the low-side current are zero.

When the heater 40 is on and a short-to-power fault has occurred in the low-side wiring line 231, the potential of the wiring portion on the power supply 50 side of the short-to-power fault location becomes the same as that of the power supply 50. Hence the high-side voltage has the same value as during the normal condition, and the sense voltage and the low-side voltage have higher values than during the normal condition. At this time, since the short-to-power fault location and the power supply 50 have the same potential, no current flows between them, and the value of the high-side current is zero. On the other hand if the low-side switch 28 does not include a protection circuit 272, an overcurrent will flow between the power supply fault point and the grounded portion 29, since there is a short-circuit between them. Hence the value of the low-side current will become higher than in the normal condition. If the low-side switch 28 includes the protection circuit 272, the overcurrent will be immediately interrupted. Hence the value of the low-side current will become zero.

When the heater 40 is on and a short-to-ground fault has occurred in the low-side wiring line 231, the low-side wiring line 231 has the same potential as that of the grounded portion 29, as in the normal condition. For that reason, the high-side voltage, the sense voltage and the low-side voltage will have the same respective values as in the normal condition. At this time, a current flows through the heater 40, but since the short-to-ground fault location and the grounded portion 29 are at the same potential, the value of the low-side current is zero. On the other hand, since a current flows between the power supply 50 and the short-to-ground fault location, as in the normal condition, the value of the high-side current is the same as that in the normal condition.

As described above, when the heater 40 is on and a fault has occurred, the combination of respective values taken by the high-side voltage, the sense voltage, the low-side voltage, the high-side current and the low-side current becomes different from the combination of values during operation in the normal condition, with the different combination of values being dependent on the type and location of the fault. Hence, the fault detector 33 of the present embodiment can identify the mode of a fault that has occurred in any one of the wiring lines, and the location where the fault has occurred, based on the high-side voltage, the sense voltage, the low-side voltage, the high-side current and the low-side current.

The dotted line DL11 shown in FIG. 10(A) indicates a threshold value that is set for judging whether the high-side voltage has a normal value or an abnormal value, when the heater 40 is on. The threshold value is set lower than the high-side voltage that is attained during the normal condition, and higher than the high-side voltage that is attained when a short-to-ground fault has occurred in the high-side wiring line 211. The fault detector 33 determines whether the high-side voltage has a normal value or an abnormal value by comparing the acquired high-side voltage with the above threshold value. The "abnormal value" in this case is "LO abnormal", described hereinafter.

The dotted lines DL12 and DL13 shown in FIG. 10(B) indicate threshold values that are set for judging whether the sense voltage has a normal value or an abnormal value, when the heater 40 is on. With this embodiment there are two possible values that can be taken by the sense voltage at the time of a fault, and hence two threshold values are set, for discriminating between these sense voltage values. The threshold value indicated by the dotted line DL12 is set lower than the sense voltage that is attained when a short-to-power fault has occurred in the sense wiring line 221 or in the low-side wiring line 231, or an open-circuit fault has occurred in the low-side wiring line 231, and is set higher than the value of the sense voltage during the normal condition.

Furthermore, the threshold value indicated by the dotted line DL13 is set lower than the sense voltage that is attained during the normal condition, and is set higher than the sense voltage that is attained when an open-circuit fault or a short-to-ground fault has occurred in the high-side wiring line 211, or an open-circuit fault or a short-to-ground fault has occurred in the sense wiring line 221. The fault detector 33 determines whether the sense voltage has a normal value or abnormal value by comparing the acquired sense voltage with each of these two threshold values. The "abnormal value" in this case includes the two types "LO abnormal" and "HI abnormal", described hereinafter.

The dotted line DL14 shown in FIG. 10(C) indicates a threshold value that is set for judging whether the low-side voltage has a normal value or an abnormal value, when the heater 40 is on. The threshold value is set higher than the low-side voltage that is attained in the normal condition, and lower than the low-side voltage that is attained when a short-to-power fault has occurred in the low-side wiring line 231. The fault detector 33 determines whether the low-side voltage has a normal value or an abnormal value by comparing the acquired low-side voltage with the above threshold value. The "abnormal value" in this case is "HI abnormal", described hereinafter.

The dotted line DL15 shown in FIG. 10(D) indicates a threshold value that is set for judging whether the high-side current has a normal value or an abnormal value, when the heater 40 is on. The threshold value is set lower than the high-side current that flows in the normal condition, and is set higher than the high-side current that flows when the high-side wiring line 211 has an open-circuit fault or a short-to-power fault, higher than the high-side current that flows when a short-to-ground fault has occurred in the high-side wiring line 211 and the high-side switch 27 incorporates a protection circuit 272, and higher than the high-side current that flows when a short-to-power fault has occurred in the sense wiring line 221 or an open-circuit fault or a short-to-power fault has occurred in the low-side wiring line 231, respectively. The fault detector 33 determines whether the high-side current has a normal value or an abnormal value by comparing the acquired high-side current with the above threshold value. The "abnormal value" in this case is "LO abnormal", described hereinafter.

The dotted line DL16 shown in FIG. 10(E) is a threshold value that is set for judging whether the low-side current has a normal value or an abnormal value, when the heater 40 is on. The threshold is set at a value that is lower than the low-side current which flows during the normal condition, and higher than the low-side current which flows when an open-circuit fault or a short-to-ground fault has occurred in the high-side wiring line 211, higher than the low-side current which flows when a short-to-ground fault has occurred in the sense wiring line 221, higher than the low-side current which flows when a short-to-power fault has occurred in the low-side wiring line 231 and the high-side switch 27 incorporates a protection circuit 272, and higher than the low-side current which flows when an open-circuit fault or a short-to-ground fault has occurred in the low-side wiring line 231, respectively. The fault detector 33 determines whether the low-side current has a normal value or an abnormal value by comparing the acquired low-side current with the threshold value. The "abnormal value" in this case is "LO abnormal", described hereinafter.

The dotted line DL17 shown in FIG. 10(F) is a threshold value that is set for judging whether the current deviation has a normal value or an abnormal value, when the heater 40 is on. The threshold is set higher than the value attained by the current deviation during the normal condition, and is set lower than the value attained by the current deviation when a short-to-ground fault has occurred in the high-side wiring line 211 and the high-side switch 27 does not incorporate a protection circuit 272, and lower than the value attained by the current deviation when a short-to-ground fault has occurred in the sense wiring line 221 or in the low-side wiring line 231. The fault detector 33 determines whether the current deviation has a normal value or an abnormal value by comparing the calculated current deviation with the threshold value. The "abnormal value" in this case is "HI abnormal", described hereinafter.

Figure 11:
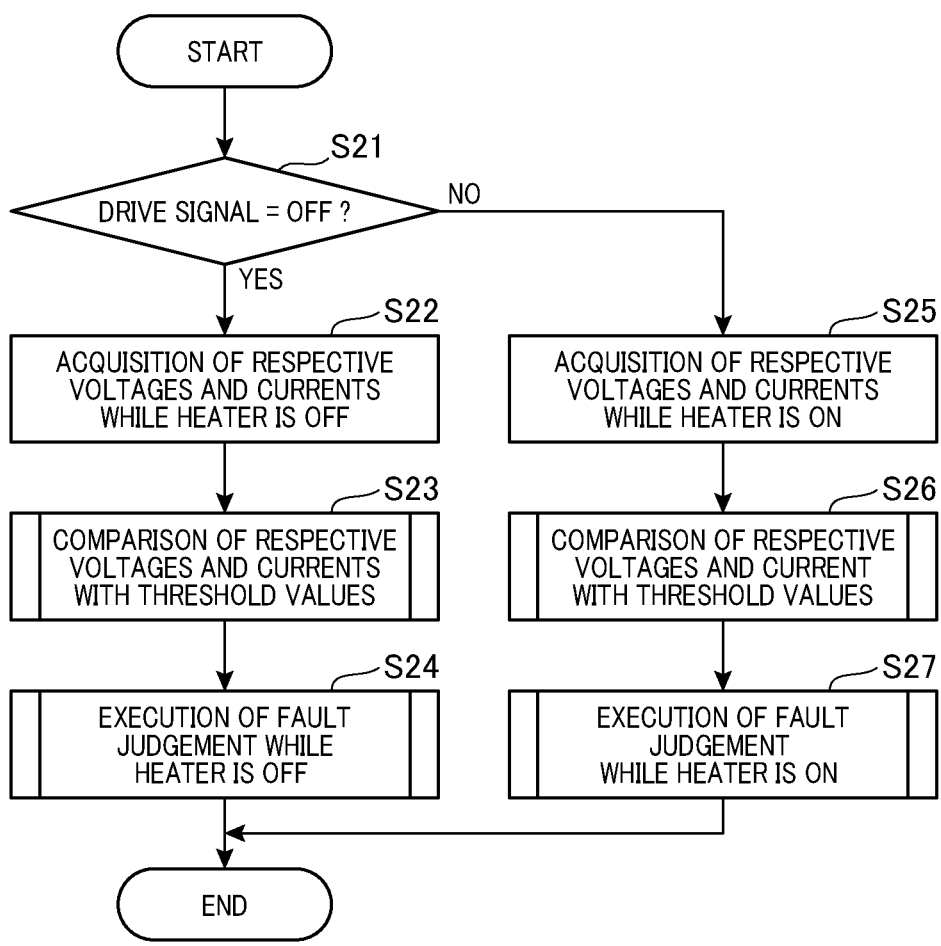
FIG. 11 is a flow diagram showing a flow of processing executed by the control apparatus.

A specific method of fault detection performed by the fault detector 33 will be described. The processing sequence shown in FIG. 11 is executed by the fault detector 33 at specific predetermined timings. In the example of FIG. 4 described above, the processing is executed at the time points t01, t11, t21, and t31. The timings and frequency at which the processing is executed may be changed appropriately, depending on the state of the vehicle, etc.

In the first step S21 of the processing, a decision is made as to whether the drive signal that is inputted to the high-side switch 27 is off. If the drive signal is off, operation proceeds to step S22. In step S22, the values of the high-side voltage, the sense voltage, the low-side voltage, the high-side current and the low-side current when the high-side switch 27 is off, that is, when the energization to the heater 40 is off, are respectively acquired.

In step S23, following step S22, the values acquired in step S22 are respectively compared with the threshold values that have been described referring to FIG. 9, for judging whether each value is normal or abnormal.

Figure 12:
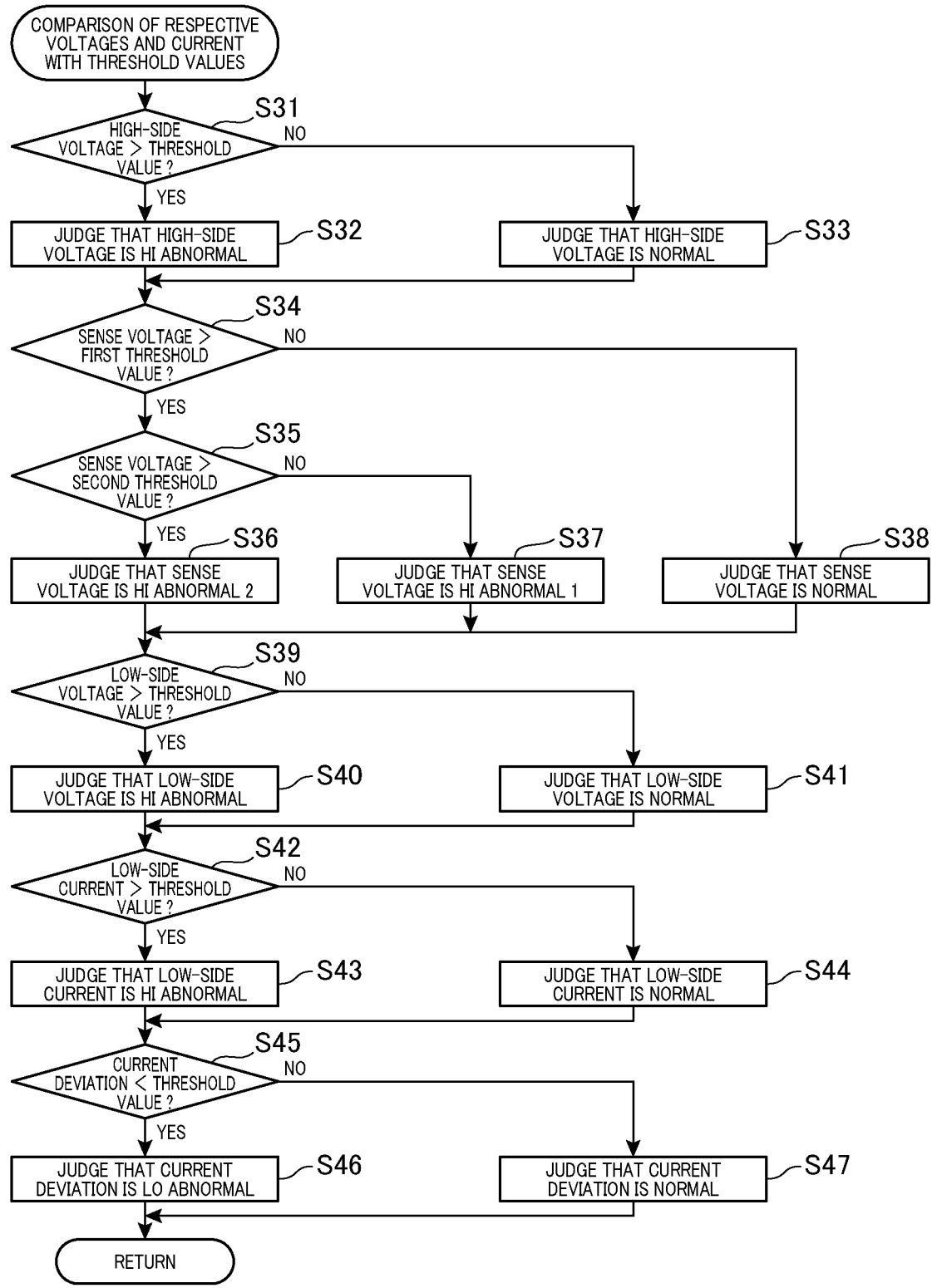
FIG. 12 is a flow diagram showing a flow of processing executed by the control apparatus.

The flowchart shown in FIG. 12 shows a specific flow of processing executed in step S23 of FIG. 11. In the first step S31 of the processing, a decision is made as to whether the high-side voltage is higher than a threshold value. Here, the "threshold value" is that indicated by the dotted line DL1 in FIG. 9. If the high-side voltage is higher than the threshold value, operation proceeds to step S32. In step S32, it is determined that the high-side voltage is "HI abnormal". Here, "HI abnormal" indicates that the high-side voltage has an abnormal value, and specifically indicates that the value is higher than the normal value. Following step S32, operation proceeds to step S34.

If it is determined in step S31 that the high-side voltage is equal to or lower than the threshold value, operation proceeds to step S33. In step S33, it is determined that the high-side voltage has a normal value. Following step S33, operation proceeds to step S34.

In step S34, a decision is made as to whether the sense voltage is higher than a first threshold value. Here, the "first threshold value" is that indicated by the dotted line DL3 in FIG. 9. If the sense voltage is higher than the first threshold value, operation proceeds to step S35.

In step S35, a decision is made as to whether the sense voltage is higher than a second threshold value. Here, the "second threshold value" is that indicated by the dotted line DL2 in FIG. 9. If the sense voltage is higher than the second threshold value, operation proceeds to step S36. In step S36, it is determined that the sense voltage is "HI abnormal 2". Here, "HI abnormal 2" indicates that the sense voltage has an abnormal value, and specifically indicates that it is higher than both the normal value and the second threshold value. Following step S36, operation proceeds to step S39.

If it is determined in step S35 that the sense voltage is equal to or lower than the second threshold value, operation proceeds to step S37. In step S37, it is determined that the sense voltage is "HI abnormal 1". Here, "HI abnormal 1" indicates that the sense voltage has an abnormal value. Specifically, it shows that the sense voltage is higher than the normal value and the first threshold, and is lower than the second threshold value. Following step S37, operation proceeds to step S39.

If it is determined in step S34 that the sense voltage is equal to or lower than the first threshold value, operation proceeds to step S38. In step S38, it is determined that the sense voltage has a normal value. Following step S38, operation proceeds to step S39.

In step S39, a decision is made as to whether the low-side voltage is higher than a threshold value. Here, the "threshold value" is that indicated by the dotted line DL4 in FIG. 9. If the low-side voltage is higher than the threshold value, operation proceeds to step S40. In step S40, it is determined that the low-side voltage is "HI abnormal". Here, "HI abnormal" indicates that the low-side voltage has an abnormal value, and specifically indicates that the value is higher than the normal value. Following step S40, operation proceeds to step S42.

If it is determined in step S39 that the low-side voltage is equal to or lower than the threshold value, operation proceeds to step S41. In step S41, it is determined that the low-side voltage has a normal value. Following step S41, operation proceeds to step S42.

In step S42, a decision is made as to whether the low-side current is higher than a threshold value. Here, the "threshold value" is that indicated by the dotted line DL6 in FIG. 9. If the low-side current is higher than the threshold value, operation proceeds to step S43. In step S43, it is determined that the low-side current is "HI abnormal". Here, "HI abnormal" indicates that the low-side current has an abnormal value, and specifically indicates that the value is higher than the normal value. Following step S43, operation proceeds to step S45.

If it is determined in step S42 that the low-side current is equal to or less than the threshold value, operation proceeds to step S44. In step S44, it is determined that the low-side current has a normal value. Following step S44, operation proceeds to step S45.

In step S45, after the current deviation has been calculated by subtracting the low-side current value from the high-side current value, a decision is made as to whether the current deviation is lower than a threshold value. Here, the "threshold value" is that indicated by the dotted line DL7 in FIG. 9. If the current deviation is lower than the threshold value, operation proceeds to step S46. In step S46, it is determined that the current deviation is "LO abnormal". Here, "LO abnormal" indicates that the current deviation has an abnormal value, and specifically indicates that the current deviation is lower than the normal value. Following step S46, the processing sequence shown in FIG. 12 is terminated, and operation returns to the processing of FIG. 11.

In step S45, if the current deviation is equal to or greater than the threshold value, operation proceeds to step S47. In step S47, it is determined that the current deviation has a normal value. Following step S47, the processing sequence shown in FIG. 12 is terminated, and operation returns to the processing of FIG. 11.

As described above, in step S23 of FIG. 11, the fault detector 33 judges, for each of respective parameters consisting of the high-side voltage, the sense voltage, the low-side voltage, the high-side current, the low-side current and the current deviation, whether the parameter value is normal or abnormal, by comparing the parameters with threshold values that have been individually set for the parameters. Hence when the processing of step S23 is completed, a condition has been established in which, for each of respective parameters comprising the high-side voltage, etc., a decision has been made as to whether the value of the parameter is normal or abnormal.

In step S24 following step S23, based on the respective judgement results described above, a decision is made as to whether there is a fault in any one of the wiring lines, when the energization of the heater 40 is off. The judgement method will be described referring to FIG. 14.

In the upper part of FIG. 14, that is, the section indicated as "when the heater is off", the relationships are shown between the judgement results obtained for each of the parameters and the mode of a fault that has occurred at that time, for the condition in which the energization of the heater 40 is off.

In FIG. 14, for example when a short-to-power fault has occurred in the high-side wiring line 211, the high-side voltage becomes HI abnormal, the sense voltage becomes HI abnormal 1, the low-side current becomes HI abnormal, and the current deviation is LO abnormal, while the other parameters have normal values. In other words, this shows that it can be determined that a short-to-power fault has occurred in the high-side wiring line if the high-side voltage has become HI abnormal, the sense voltage has become HI abnormal 1, the low-side current has become HI abnormal, the current deviation has become LO abnormal, and the other parameters have normal values. In that way, based on the combination of judgement results obtained for the respective parameters, it is possible to identify both the mode of a fault that has occurred and the location where the fault has occurred.

In step S24 of FIG. 11, the mode and the location of a fault that has occurred are identified in accordance with the combination of judgement results obtained in step S23, that is, the combination of respective judgement results obtained for the parameters, indicating for each parameter whether the value is normal or abnormal.

However as shown in FIG. 14, if an open-circuit fault or a short-to-ground fault has occurred in any one of the wiring lines when the heater is off, the judgement results obtained for all of the parameters are normal values. For that reason, when energization to the heater 40 is off, it is not possible to judge that an open-circuit fault or a short-to-ground fault has occurred.

However, even if an open-circuit fault or a short-to-ground fault occurs when energization of the heater 40 is off, the fact that this fault cannot be detected does not present a problem, since the condition in which the heater 40 is not energized is a normal condition.

On the other hand if the power supply to the heater 40 is off and a short-to-power fault has occurred in any one of the wiring lines, the heater 40 may generate unexpected heat, or an overcurrent may flow in part of the wiring. When a short-to-power fault has occurred in any of the wiring lines, then since the fault detector 33 can specify that this has occurred, and the location where the fault has occurred, it is made possible for example to take measures such as turning off the low-side switch 28, for safety.

If the energization to the heater 40 is off, by acquiring judgement results for respective parameters consisting of the high-side voltage, the sense voltage, the low-side voltage, the high-side current, the low-side current and the current deviation, and comparing the judgement results with FIG. 14, it is possible to identify both the mode of a fault that has occurred and the location where the fault has occurred, other than for an open-circuit fault or a short-to-ground fault. However, it is also possible to detect a fault by comparing only a part of the judgement results with FIG. 14, instead of comparing all of the judgement results. Such a fault detection method is described hereinafter.

Returning to FIG. 11, if it is determined in step S21 that the drive signal is on, operation proceeds to step S25. In step S25 the values of the high-side voltage, the sense voltage, the low-side voltage, the high-side current, and the low-side current, when the high-side switch 27 is on, that is, when the energization to the heater 40 is on, are respectively acquired.

In step S26 following step S25, the respective values acquired in step S25 are compared with the threshold values described above referring to FIG. 10, to judge, for each acquired value, whether it is normal or abnormal.

Figure 13:
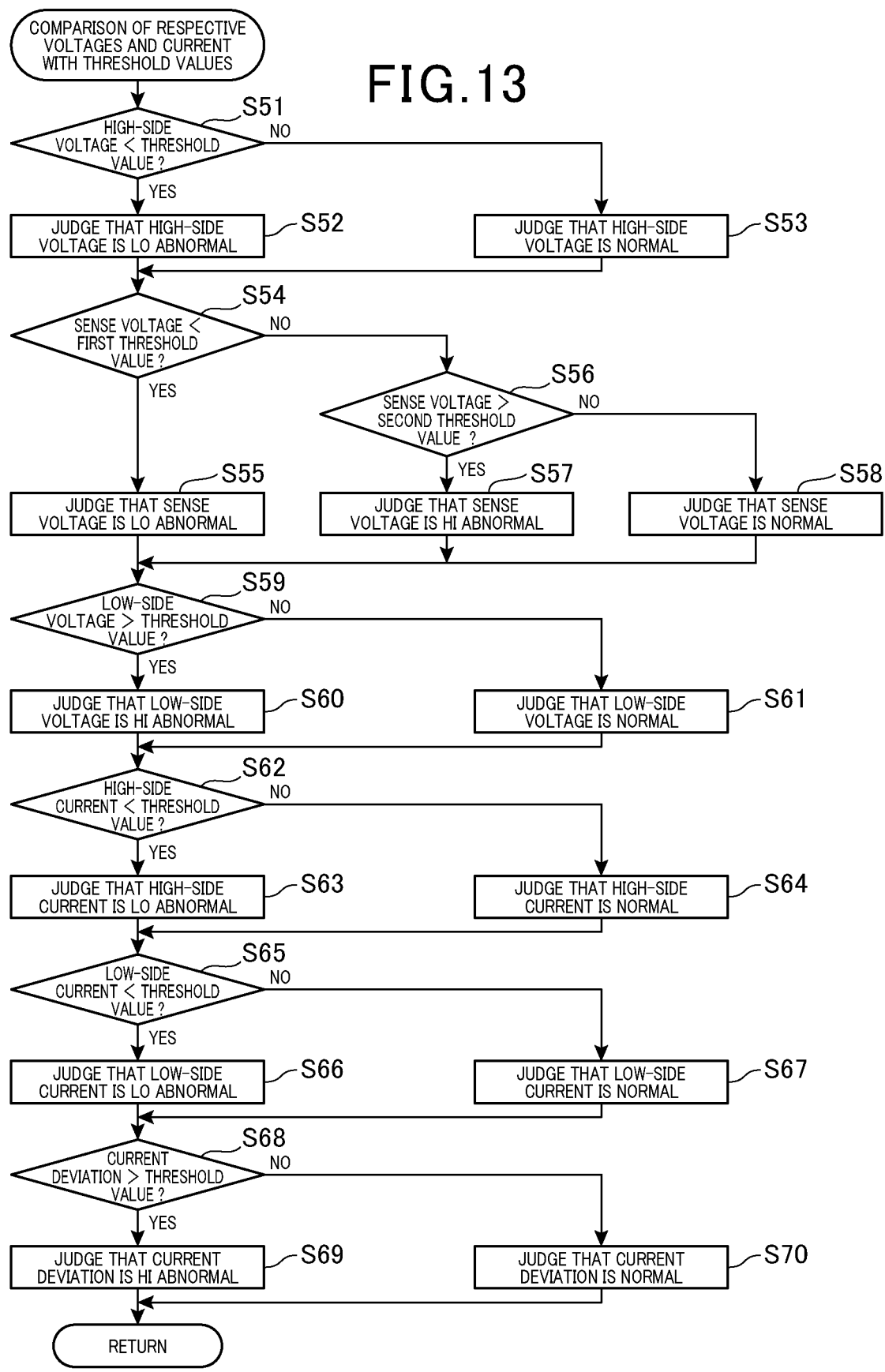
FIG. 13 is a flow diagram showing a flow of processing executed by the control apparatus.

The flow diagram in FIG. 13 shows a specific flow of the processing that is executed in step S26 of FIG. 11. In the first step S51 of the processing, a decision is made as to whether the high-side voltage is lower than a threshold value. Here, the "threshold value" is that indicated by the dotted line DL11 in FIG. 10. If the high-side voltage is lower than the threshold value, operation proceeds to step S52. In step S52, it is determined that the high-side voltage is "LO abnormal". Here, "LO abnormal" indicates that the high-side voltage has an abnormal value, and specifically indicates that it is lower than the normal value. Following step S52, operation proceeds to step S54.

If it is determined in step S51 that the high-side voltage is equal to or higher than the threshold value, operation proceeds to step S53. In step S53, it is determined that the high-side voltage has a normal value. Following step S53, operation proceeds to step S54.

In step S54, a decision is made as to whether the sense voltage is lower than a first threshold value. Here, the "first threshold value" is that indicated by the dotted line DL13 in FIG. 10. If the sense voltage is lower than the first threshold value, operation proceeds to step S55. In step S55, it is determined that the sense voltage is "LO abnormal". Here, "LO abnormal" indicates that the sense voltage has an abnormal value, and specifically indicates that it is lower than the normal value. Following step S55, operation proceeds to step S59.

If it is determined in step S54, that the sense voltage is equal to or higher than the first threshold value, operation proceeds to step S56. In step S56, a decision is made as to whether the sense voltage is higher than a second threshold value. Here, the "second threshold value" is that indicated by the dotted line DL12 in FIG. 10. If the sense voltage is higher than the second threshold value, operation proceeds to step S57. In step S57, it is determined that the sense voltage is "HI abnormal". Here, "HI abnormal" indicates that the sense voltage has an abnormal value, and specifically indicates that it is higher than the normal value. Following step S57, operation proceeds to step S59.

If it is determined in step S56 that the sense voltage is equal to or lower than the second threshold value, operation proceeds to step S58. In step S58, it is determined that the sense voltage has a normal value. Following step S58, operation proceeds to step S59.

In step S59, a decision is made as to whether the low-side voltage is higher than a threshold value. Here, the "threshold value" is that indicated by the dotted line DL14 in FIG. 10. If the low-side voltage is higher than the threshold value, operation proceeds to step S60. In step S60, it is determined that the low-side voltage is "HI abnormal". Here, "HI abnormal" indicates that the low-side voltage has an abnormal value, and specifically indicates that it is higher than the normal value. Following step S60, operation proceeds to step S62.

If it is determined in step S59 that the low-side voltage is equal to or lower than the threshold value, operation proceeds to step S61. In step S61, it is determined that the low-side voltage has a normal value.

Following step S61, operation proceeds to step S62.

In step S62, a decision is made as to whether the high-side current is lower than a threshold value. Here, the "threshold value" is that indicated by the dotted line DL15 in FIG. 10. If the high-side current is lower than the threshold value, operation proceeds to step S63. In step S63, it is determined that the high-side current is "LO abnormal". Here, "LO abnormal" indicates that the high-side current has an abnormal value, and specifically indicates that it is lower than the normal value. Following step S63, operation proceeds to step S65.

If it is determined in step S62 that the high-side current is equal to or greater than the threshold value, operation proceeds to step S64. In step S64, it is determined that the high-side current has a normal value. Following step S64, operation proceeds to step S65.

In step S65, a decision is made as to whether the low-side current is lower than a threshold value. Here, the "threshold value" is that indicated by the dotted line DL16 in FIG. 10. If the low-side current is lower than the threshold value, operation proceeds to step S66. In step S66, it is determined that the low-side current is "LO abnormal". Here, "LO abnormal" indicates that the low-side current has an abnormal value, and specifically indicates that the value is lower than the normal value. Following step S66, operation proceeds to step S68.

If it is determined in step S65 that the low-side current is equal to or greater than the threshold value, operation proceeds to step S67. In step S67, it is determined that the low-side current has a normal value. Following step S67, operation proceeds to step S68.

In step S68, after the current deviation has been calculated by subtracting the low-side current value from the high-side current value, a decision is made as to whether the current deviation is higher than a threshold value. Here, the "threshold value" is that indicated by the dotted line DL17 in FIG. 10. If the current deviation is higher than the threshold value, operation proceeds to step S69. In step S69, it is determined that the current deviation is "HI abnormal". Here, "HI abnormal" indicates that the current deviation has an abnormal value, and specifically indicates that the current deviation is higher than the normal value. Following step S69, the processing sequence shown in FIG. 13 is terminated, and operation returns to the processing of FIG. 11.

If it is determined in step S68 that the current deviation is equal to or less than the threshold value, operation proceeds to step S70. In step S70, it is determined that the current deviation has a normal value. Following step S70, the processing sequence shown in FIG. 13 is terminated, and operation returns to the processing of FIG. 11.

In step S26 of FIG. 11 as described above, the fault detector 33 judges, for each of respective values of parameters consisting of the high-side voltage, the sense voltage, the low-side voltage, the high-side current and the low-side current, whether the parameter value is normal or abnormal, with the judgement being performed by comparing the parameter values with threshold values that have been individually set. Hence at the point in time when the processing of step S26 has been completed, a condition is reached in which a judgement has been executed, for each of the parameters consisting of the high-side voltage etc., whether the parameter value is normal or abnormal.

In step S27, following step S26, when the energization to the heater 40 is on, a decision is made for each of the wiring lines as to whether a fault has occurred, with the decision being made based on the respective results of the above judgements. The judgement method will be described referring again to FIG. 14.

In the lower part of FIG. 14, that is, the section indicated as "when the heater is on", the relationships are shown between the judgement results obtained for each of the parameters and the mode of a fault that has occurred at that time, for the condition in which the energization of the heater 40 is on.

FIG. 14 shows that, for example, when an open-circuit fault occurs in the high-side wiring line 211 the sense voltage becomes LO abnormal, the high-side current becomes LO abnormal, the low-side current becomes LO abnormal, and the other parameters take normal values. In other words, it is shown that when the sense voltage is LO abnormal, the high-side current is LO abnormal, the low-side current is LO abnormal, and other parameters have normal values, it is determined that an open-circuit fault has occurred in a high-side wiring line. Thus, based on the combination of judgement results obtained for the respective parameters, it is possible to identify both the mode of a fault that has occurred and the location where the fault has occurred.

Hence it is possible in step S27 of FIG. 11 to identify the mode of a fault that has occurred and the location where the fault has occurred, in accordance with the combination of judgement results that are obtained in step S26 for the respective parameters, where the judgement results indicate whether each parameter has a normal or an abnormal value.

As shown in FIG. 14, when energization to the heater 40 is on, there is a one-to-one correspondence between the combination of judgement results obtained for the respective parameters and the mode and location of a fault. Hence if the judgement results obtained for each of the parameters consisting of the high-side voltage, the sense voltage, the low-side voltage, the high-side current, the low-side current and the current deviation are compared with FIG. 14, both the mode and the occurrence location of a fault can be identified. However, it is also possible to detect a fault by comparing only a part of the judgement results with FIG. 14, instead of comparing all of the judgement results. Such a fault detection method is described hereinafter.

The case can be envisaged in which the control apparatus 10 does not include the sense voltage acquirer 23, and in which the judgement of step S26 of FIG. 11 is performed only with respect to the high-side voltage, the low-side voltage, the high-side current, the low-side current, and the current deviation. In that case, the combination of judgement results obtained when an open-circuit fault occurs in the high-side wiring line 211 completely matches the combination of judgement results obtained when an open-circuit fault occurs in the low-side wiring line 231. Hence in such a case, although it can be determined that an open-circuit fault has occurred, it is not possible to determine which of the high-side wiring line 211 and the low-side wiring line 231 has the open-circuit fault.

However, the control apparatus 10 of the present embodiment includes the sense voltage acquirer 23, and fault detection is performed based on results that include the judgement result obtained with respect to the acquired value of sense voltage. As a result, the combination of judgement results obtained when an open-circuit fault occurs in the high-side wiring line 211 and the combination of judgement results obtained when an open-circuit fault occurs in the low-side wiring line 231 are respectively different, so that it is possible to determine the one of these wiring lines in which the fault has occurred.

An example of a method of detecting a fault by comparing only a part of the judgement results with FIG. 14, instead of the judgement results obtained for all of the high-side voltage, etc., will be described. The processing sequence shown in FIG. 15 is executed for judging whether a short-to-power fault has occurred in the high-side wiring line 211, when the energization of the heater 40 is off. This processing is performed following the processing of step S23 in FIG. 11, for example.

In the first step S81 of the processing, a decision is made as to whether the high-side voltage is HI abnormal. If the high-side voltage is HI abnormal, operation proceeds to step S82. In step S82 a decision is made as to whether the sense voltage is HI abnormal 1. If the sense voltage is HI abnormal 1, operation proceeds to step S83. In step S83 a decision is made as to whether the low-side voltage has a normal value. If the low-side voltage has a normal value, operation proceeds to step S84. In step S84 it is determined that a short-to-power fault has occurred in the high-side wiring line 211.

If it is determined that the high-side voltage is not HI abnormal in step S81, the sense voltage is not HI abnormal 1 in step S82, and the low-side voltage is not normal in step S83, operation proceeds to step S85. In step S85, it is determined that no short-to-power fault has occurred in the high-side wiring line 211.

As described above, the processing shown in FIG. 15 enables a determination to be made as to whether a short-to-power fault has occurred in the high-side wiring line 211, with the determination being made in accordance with the judgement results obtained with respect to three parameters, consisting of the high-side voltage, the sense voltage, and the low-side voltage. This enables the processing of a program executed for fault detection to be simplified, for example, since it is not necessary for the detection to be based on the judgement results obtained for each of the high-side voltage, sense voltage, low-side voltage, high-side current, low-side current and current deviation parameters.

Figure 16:
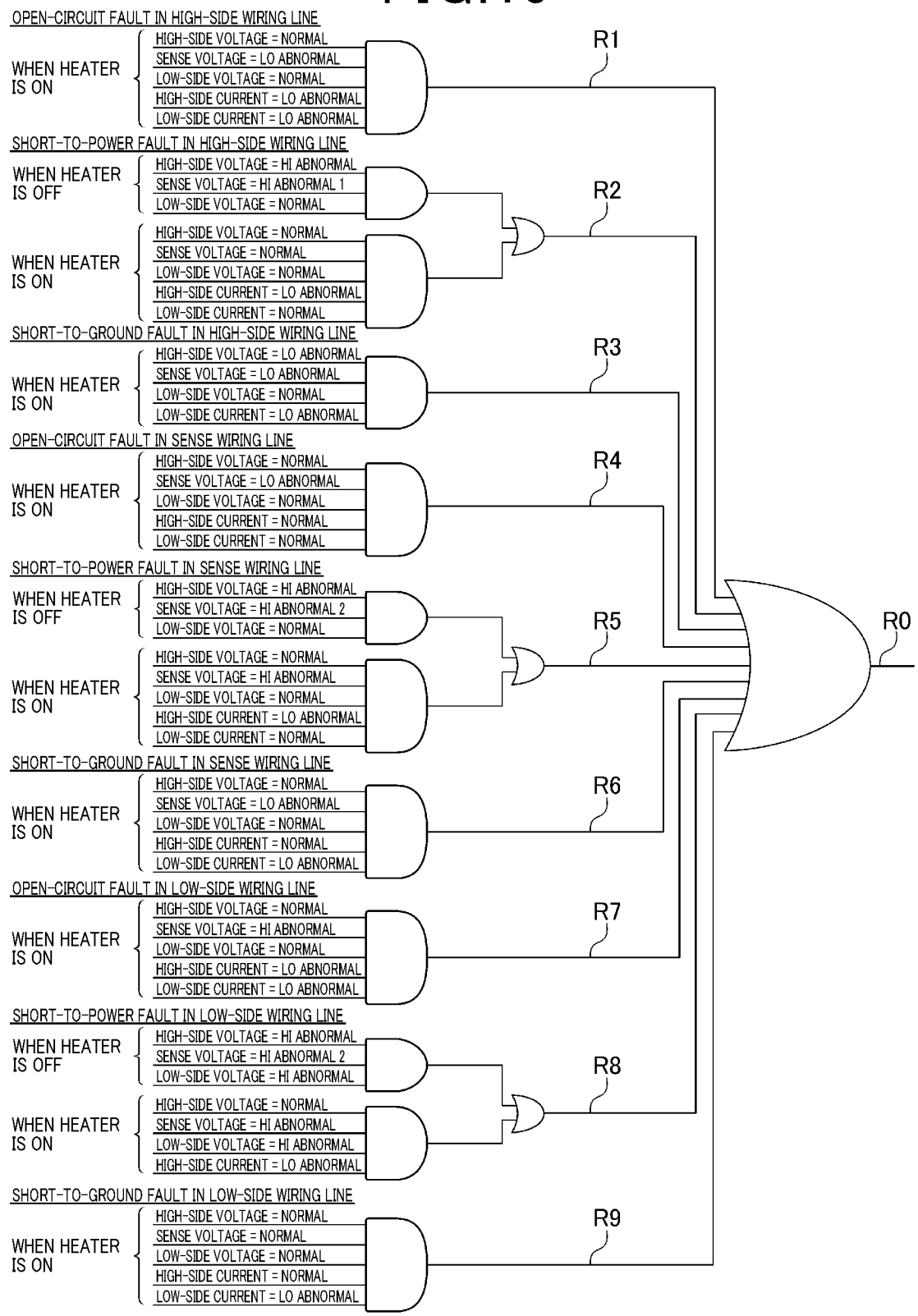
FIG. 16 is a diagram showing a method of identifying the mode and locations of a fault, in the form of a logic circuit diagram.

A method of judging whether a short-to-power fault has occurred in the high-side wiring line 211 has been described here, but it would be equally possible for other types of fault to be determined, based on the judgement results obtained with respect to some of the parameters. The types and number of parameters used in the judgement can be set appropriately in accordance with the mode of fault that is to be determined. FIG. 16 illustrates an example of a method for determining respective modes of fault, shown as a logic circuit diagram.

For example the uppermost portion of the diagram, designated as "OPEN-CIRCUIT FAULT IN HIGH-SIDE WIRING LINE", shows that when the energization to the heater 40 is on, it is determined that an open-circuit fault has occurred in the high-side wiring line 211 if the high-side voltage has a normal value, the sense voltage has become LO abnormal, the low-side voltage has a normal value, the high-side current has become LO abnormal, and the low-side current has become LO abnormal. In that way, a determination can be made as to whether an open-circuit fault has occurred in the high-side wiring line 211, based on the combination of respective judgement results obtained with respect to five parameters. The part where the determination result is outputted is labeled "R1".

Similarly, the label "R2" indicates the part where the result of determining whether a short-to-power fault has occurred in the high-side wiring line 211 is outputted, and the label "R3" indicates the part where the result of determining whether a short-to-ground fault has occurred in the high-side wiring line 211 is outputted.

In addition, the label "R4" indicates the part where the result of determining whether an open-circuit fault has occurred in the sense wiring line 221 is outputted, the label "R5" indicates the part where the result of determining whether a short-to-power fault has occurred in the sense wiring line 221 is outputted, and the label "R6" indicates the part where the result of determining whether a short-to-ground fault has occurred in the sense wiring line 221 is outputted.

Furthermore, the label "R7" indicates the part where the result of determining whether an open-circuit fault has occurred in the low-side wiring line 231 is outputted, the label "R8" indicates the part where result of determining whether a short-to-power fault has occurred in the low-side wiring line 231 is outputted, and the label "R9" indicates the part where the result of determining whether a short-to-ground fault has occurred in the low-side wiring line 231 is outputted.

By means of R1 to R9 it is possible to identify which one of an open-circuit fault of the high-side wiring line 211, a short-to-power fault of the high-side wiring line 211, a short-to-ground fault of the high-side wiring line 211, an open-circuit fault of the sense wiring line 221, a short-to-power fault of the sense wiring line 221 a short-to-ground fault of the sense wiring line 221, an open-circuit fault of the low-side wiring line 231, a short-to-power fault of the low-side wiring line 231, and a short-to-ground fault of the low-side wiring line 231 has occurred. In FIG. 16, the label "R0" indicates a part where the result of judging whether the overall control apparatus 10 is normal is outputted. If a judgement result indicating that a fault has occurred is outputted as any of R1 to R9, then a judgement result indicating a fault is outputted as R0.

Figure 17:
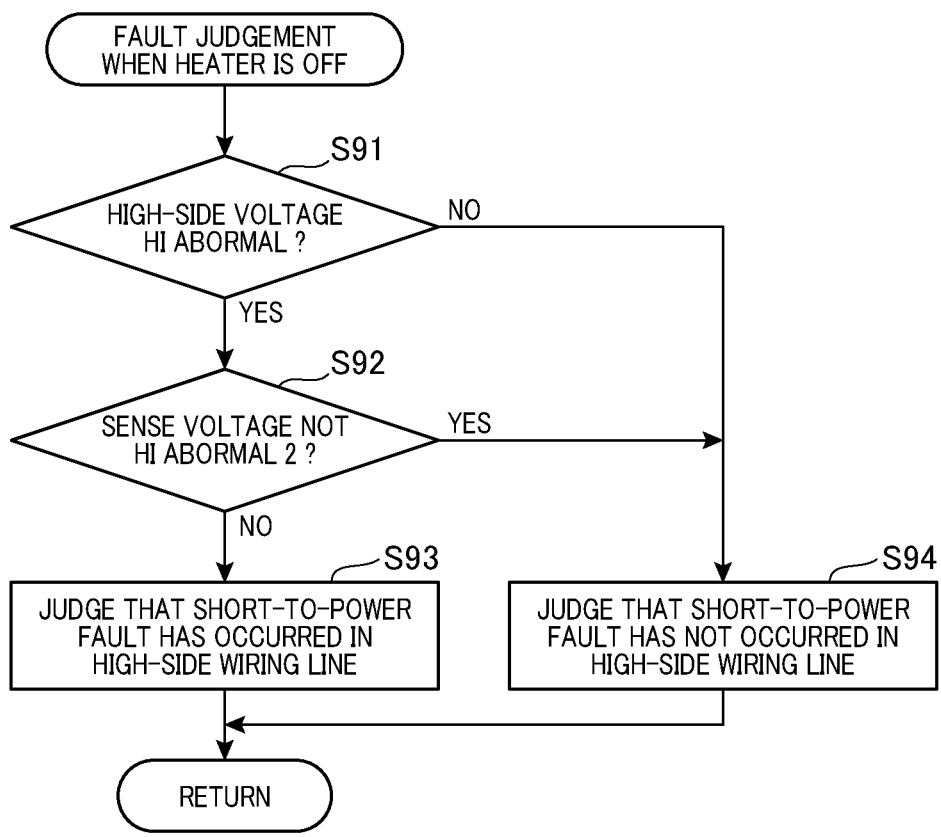
FIG. 17 is a flow diagram showing a flow of processing executed by the control apparatus.

The method of selecting the parameters used for fault detection is not limited to the examples shown in FIGS. 15 and 16. The processing sequence shown in FIG. 17 is another example of processing performed for determining whether a short-to-power fault has occurred in the high-side wiring line 211 when energization to the heater 40 is off. This processing can be executed in place of the processing sequence shown in FIG. 15.

In the first step S91 of the processing, a decision is made as to whether the high-side voltage is HI abnormal. If the high-side voltage is HI abnormal, operation proceeds to step S92. In step S92 a decision is made as to whether the sense voltage is HI abnormal 2. If the sense voltage is not HI abnormal 2, operation proceeds to step S93. In step S93, it is determined that a short-to-power fault has occurred in the high-side wiring line 211.

If it is determined in step S91 that the high-side voltage is not HI abnormal, and if the sense voltage is judged to be HI abnormal 2 in step S92, operation proceeds to step S94. In step S94, it is determined that no short-to-power fault has occurred in the high-side wiring line 211.

Figure 18:
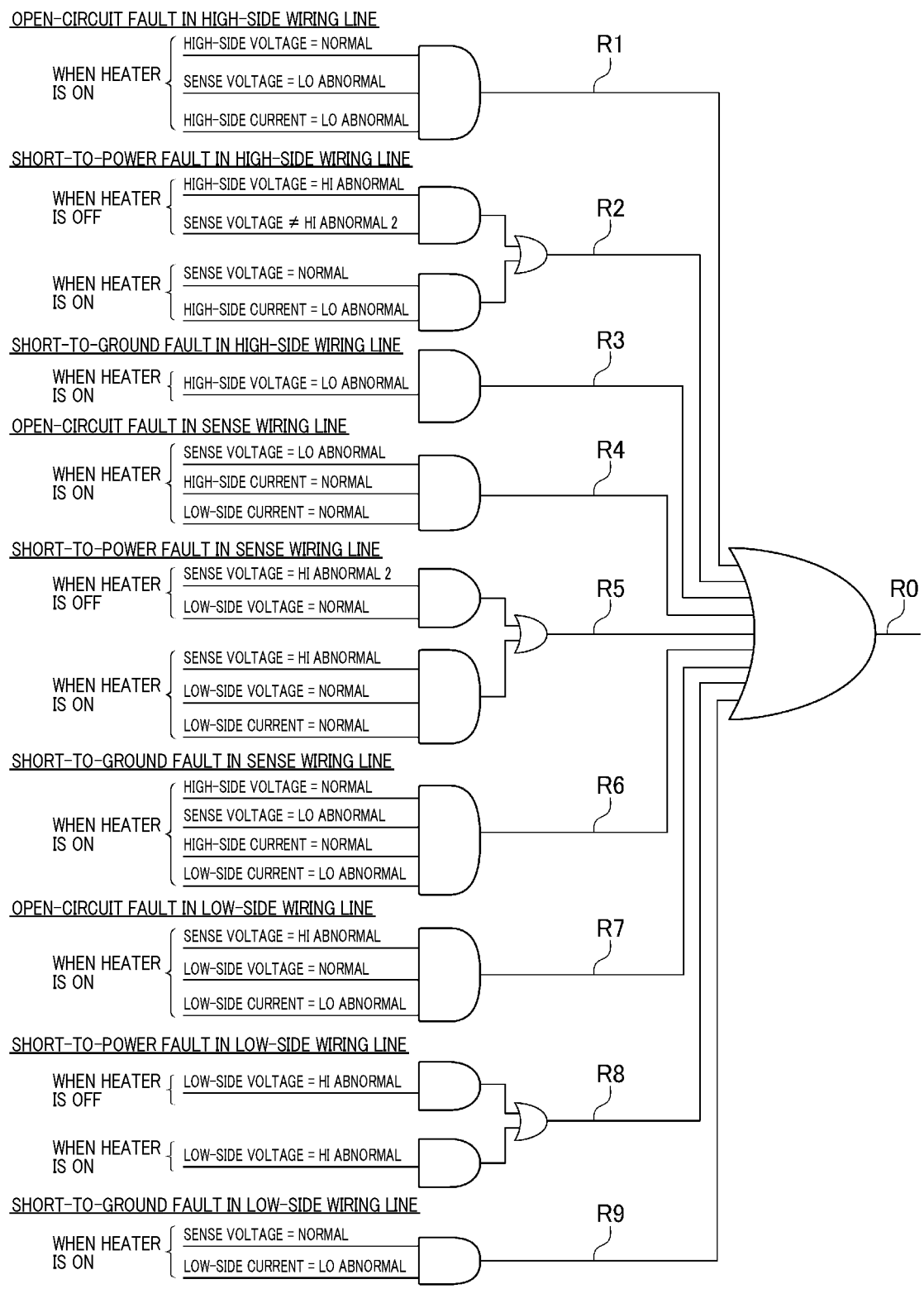
FIG. 18 is a diagram showing a method of identifying the modes and locations of faults, in the form of a logic circuit diagram.

As described above, with the processing shown in FIG. 17, a determination as to whether a short-to-power fault has occurred in the high-side wiring line 211 can be made based on the judgement results obtained for two parameters, consisting of the high-side voltage and the sense voltage. By reducing the number of parameters used for the determination, the processing of the program for detecting a fault can be further simplified. Another example of a method for judging whether a short-to-power fault has occurred in the high-side wiring line 211 has been described here, however judgement of other types of fault can also be performed by methods that are different from that shown in FIG. 16. FIG. 18 shows another example of a method of judging respective faults, expressed as a logic circuit diagram. Since the notation is the same as that in FIG. 16, detailed description is omitted.

The judgement methods shown in FIGS. 16 and 18 are examples of methods in which fault detection is performed without using the results of judgement of the current deviation. However, it goes without saying that it is equally possible to perform fault detection using the results of judgement of the current deviation.

For example, if the ground potential of the grounded portion 29 varies, the respective values of the high-side current and the low-side current will also change, and the results of comparison with the respective threshold values that have been set for the high-side current and the low-side current may change. However, since the value of the current deviation is not affected by a variation of the ground potential as described above, use of the current deviation provides the advantage that the results of comparison with the threshold value will not be changed by a variation of the ground potential.

As described above, the fault detector 33 according to the present embodiment is configured such as to enable the mode of a fault that has occurred and the location where the fault has occurred to be identified, based on the high-side voltage, the low-side voltage, the sense voltage, the high-side current and the low-side current. Specifically, the fault detector 33 compares each of respective parameters consisting of the high-side voltage, the low-side voltage, the sense voltage, the high-side current and the low-side current with an individually set threshold value, to determine for each parameter whether it has a normal or an abnormal value. The embodiment is configured to then identify the mode of a fault that has occurred in any one of the wiring lines and the location where the fault has occurred, based on the combination of respective judgement results that indicate, for each parameter, whether it has a normal value or an abnormal value. It should be noted that the term "abnormal value" applies to "LO abnormal", "HI abnormal", etc., as described above. The expression "each of the wiring lines" in the above refers to the high-side wiring line 211, the sense wiring line 221 and the low-side wiring line 231 of the present embodiment. In addition, the "mode" of a fault may be any of an open-circuit fault a short-to-power fault, or a short-to-ground fault, with the present embodiment.

With a judgement method as described above, it is possible to accurately and easily determine the mode and location of a fault by comparing, with FIG. 14, a combination of results of judgement as to whether values are normal or abnormal.

The control apparatus 10 includes a high-side switch 27 for switching between opening and closing of a path through which power is supplied to the heater 40. When the fault detector 33 performs fault detection, it is possible to identify the mode of a fault that has occurred in any one of the high-side wiring line 211, the sense wiring line 221 and the low-side wiring line 231, and the location where the fault has occurred, based upon the judgement results obtained for each of the parameters when the high-side switch 27 is off, or upon the judgement results obtained for each of the parameters when the high-side switch 27 is on. With the present embodiment, the above-mentioned "mode" of a fault in the above may be any one of an open-circuit fault, a short-to-power fault and a short-to-ground fault.

That is, the fault detector 33 is configured for identifying the mode of a fault that has occurred, and the location where the fault has occurred, based on respective values of the high-side voltage, low-side voltage, sense voltage, high-side current, and low-side current that are acquired when the high-side switch 27 remains off, or that are acquired when the high-side switch 27 remains on.

Since fault detection can be performed without repeatedly turning the high-side switch 27 on and off, it is possible to identify the mode and location of a fault not only at times when the high-side switch 27 performs switching operations, but also during periods in which the high-side switch 27 remains unchanged in the off state, or remains unchanged in the on state.

When the value of the voltage of the power supply 50 fluctuates, the values of the high-side voltage, etc., during the normal condition, will fluctuate accordingly. Similarly, the values of the high-side voltage etc., at the time of a fault, will vary in accordance with the value of the voltage of the power supply 50.

Figure 19:
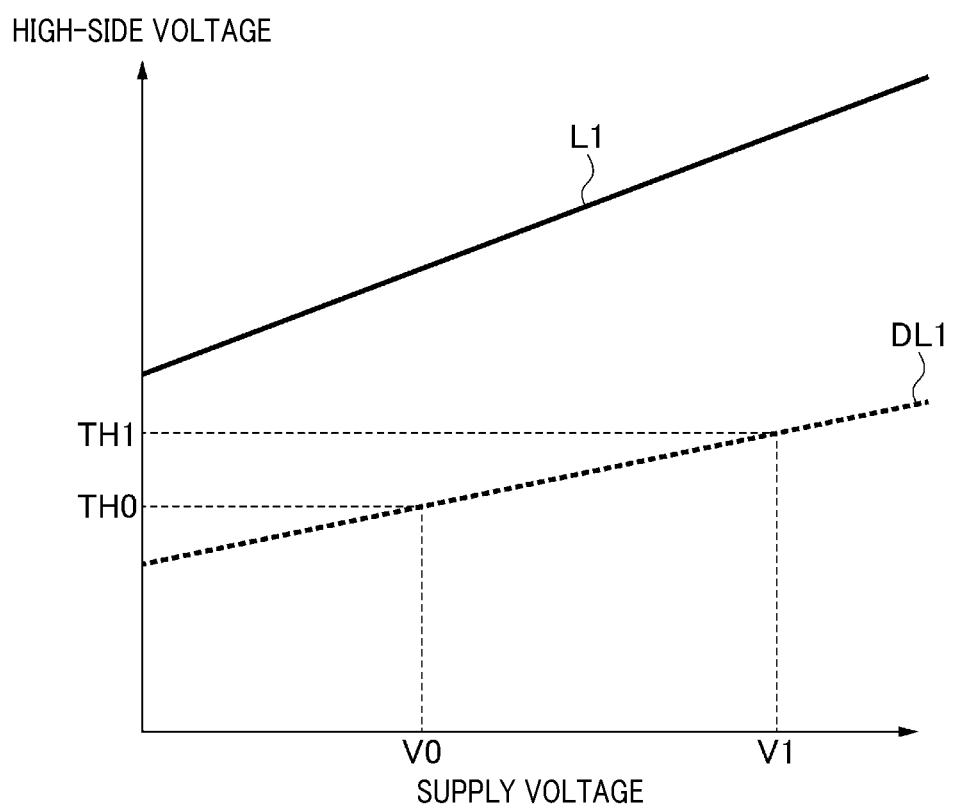
FIG. 19 is a diagram for describing a method of changing a threshold value.

The line L1 in FIG. 19 indicates the relationship between the voltage value of the power supply 50, that is, the value of the supply voltage, and the high-side voltage. The high-side voltage shown here is the voltage value for the case in which a short-to-power fault has occurred in the high-side wiring line 211 while the energization to the heater 40 is off. That is, it corresponds to the range of the high-side voltage that is shown in the third section from the left in FIG. 9(A).

As indicated by the line L1, as the supply voltage increases, the value of the high-side voltage increases accordingly. For that reason, if the threshold value indicated by the dotted line DL1 in FIG. 9 is always constant, then if the supply voltage varies, it may not be possible to accurately determine whether the value of the high-side voltage is normal or abnormal.

Hence the fault detector 33 of the present embodiment does not maintain the threshold value constant, but varies it in accordance with the supply voltage. The dotted line DL1 shown in FIG. 19 indicates the threshold value thus changed. With the present embodiment, the threshold value indicated by the dotted line DL1 is changed such as to increase as the supply voltage increases.

The threshold values of other parameters can be changed in the same manner as described above, that is, the threshold values of the sense voltage, the low-side voltage, the high-side current, the low-side current and the current deviation. In that way, the fault detector 33 of the present embodiment is configured such as to change each of the respective threshold values set for the above parameters in accordance with value of the voltage of the power supply 50. This makes it possible to accurately determine whether each parameter has a normal value or an abnormal value.

If a threshold value has a negative value, as indicated by the dotted line DL7 in FIG. 9(F), the threshold value may be changed so as to decrease in accordance with increase of the voltage value of the power supply 50. That is, the threshold value may be changed such that its absolute value increases in accordance with increase of the value of voltage of the power supply 50.

Processing that is executed after fault detection has been performed by the fault detector 33 will be described referring to FIG. 20. The processing sequence shown in FIG. 20 is executed by the microcomputer 30 after the processing shown in FIG. 11 is completed.

Figure 20:
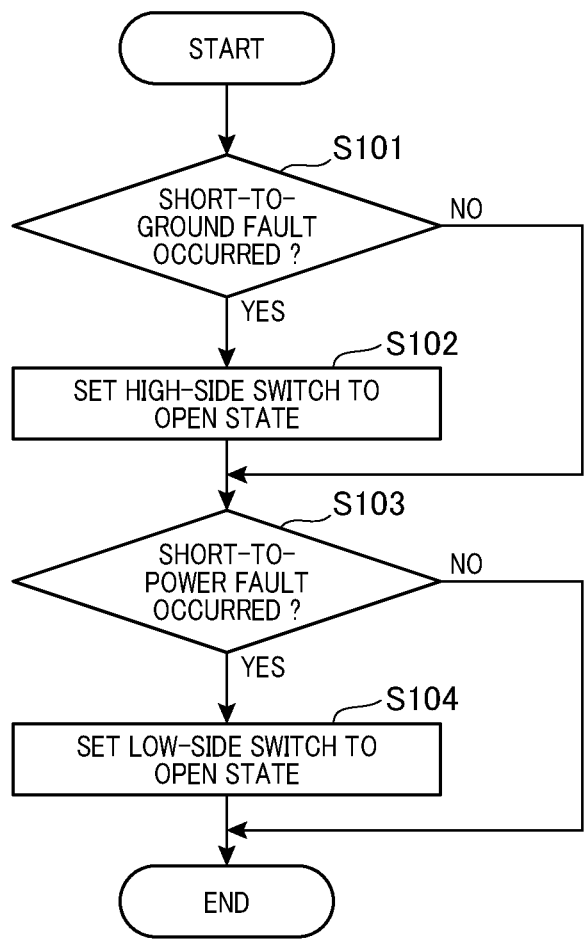
FIG. 20 is a flow diagram showing a flow of processing executed by the control apparatus.

In the first step S101 of the processing shown in FIG. 20, a decision is made as to whether a short-to-ground fault has occurred in any one of the wiring lines. This judgement is made based on the results of the processing shown in FIG. 11. If a short-to-ground fault has occurred in any one of the wiring lines, operation proceeds to step S102. If no short-to-ground fault has occurred in any of the wiring lines, operation proceeds to S103 described hereinafter without going through step S102.

If operation proceeds to step S102, the power supply 50 is connected to the short-to-ground fault location via the high-side switch 27, and thus an overcurrent may flow between them. Hence, processing is executed in step S102 for switching off the high-side switch 27. This processing is performed by the interrupter 34. As a result, the path for the above type of overcurrent can be interrupted.

In step S103, following step S102, a decision is made as to whether a short-to-power fault has occurred in any of the wiring lines. This judgement is made based on the results of the processing shown in FIG. 11. If a short-to-power fault has occurred in any of the wiring lines, operation proceeds to step S104. If no short-to-power fault has occurred in any of the wiring lines, the processing sequence shown in FIG. 20 is terminated without passing through step S104.

If operation proceeds to step S104, the short-to-power fault location and the grounded portion 29 are connected via the low-side switch 28, and thus an overcurrent may flow between them. Hence, processing is executed in step S104, for switching off the low-side switch 28. This processing is performed by the interrupter 34. As a result, the path for the above type of overcurrent can be interrupted.

As described above, with the control apparatus 10 of the present embodiment, when the fault detector 33 detects occurrence of a short-to-ground fault whereby any one of the wiring lines connected to the heater 40 has become short-circuited to the potential of the grounded portion, the interrupter 34 switches the high-side switch 27 to the open state. Furthermore, when the fault detector 33 detects that a short-to-power fault has occurred whereby any one of the wiring lines connected to the heater 40 has become short-circuited to the potential of the power supply 50, the interrupter 34 switches the low-side switch 28 to the open state. As a result of the interrupter 34 performing such processing, generation of an overcurrent can be prevented.

An example has been described above in which, as shown in FIG. 2, the sense electrode 440 is connected in the vicinity of the connecting portion between the heating electrode 410 and the lead electrode 430. However when the sense electrode 440 is connected in the vicinity of the connection portion between the heating electrode 410 and the lead electrode 420, fault detection can be performed in the same manner as described above.

In that case for example, when the heater 40 is energized, the sense voltage, the sense current, etc., will be changed from the condition in the first embodiment, together with the change in the connection position of the sense electrode 440. For that reason, it is desirable to appropriately change the various threshold values described above, such as the threshold value indicated by the dotted line DL6 in FIG. 9(C), in accordance with the changes in the sense voltage, etc.

Second Embodiment

A second embodiment will be described. The hardware configuration of the control apparatus 10 of this embodiment is the same as that of the first embodiment, shown in FIG. 1. On the other hand, the present embodiment differs from the first embodiment with respect to the method of driving the high-side switch 27 and the low-side switch 28.

The control apparatus 10 according to the present embodiment is configured as what is called a "low-side drive type" of control apparatus, whereby the low-side switch 28 is caused to perform switching operations, while the high-side switch 27 is held continuously on. For that reason, with the present embodiment, the heater 40 is turned on while the low-side switch 28 is on, and is turned off while the low-side switch 28 is off.

Figure 21:
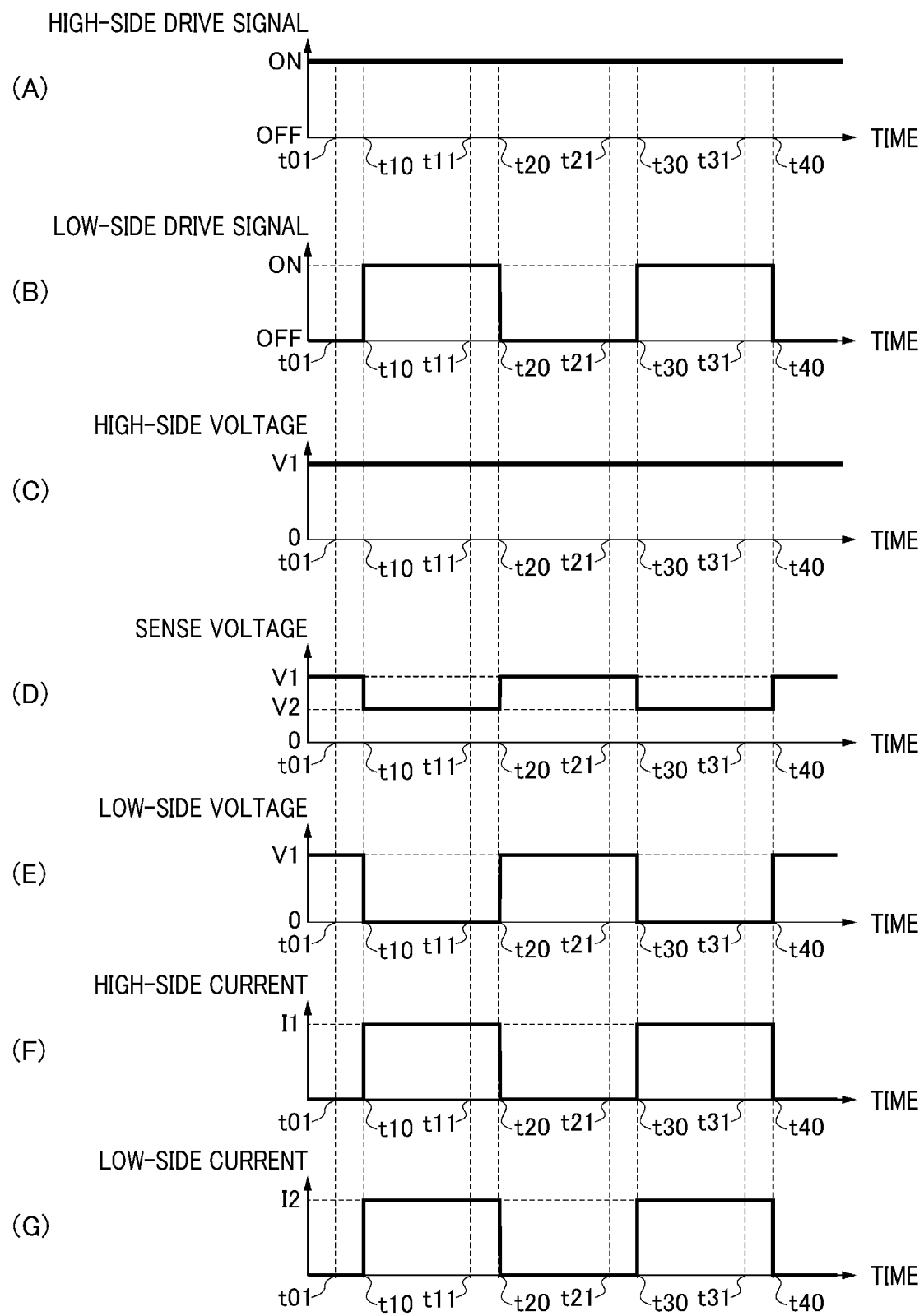
FIG. 21 is a timing diagram showing an example of time-axis variation of high-side voltage, etc., with a second embodiment.

FIG. 21 shows an example of the variation with time of the drive signal, etc., in the same manner as in FIG. 4. In the example of FIG. 21 the drive signal to the low-side switch 28 is turned on during the period from time points t10 to t20 and the period from time points t30 to t40, and the drive signal to the low-side switch 28 is turned off during the other periods. On the other hand, the drive signal to the high-side switch 27 is always on.

As shown in FIG. 21(C), the high-side voltage is always V1, irrespective of the state of the low-side switch 28. V1 is approximately equal to the voltage supplied from the power supply 50.

As shown in FIG. 21(D), the sense voltage is V2 during the periods when the low-side switch 28 is on. During periods when the low-side switch 28 is off, the sense voltage is V1. V2 is a voltage that is lower than V1, described above. The difference between V2 and V1 corresponds to the voltage drop that occurs in the heating electrode 410 and the lead electrode 420.

As shown in FIG. 21(E), the low-side voltage is zero during periods when the low-side switch 28 is on. During periods when the low-side switch 28 is off, the high-side voltage is V1. As described above, V1 is approximately equal to the voltage supplied from the power supply 50.

As shown in FIG. 21(F), the high-side current is I1 during periods when the low-side switch 28 is on. During periods when the low-side switch 28 is off, the high-side current is zero.

As shown in FIG. 21(G), the low-side current is I2 during periods when the low-side switch 28 is on. During periods when the low-side switch 28 is off, the low-side current is zero. If no wiring line fault has occurred and the heater 40 is operating normally, I1 and I2 are identical.

It should be noted that acquisition of the high-side voltage by the high-side voltage acquirer 22 is not performed continuously, but is executed repetitively at specific timings. With the present embodiment, acquisition of the high-side voltage, etc., is performed once in each of the periods in which the low-side switch 28 is on and once in each of the periods in which the low-side switch 28 is off, respectively.

In FIG. 21, the timings at which the values of the high-side voltage, the sense voltage, the low-side voltage, the high-side current, and the low-side current are acquired in the periods when the low-side switch 28 is on are shown as the time points t11 and t31. Each of these is set as a time point at which a predetermined period has elapsed since the low-side switch 28 was turned on.

In FIG. 21, the timings at which the values of the high-side voltage, the sense voltage, the low-side voltage, the high-side current, and the low-side current are acquired during the periods when the low-side switch 28 is off are shown as the time points t01 and t21. Each of these is set as a time point at which a predetermined period has elapsed since the low-side switch 28 was turned off.

The timings at which the current and voltage values are acquired may be changed as appropriate. For example, if the periods during which the low-side switch 28 is on are relatively long, the high-side voltage, etc., may be acquired a plurality of times during each of these periods.

In the example of FIG. 21, the duration of a period in which the low-side switch 28 is on is approximately equal to that of a period in which the low-side switch 28 is off. That is, the duty cycle of the drive signal is 50%. The operation controller 31 can adjust the heat generation amount in the heater 40 by appropriately changing the duty cycle of the drive signal, and can match the temperature of the heat generation section of the heater 40 with a predetermined target temperature. The contents of the processing performed for that purpose are identical to those described referring to FIG. 5 and FIG. 6, and hence specific description will be omitted.

Figure 22:
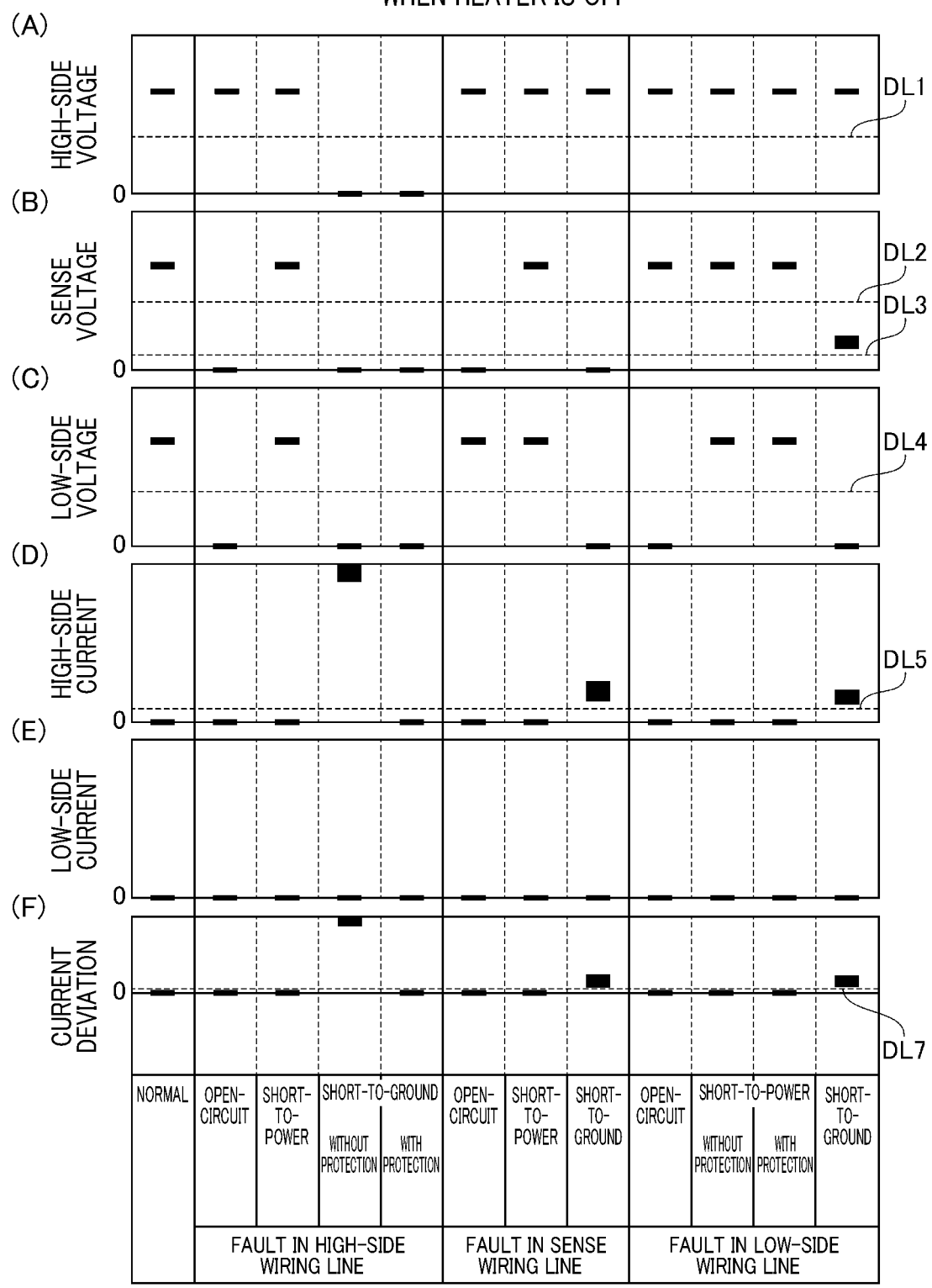
FIG. 22 is a diagram showing a table of values taken by a high-side voltage, etc., for the cases in which respective modes of fault occur in a wiring line.

A fault judgement method by the fault detector 33 of the present embodiment will be described. FIG. 22 shows the ranges of values that can be taken by each of the high-side voltage, etc., when the low-side switch 28 is off, that is, when the energization to the heater 40 is off, with the ranges of values being shown in the same manner for FIG. 9.

As shown in FIG. 22, when the heater 40 is off, during the normal condition, each of the high-side voltage, the sense voltage, the low-side voltage, the high-side current, and the low-side current is approximately identical to the voltage of the power supply 50. Since the current flow path is blocked by the low-side switch 28, the low-side voltage, the high-side current and the low-side current are respectively zero.

If an open-circuit fault occurs in the high-side wiring line 211 when the heater 40 is off, both the sense voltage and the low-side voltage become zero due to the effects of the fault. Since the voltage of the power supply 50 is applied to a part of the wiring that is on the side of the power supply 50, with respect to the open-circuit location, the high-side voltage has the same value as during the normal condition. The low-side voltage, the high-side current and the low-side current all remain at zero, as during the normal condition.

If a short-to-power fault occurs in the high-side wiring line 211 when the heater 40 is off, the values of each of the high-side voltage, the sense voltage, the low-side voltage, the high-side current and the low-side current become the same as those during the normal condition.

If a short-to-ground fault occurs in the high-side wiring line 211 when the heater 40 is off, the values of each of the high-side voltage, the sense voltage, and the low-side voltage become zero due to the effects of the fault. At this time, since the short-to-ground fault location and the grounded portion 29 are at the same potential, the value of the low-side current is zero. On the other hand, since the power supply 50 and the short-to-ground fault location are short-circuited, an overcurrent flows between the two if the high-side switch 27 does not incorporate a protection circuit 272. The value of the high-side current thus becomes higher than that in the normal condition. If the high-side switch 27 incorporates a protection circuit 272, the overcurrent is immediately interrupted. Hence, the value of the high-side current becomes zero.

If an open-circuit fault occurs in the high-side wiring line 221 when the heater 40 is off, the sense voltage acquired by the sense voltage acquirer 23 becomes zero due to the effects of the fault. Both the high-side voltage and the low-side voltage have the same values as in the normal condition. Furthermore, the high-side current and the low-side current become zero, as in the normal condition.

If a short-to-power fault occurs in the high-side wiring line 221 when the heater 40 is off, each of the high-side voltage, the sense voltage, the low-side voltage, the high-side current, and the low-side current take the same values as in the normal condition.

If a short-to-ground fault has occurred in the sense wiring line 221 when the heater 40 is off, the sense voltage and the low-side voltage both become zero due to the effects of the fault. The high-side voltage has the same value as in the normal condition. At this time, a potential difference is generated between the high-side wiring line 211 and the sense wiring line 221, thereby causing a current to flow through the heater 40, and the value of the high-side current becomes higher than in the normal condition. On the other hand, the value of the low-side current remains at zero.

If an open-circuit fault occurs in the low-side wiring line 231 when the heater 40 is off, the low-side voltage becomes zero due to the effects of the fault. The high-side voltage and the sense voltage have the same values as in the normal condition. Furthermore, the high-side current and the low-side current become zero, as in the normal condition.

If a short-to-power fault has occurred in the low-side wiring line 231 when the heater 40 is off, each of the high-side voltage, the sense voltage, the low-side voltage, the high-side current and the low-side current have the same values as in the normal condition. This is true irrespective of whether or not the high-side switch 27, etc., has a protection circuit 272.

If a short-to-ground fault has occurred in the low-side wiring line 231 when the heater 40 is off, the low-side voltage becomes zero due to the effects of the fault. Furthermore, since a current flows between the power supply 50 and the short-to-ground fault location, and a voltage drop occurs in the heater 40, the sense voltage becomes lower than the voltage of the power supply 50 and higher than the low-side voltage. Since as described above a current flows between the power supply 50 and the short-to-ground fault location, the high-side current has a higher value than that in the normal condition. On the other hand, the low-side current remains zero.

As described above, when the heater 40 is off and a fault has occurred, the combination of values taken by the high-side voltage, the sense voltage, the low-side voltage, the high-side current and the low-side current respectively becomes different from the combination of values that are taken in the normal condition, with the different combination of values being dependent on the type and location of the fault. Hence, for each of the wiring lines, based on the high-side voltage, the sense voltage, the low-side voltage, the high-side current and the low-side current, the fault detector 33 of the present embodiment can identify the mode of a fault that has occurred, and the location where the fault has occurred.

The dotted line DL1 shown in FIG. 22(A) is a threshold value that is set for judging whether the high-side voltage has a normal value or an abnormal value, when the heater 40 is off. The threshold value is set lower than the high-side voltage attained during the normal condition, and higher than the high-side voltage attained when a short-to-ground fault has occurred in the high-side wiring line 211. As described hereinafter, the fault detector 33 determines whether the high-side voltage has a normal value or an abnormal value by comparing the acquired high-side voltage with the above threshold value. The "abnormal value" in this case is "LO abnormal", described hereinafter.

The dotted lines DL2 and DL3 shown in FIG. 22(B) indicate threshold values that are set for judging whether the sense voltage has a normal value or an abnormal value, when the heater 40 is off. With this embodiment there are two possible values that can be taken by the sense voltage at the time of a fault, and hence two threshold values are set, for discriminating between these sense voltage values. The threshold value indicated by the dotted line DL2 is set higher than the sense voltage attained when a short-to-ground fault has occurred in the low-side wiring line 231, and lower than the value of the sense voltage during the normal condition. Furthermore, the threshold value indicated by the dotted line DL3 is set as a value that is higher than the sense voltage attained when an open-circuit fault or a short-to-ground fault has occurred in the high-side wiring line 211, or when an open-circuit fault or a short-to-ground fault has occurred in the sense wiring line 221, respectively, and is set lower than the sense voltage that is attained when a short-to-ground fault has occurred in the low-side wiring line 231. The fault detector 33 determines whether the sense voltage has a normal value or an abnormal value by comparing the acquired sense voltage with these two threshold values. The "abnormal value" in this case includes two types, "LO abnormal 1" and "LO abnormal 2", described hereinafter.

The dotted line DL4 shown in FIG. 22(C) indicates a threshold value that is set for judging whether the low-side voltage has a normal value or an abnormal value, when the heater 40 is off. The threshold value is set at a value lower than the low-side voltage that is attained during the normal condition, and higher than the low-side voltage attained when an open-circuit fault or a short-to-ground fault has occurred in the high-side wiring line 211, and higher than the low-side voltage attained when a short-to-ground fault has occurred in the sense wiring line 221, and is set at a value higher than the respective low-side voltages that are attained when an open-circuit fault or a short-to-ground fault has occurred in the low-side wiring line 231. The fault detector 33 determines whether the low-side voltage has a normal value or an abnormal value by comparing the acquired low-side voltage with the above threshold value. The "abnormal value" in this case is "LO abnormal", described hereinafter.

The dotted line DL5 shown in FIG. 22(D) is a threshold value that is set for judging whether the high-side current has a normal value or an abnormal value when the heater 40 is off. The threshold value is set at a value is higher than the high-side current that flows in the normal condition, and is lower than the value of the high-side current attained when a short-to-ground fault has occurred in the high-side wiring line 211 and the high-side switch 27 does not incorporate a protection circuit 272, and lower than the respective values attained by the high-side current when a short-to-ground fault has occurred in the sensor wiring line 221 or in the low-side wiring line 231. The fault detector 33 determines whether the high-side current has a normal value or an abnormal value by comparing the acquired value of high-side current with the above threshold value. The "abnormal value" in this case is "HI abnormal", described hereinafter.

Irrespective of whether or not a fault has occurred, the value of the low-side current is always the same as in normal operation. For that reason, a dotted line indicating the threshold value of the low-side current judgement is not shown in FIG. 22(E).

The dotted line DL7 shown in FIG. 22(F) is a threshold value that is set for judging whether the current deviation has a normal value or an abnormal value, when the heater 40 is off. The threshold value is set higher than the current deviation that is attained during the normal condition, and lower than the respective values attained by the current deviation when a short-to-ground fault has occurred in the high-side wiring line 211 and the high-side switch 27 is not provided with a protection circuit 272, or when a short-to-ground fault has occurred in the sense wiring line 221 or in the low-side wiring line 231. The fault detector 33 determines whether the current deviation has a normal value or an abnormal value by comparing the calculated current deviation with the threshold value. The "abnormal value" in this case is "HI abnormal", described hereinafter.

Figure 23:
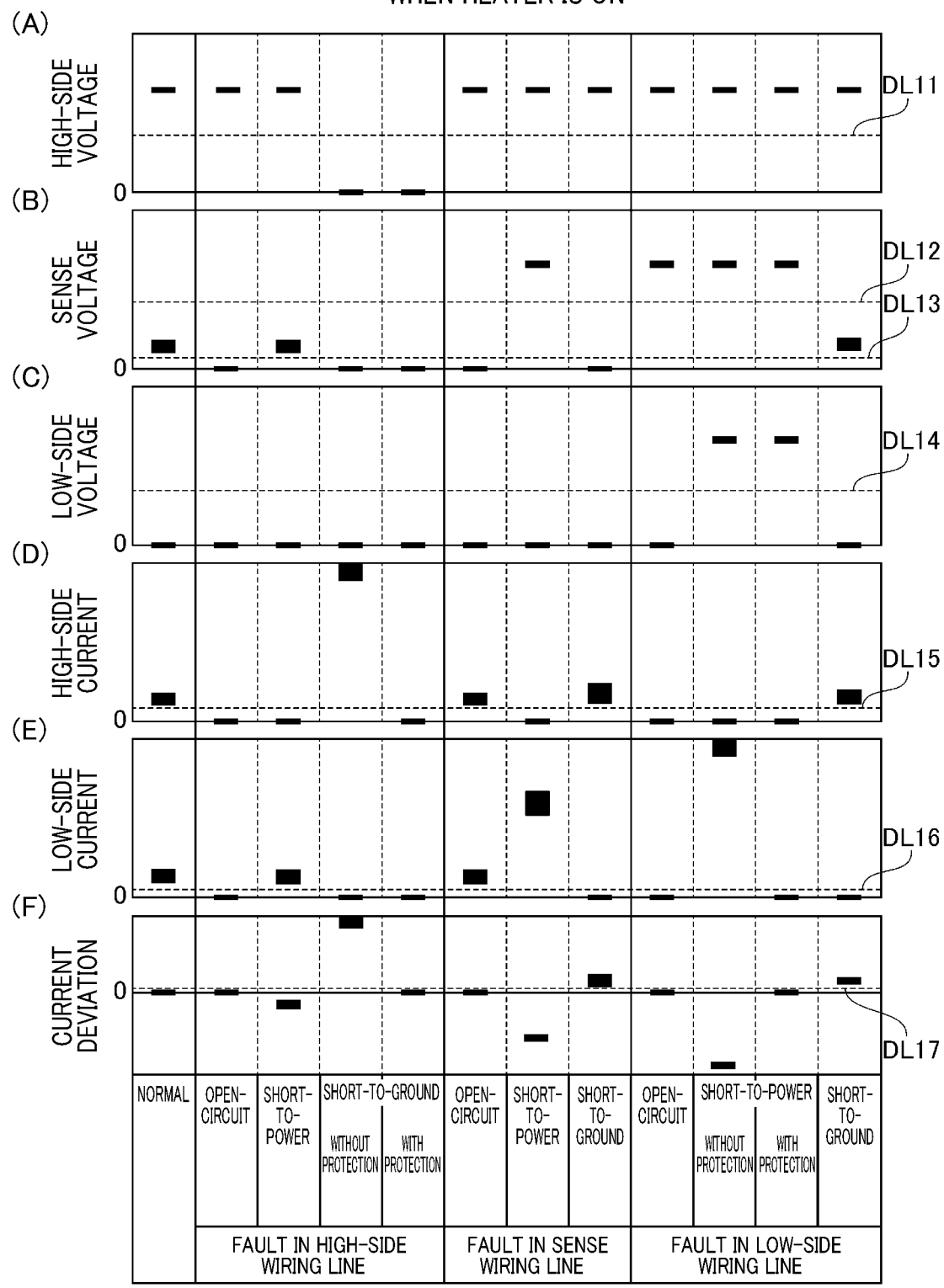
FIG. 23 is a diagram showing a table of values taken by a high-side voltage, etc., for the cases in which respective modes of fault occur in a wiring line.

FIG. 23 shows the respective ranges of values that can be taken by the high-side voltage, etc., when the heater 40 is turned on, that is, when the energization to the heater 40 is turned on, with the ranges of values being shown by the same method as for FIG. 10.

As shown in FIG. 23, when the heater 40 is on during the normal condition, the high-side voltage is greater than zero and is substantially equal to the voltage of the power supply 50. The sense voltage is also greater than zero. However, since a current flows through the heater 40 and a voltage drop occurs, the sense voltage becomes lower than the voltage of the power supply 50. Since the low-side wiring line 231 is connected to the grounded portion 29, the low-side voltage is zero. Since a current flows through the heater 40, the high-side current and the low-side current are both greater than zero, and are identical.

If the heater 40 is on and an open-circuit fault occurs in the high-side wiring line 211, both the sense voltage and the low-side voltage become zero, due to the effects of the fault. Since the voltage of the power supply 50 is applied to a portion of the wiring line that is on the side of the power supply 50, with respect to the open-circuit location, the high-side voltage has the same value as during the normal condition. Since the path through which current flows is interrupted by the break, each of the low-side voltage, the high-side current, and the low-side current become zero.

If the heater 40 is on and a short-to-power fault has occurred in the high-side wiring line 211, the voltage of the power supply 50 is applied to the high-side wiring line 211, as occurs during the normal condition. For that reason, each of the high-side voltage, the sense voltage, and the low-side voltage has the same value as that during the normal condition. At this time a current flows through the heater 40, but the value of the high-side current is zero, since the fault location and the power supply 50 are at the same potential. On the other hand, since a current flows between the short-to-power fault location and the grounded portion 29 in the same manner as during the normal condition, the value of the low-side current is the same as that during the normal condition.

If the heater 40 is on and a short-to-ground fault has occurred in the high-side wiring line 211, each of the high-side voltage, the sense voltage, and the low-side voltage become zero, due to the effects of the fault. Since the power supply 50 and the short-to-ground fault location are short-circuited, an overcurrent flows between them if the high-side switch 27 does not incorporate a protection circuit 272. For that reason the value of the high-side current becomes higher than that during the normal condition. If the high-side switch 27 incorporates a protection circuit 272, the overcurrent is immediately interrupted. Hence the value of the high-side current becomes zero. Since the short-to-ground fault location and the grounded portion 29 are at the same potential, the value of the low-side current is zero.

If the heater 40 is on and an open-circuit fault has occurred in the sense wiring line 221, the high-side voltage and the low-side voltage each has the same value as that during the normal condition. On the other hand since the part of the wiring line that is on the side of the sense voltage acquirer 23, with respect to the open-circuit portion, is connected to ground via the voltage divider circuit of the sense voltage acquirer 23, the value of the sense voltage is zero. The open-circuit fault of the sense wiring line 221 does not affect the current that flows through the heater 40. For that reason, the values of the high-side current and the low-side current are both the same as during the normal condition.

If the heater 40 is on and a short-to-power fault has occurred in the sense wiring line 221, the value of the sense voltage becomes higher than normal, due to the effects of the fault. Both the high-side voltage value and the low-side voltage value are the same as in the normal condition. At this time, since the short-to-power fault location and the power supply 50 are at the same potential, no current flows between them, and hence the value of the high-side current is zero. On the other hand the value of the low-side current is higher than that in the normal condition, since the sense voltage becomes increased due to the short-to-power fault.

If the heater 40 is on and a short-to-ground fault has occurred in the sense wiring line 221, the sense voltage becomes zero due to the effects of the fault. Both the high-side voltage value and the low-side voltage value are the same as in the normal condition. At this time, since the sense voltage is lower than normal, the value of the high-side current is slightly higher than normal. Moreover the short-to-ground fault location and the grounded portion 29 are at the same potential, and hence the value of the low-side current is zero.

If the heater 40 is on and an open-circuit fault has occurred in the low-side wiring line 231, the potential of the wiring portion that is on the power supply 50 side, with respect to the open-circuit location, becomes the same as the potential of the power supply 50. For that reason, the high-side voltage has the same value as during the normal condition, while the sense voltage has a higher value than in the normal condition. On the other hand the value of the low-side voltage is zero. Furthermore, since the current flow is interrupted by the break, the values of the high-side current and the low-side current both become zero.

If the heater 40 is on and a short-to-power fault has occurred in the low-side wiring line 231, the potential of the part of the wiring line that is on the power supply 50 side, with respect to the short-to-power fault location, becomes the same as the potential of the power supply 50. For that reason, the high-side voltage has the same value as during the normal condition, while the sense voltage and the low-side voltage have higher values than during the normal condition. At this time, since the short-to-power fault location and the power supply 50 are at the same potential, no current flows between them, and hence the value of the high-side current is zero. On the other hand since the short-to-power fault location and the grounded portion 29 are short-circuited, an overcurrent flows between them, if the low-side switch 28 does not include a protection circuit 272. For that reason, the value of the low-side current becomes higher than that in the normal condition. If the low-side switch 28 includes a protection circuit 272, the overcurrent is immediately interrupted. Hence the value of the low-side current becomes zero.

If the heater 40 is on and a short-to-ground fault has occurred in the low-side wiring line 231, the low-side wiring line 231 has the same potential as that of the grounded portion 29, as occurs during the normal condition. For that reason, each of the high-side voltage, the sense voltage and the low-side voltage has the same value as during the normal condition. At this time a current flows through the heater 40, but since the short-to-ground fault location and the grounded portion 29 are at the same potential, the value of the low-side current is zero. On the other hand since a current flows between the power supply 50 and the short-to-ground fault location, as occurs in the normal condition, the value of the high-side current is the same as that in the normal condition.

As described above, when the heater 40 is on and a fault has occurred, the combination of values of the high-side voltage, the sense voltage, the low-side voltage, the high-side current and the low-side current become different from the combination of values in the normal condition, with the different combination of values being dependent on the type and location of the fault. Hence, for each of the wiring lines, based on the high-side voltage, the sense voltage, the low-side voltage, the high-side current and the low-side current, the fault detector 33 of the present embodiment can identify the mode of a fault that has occurred, and the location where the fault has occurred.

The dotted line DL11 shown in FIG. 23(A) is a threshold value that is set for judging whether the high-side voltage has a normal value or an abnormal value, when the heater 40 is on. The threshold value is set lower than the high-side voltage attained during the normal condition, and higher than the high-side voltage attained when a short-to-ground fault has occurred in the high-side wiring line 211. The fault detector 33 determines whether the high-side voltage has a normal value or an abnormal value by comparing the acquired high-side voltage with the above threshold value. The "abnormal value" in this case is "LO abnormal", described hereinafter.

The dotted lines DL12 and DL13 shown in FIG. 23(B) are threshold values that are set for determining whether the sense voltage has a normal value or an abnormal value, when the heater 40 is on. With this embodiment there are two possible values of the sense voltage at the time of a fault, and hence two threshold values are set, for distinguishing between the possible values. The threshold value indicated by the dotted line DL12 is set lower than the value attained by the sense voltage when a short-to-power fault has occurred in the sense wiring line 221 or in the low-side wiring line 231, or when an open-circuit fault has occurred in the low-side wiring line 231, and is set higher than the value attained by the sense voltage during the normal condition.

Furthermore, the threshold value indicated by the dotted line DL13 is set lower than the value attained by the sense voltage during the normal condition, and is set higher than the value attained by the sense voltage when an open-circuit fault or a short-to-ground fault has occurred in the high-side wiring line 211, or when an open-circuit fault or a short-to-ground fault has occurred in the sense wiring line 221. The fault detector 33 determines whether the sense voltage has a normal value or an abnormal value by comparing the acquired sense voltage with these two threshold values. The "abnormal value" in this case includes two types of abnormality, "LO abnormal" and a "HI abnormal", described hereinafter.

The dotted line DL14 shown in FIG. 23(C) is a threshold value that is set for judging whether the low-side voltage has a normal value or an abnormal value, when the heater 40 is on. This threshold value is set higher than the value attained by the low-side voltage during the normal condition, and is set lower than the value attained by the low-side voltage when a short-to-power fault has occurred in the low-side wiring line 231. The fault detector 33 determines whether the low-side voltage has a normal value or an abnormal value by comparing the acquired low-side voltage with the above threshold value. The "abnormal value" in this case is "HI abnormal", described hereinafter.

The dotted line DL15 shown in FIG. 23(D) is a threshold value that is set for judging whether the high-side current has a normal value or an abnormal value, when the heater 40 is on. The threshold value is set lower than the value attained by the high-side current during the normal condition, and is set higher than the value attained by the high-side current when an open-circuit fault or a short-to-power fault has occurred in the high-side wiring line 211 and the high-side switch 27 incorporates a protection circuit 272, and higher than the value attained by the high-side current when a short-to-power fault has occurred in the sense wiring line 221 or when an open-circuit fault or a short-to-power fault has occurred in the low-side wiring line 231. The fault detector 33 determines whether the high-side current has a normal value or an abnormal value by comparing the acquired high-side current with the above threshold value. The "abnormal value" in this case is "LO abnormal", described hereinafter.

The dotted line DL16 shown in FIG. 23(E) is a threshold value that is set for judging whether the low-side current has a normal value or an abnormal value, when the heater 40 is on. The threshold is set at a lower value than that of the low-side current during the normal condition, and is set higher than the value attained by the low-side current when an open-circuit fault or a short-to-ground fault has occurred in the high-side wiring line 211, or when a short-to-ground fault has occurred in the sense wiring line 221, and higher than the value attained by the low-side current when a short-to-power fault has occurred in the low-side wiring line 231 and the high-side switch 27 incorporates a protection circuit 272, or when an open-circuit fault or a short-to-ground fault has occurred in the low-side wiring line 231, respectively. The fault detector 33 determines whether the low-side current has a normal value or an abnormal value by comparing the acquired value of low-side current with the threshold value. The "abnormal value" in this case is "LO abnormal", described hereinafter.

The dotted line DL17 shown in FIG. 23(F) is a threshold that is set for determining whether the current deviation has a normal value or an abnormal value, when the heater 40 is on. The threshold is set at a higher value than that of the current deviation during the normal condition, and is set lower than the value attained by the current deviation when a short-to-ground fault has occurred in the high-side wiring line 211 and the high-side switch 27 does not incorporate a protection circuit 272, and lower than the value attained by the current deviation when a short-to-ground fault has occurred in the sense wiring line 221 or in the low-side wiring line 231. The fault detector 33 determines whether the current deviation has a normal value or an abnormal value by comparing the calculated current deviation with the threshold value. The "abnormal value" in this case is "HI abnormal", described hereinafter.

A specific method of fault detection performed by the fault detector 33 will be described. With the present embodiment, fault detection is performed by the fault detector 33 in executing the processing sequence shown in FIG. 11. This embodiment differs from the first embodiment with respect to the contents of specific processing that is executed in steps S23, S24, S26, and S27 of FIG. 11.

In the following, only points of difference from the first embodiment will be described. In step S23, following step S22 in FIG. 11, the values acquired in step S22 are compared with the threshold values described above referring to FIG. 22.

Figure 24:
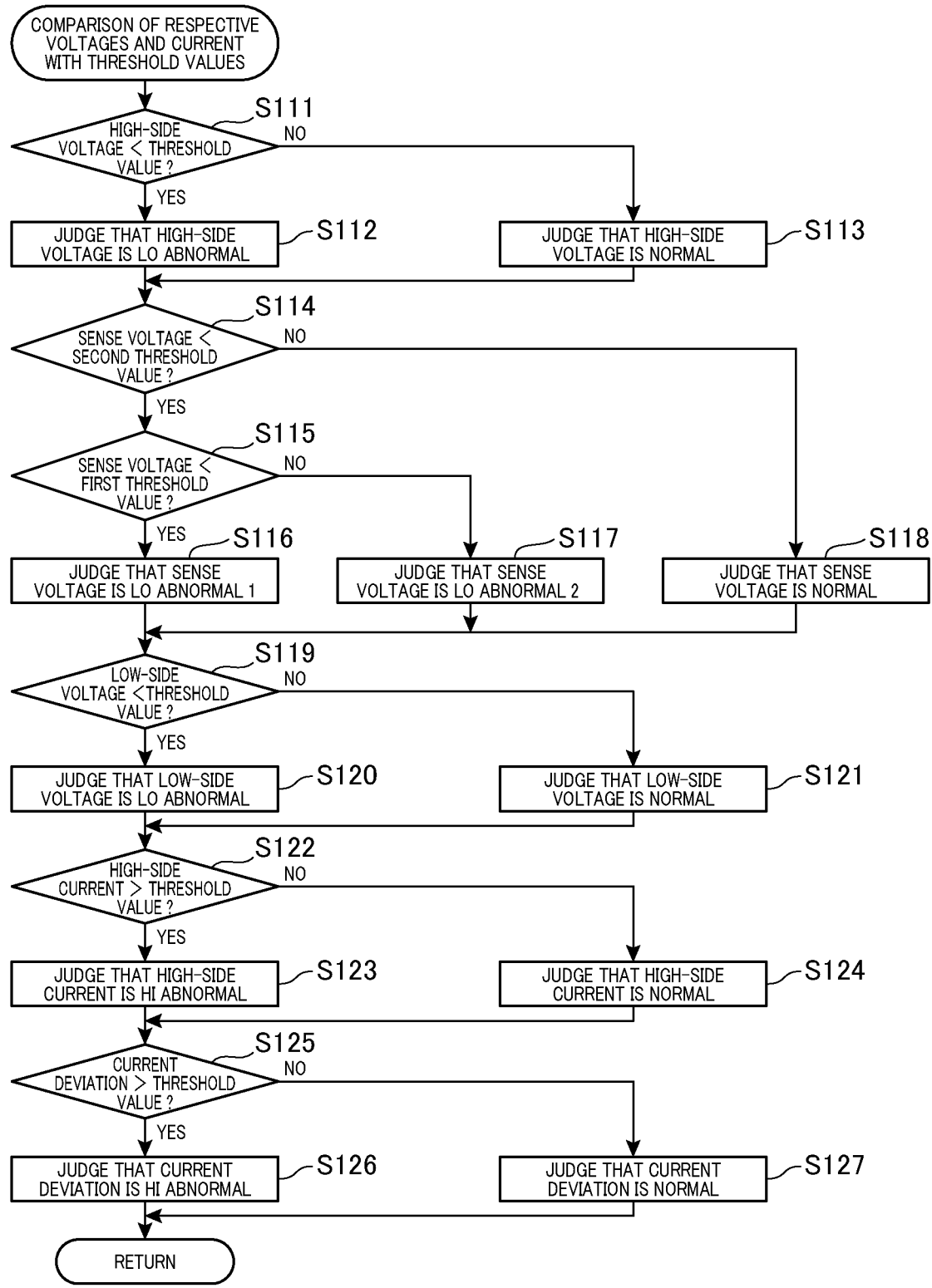
FIG. 24 is a flow diagram showing a flow of processing executed by the control apparatus.

The flow diagram shown in FIG. 24 shows a specific flow of processing that is executed by the present embodiment in step S23 of FIG. 11. In the first step S111 of the processing, a decision is made as to whether the high-side voltage is lower than a threshold value. Here, the "threshold value" is that indicated by the dotted line DL1 in FIG. 22. If the high-side voltage is lower than the threshold value, operation proceeds to step S112. In step S112, it is determined that the high-side voltage is "LO abnormal". Here, "LO abnormal" indicates that the high-side voltage has an abnormal value, and specifically indicates that the value is lower than the normal value. Following step S112, operation proceeds to step S114.

If it is determined in step S111 that the high-side voltage is equal to or higher than the threshold value, operation proceeds to step S113. In step S113, it is determined that the high-side voltage has a normal value. Following step S113, operation proceeds to step S114.

In step S114, a decision is made as to whether the sense voltage is lower than a second threshold value. Here, the "second threshold value" is that indicated by the dotted line DL2 in FIG. 22. If the sense voltage is lower than the second threshold value, operation proceeds to step S115.

In step S115 a decision is made as to whether the sense voltage is lower than a first threshold value. Here, the "first threshold value" is that indicated by the dotted line DL3 in FIG. 22. If the sense voltage is lower than the first threshold value, operation proceeds to step S116. In step S116 it is determined that the sense voltage is "LO abnormal 1". Here, "LO abnormal 1" indicates that the sense voltage has an abnormal value, and specifically indicates that the sense voltage is lower than the normal value or the first threshold value. Following step S116, operation proceeds to step S119.

If it is determined in step S115 that the sense voltage is equal to or higher than the first threshold value, operation proceeds to step S117. In step S117 it is determined that the sense voltage is "LO abnormal 2". Here, "LO abnormal 2" indicates that the sense voltage has an abnormal value, specifically, that it is equal to or higher than the first threshold value and lower than the normal value and the second threshold value. Following step S117, operation proceeds to step S119.

If it is determined in step S114 that the sense voltage is equal to or higher than the second threshold value, operation proceeds to step S118. In step S118 it is determined that the sense voltage has a normal value. Following step S118, operation proceeds to step S119.

In step S119, a decision is made as to whether the low-side voltage is lower than a threshold value. Here, the "threshold value" is that indicated by the dotted line DL4 in FIG. 22. If the low-side voltage is lower than the threshold value, operation proceeds to step S120. In step S120, it is determined that the low-side voltage is "LO abnormal". Here, "LO abnormal" indicates that the low-side voltage has an abnormal value, and specifically indicates that the value is lower than the normal value. Following step S120, operation proceeds to step S122.

If it is determined in step S119 that the low-side voltage is equal to or higher than the threshold value, operation proceeds to step S121. In step S121, it is determined that the low-side voltage has a normal value. Following step S121, operation proceeds to step S122.

In step S122 a decision is made as to whether the high-side current is higher than a threshold value. Here, the "threshold value" is that indicated by the dotted line DL5 in FIG. 22. If the high-side current is higher than the threshold value, operation proceeds to step S123. In step S123, it is determined that the high-side current is "HI abnormal". Here, "HI abnormal" indicates that the high-side current has an abnormal value, and specifically indicates that the value is higher than the normal value. Following step S123, operation proceeds to step S125.

If it is determined in step S122 that the high-side current is equal to or lower than the threshold value, operation proceeds to step S124. In step S124, it is determined that the high-side current has a normal value. Following step S124, operation proceeds to step S125.

In step S125, after the current deviation has been calculated by subtracting the low-side current value from the high-side current value, a decision is made as to whether the current deviation is higher than a threshold value. Here, the "threshold value" is that indicated by the dotted line DL7 in FIG. 22. If the current deviation is higher than the threshold value, operation proceeds to step S126. In step S126, it is determined that the current deviation is "HI abnormal". Here, "HI abnormal" indicates that the current deviation has an abnormal value, and specifically indicates that the current deviation is higher than the normal value. Following step S126, the processing sequence shown in FIG. 24 is terminated, and operation returns to the processing of FIG. 11.

If it is determined in step S125 that the current deviation is equal to or less than the threshold value, operation proceeds to step S127. In step S127, it is determined that the current deviation has a normal value. Following step S127, the processing sequence shown in FIG. 24 is terminated, and operation returns to the processing of FIG. 11.

In step S23 of FIG. 11 as described above, the fault detector 33 individually sets threshold values for each of respective parameters consisting of the high-side voltage, the sense voltage, the low-side voltage, the high-side current, the low-side current and the current deviation. By comparing each parameter with the threshold value thus determined, a decision is made as to whether the parameter has a normal value or an abnormal value. Hence when the processing of step S23 is completed, a condition has been reached in which a determination has been made for each of the parameters, i.e., the high-side voltage etc., as to whether the parameter has a normal value or an abnormal value.

In step S24 following step S23, based on the respective judgement results, a decision is made for each of the wiring lines as to whether there is a fault in the wiring line, when the energization to the heater 40 is off. The judgement method will be described referring to FIG. 26.

In the upper part of FIG. 26, that is, the section indicated as "when the heater is off", the relationships are shown between the judgement results obtained for each of the parameters and the mode of a fault that has occurred at that time, for the condition in which the energization of the heater 40 is off.

FIG. 26 shows that, for example, when an open-circuit fault occurs in the high-side wiring line 211, the sense voltage becomes LO abnormal 1, the low-side voltage becomes LO abnormal, and other parameters have normal values. In other words, this shows that when the sense voltage is LO abnormal 1, the low-side voltage is LO abnormal and the other parameters have normal values, it can be judged that an open-circuit fault has occurred in the high-side wiring line 211. Thus, based on the combination of the judgement results obtained for the respective parameters, it is possible to identify both the mode of a fault that has occurred and the location where the fault has occurred.

Hence in step S24 of FIG. 11 the mode of a fault that has occurred, and the location where the fault has occurred, are identified in accordance with the combination of judgement results that have been obtained in step S23, that is, the combination of judgement results obtained for each of the parameters as to whether the value of the parameter is normal or abnormal.

As shown in FIG. 26, even if a short-to-power fault has occurred in any one of the wiring lines, the judgement results will indicate that all of the parameters have normal values. For that reason it is not possible to judge that a short-to-power fault has occurred, when energization to the heater 40 is off.

However even if a short-to-power fault occurs when the heater 40 is turned off, since the heater 40 is not energized and an overcurrent does not flow, as in the normal condition, there is no particular problem, even if the fault cannot be identified.

On the other hand, if a short-to-ground fault occurs in any one of the wiring lines when the heater 40 is turned off, unexpected generation of heat may occur in the heater 40, or an overcurrent may flow in a part of the apparatus. If a short-to-ground fault occurs in any one of the wiring lines, the fault detector 33 can identify that occurrence, and the location where the fault has occurred. Hence it is possible, for example, to take countermeasures such as switching off the high-side switch 27, for safety.

When energization to the heater 40 is off, both the mode of a fault and the location of the fault occurrence can be identified, by comparing the judgement results obtained for each of the parameters consisting of the high-side voltage, the sense voltage, the low-side voltage, the high-side current, the low-side current and the current deviation with FIG. 26. However, it is also possible to perform fault detection by comparing only a part of the judgement results with FIG. 14, instead of comparing all of the judgement results. Such a fault detection method is described hereinafter.

In step S26 following step S25 in FIG. 11, the respective values acquired in step S25 are compared with the threshold values described above referring to FIG. 23, and processing is executed for judging whether each value is normal value or abnormal.

Figure 25:
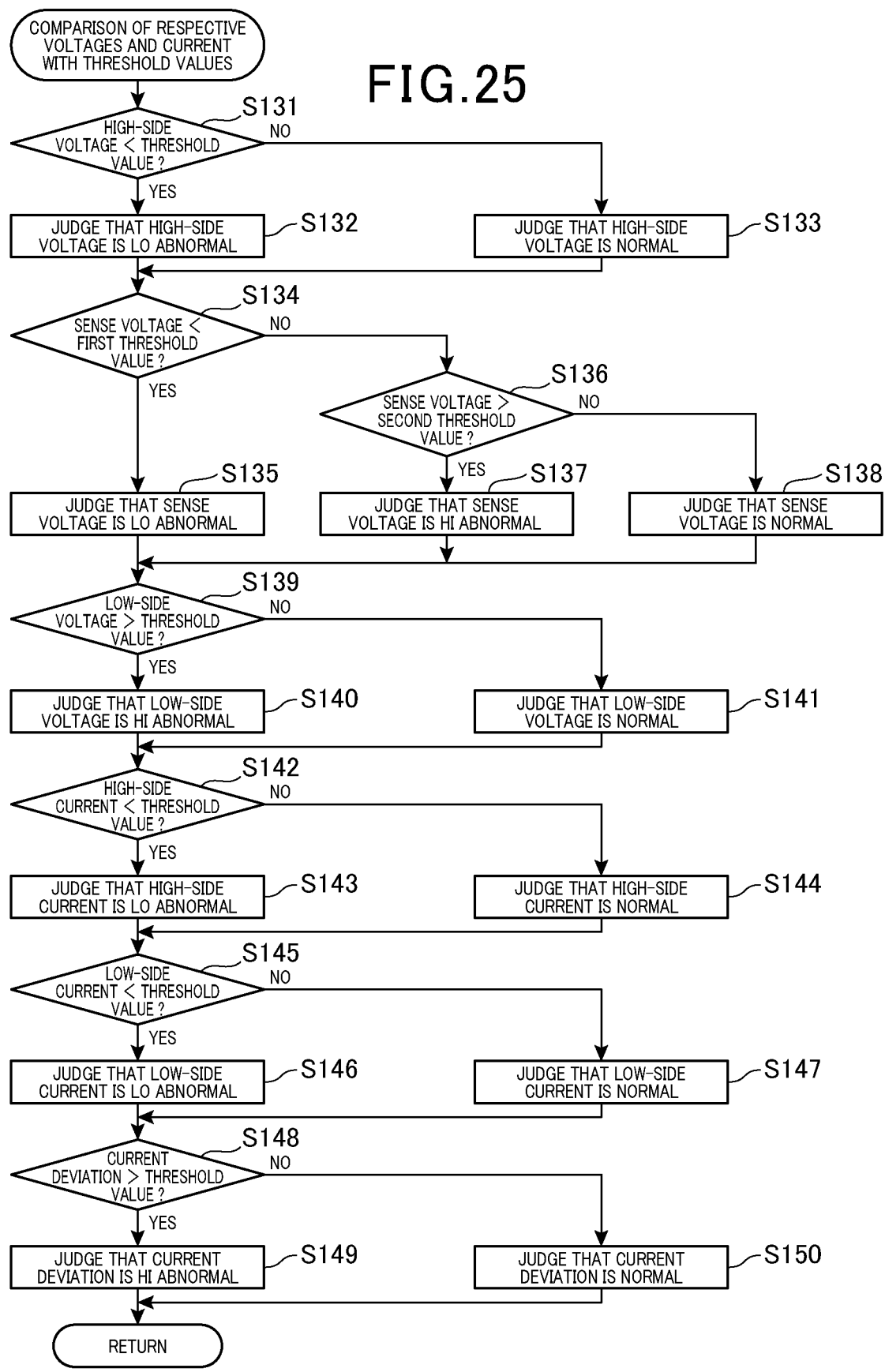
FIG. 25 is a flow diagram showing a flow of processing executed by the control apparatus.

The flowchart in FIG. 25 shows a specific flow of processing executed in step S26 of FIG. 11 with the present embodiment. In the first step S131 of the processing, a decision is made as to whether the high-side voltage is lower than a threshold value. Here, the "threshold value" is that indicated by the dotted line DL11 in FIG. 23. If the high-side voltage is lower than the threshold value, operation proceeds to step S132. In step S132, it is determined that the high-side voltage is "LO abnormal". Here, "LO abnormal" indicates that the high-side voltage has an abnormal value, and specifically indicates that the value is lower than the normal value. Following step S132, operation proceeds to step S134.

If it is determined in step S131 that the high-side voltage is equal to or higher than the threshold value, operation proceeds to step S133. In step S133, it is determined that the high-side voltage has a normal value. Following step S133, operation proceeds to step S134.

In step S134, a decision is made as to whether the sense voltage is lower than a first threshold value. Here, the "first threshold value" is that indicated by the dotted line DL13 in FIG. 23. If the sense voltage is lower than the first threshold value, operation proceeds to step S135. In step S135 it is determined that the sense voltage is "LO abnormal". Here, "LO abnormal" indicates that the sense voltage has an abnormal value, and specifically indicates that it is lower than the normal value. Following step S135, operation proceeds to step S139.

If it is determined in step S134 that the sense voltage is equal to or higher than the first threshold value, operation proceeds to step S136. In step S136, a decision is made as to whether the sense voltage is higher than a second threshold value. Here, the "second threshold value" is that indicated by the dotted line DL12 in FIG. 23. If the sense voltage is higher than the second threshold value, operation proceeds to step S137. In step S137, it is determined that the sense voltage is "HI abnormal". Here, "HI abnormal" indicates that the sense voltage has an abnormal value, and specifically indicates that it is higher than the normal value. Following step S137, operation proceeds to step S139.

If it is determined in step S136 that the sense voltage is equal to or lower than the second threshold value, operation proceeds to step S138. In step S138, it is determined that the sense voltage has a normal value. Following step S138, operation proceeds to step S139.

In step S139 a decision is made as to whether the low-side voltage is higher than a threshold value. Here, the "threshold value" is that indicated by the dotted line DL14 in FIG. 23. If the low-side voltage is higher than the threshold value, operation proceeds to step S140. In step S140, it is determined that the low-side voltage is "HI abnormal". Here, "HI abnormal" indicates that the low-side voltage has an abnormal value, and specifically indicates that the value is higher than the normal value. Following step S140, operation proceeds to step S142.

If it is determined in step S139 that the low-side voltage is equal to or lower than the threshold value, operation proceeds to step S141. In step S141, it is determined that the low-side voltage has a normal value. Following step S141, operation proceeds to step S142.

In step S142 a decision is made as to whether the high-side current is lower than a threshold value. Here, the "threshold value" is that indicated by the dotted line DL15 in FIG. 23. If the high-side current is lower than the threshold value, operation proceeds to step S143. In step S143, it is determined that the high-side current is "LO abnormal". Here, "LO abnormal" indicates that the high-side current has an abnormal value, and specifically indicates that the value is lower than the normal value. Following step S143, operation proceeds to step S145.

If it is determined in step S142 that the high-side current is equal to or greater than the threshold value, operation proceeds to step S144. In step S144, it is determined that the high-side current has a normal value. Following step S144, operation proceeds to step S145.

In step S145 a decision is made as to whether the low-side current is lower than a threshold value. Here, the "threshold value" is that indicated by the dotted line DL16 in FIG. 23. If the low-side current is lower than the threshold value, operation proceeds to step S146. In step S146, it is determined that the low-side current is "LO abnormal". Here, "LO abnormal" indicates that the low-side current has an abnormal value, and specifically indicates that the value is lower than the normal value. Following step S146, operation proceeds to step S148.

If it is determined in step S145 that the low-side current is equal to or greater than the threshold value, operation proceeds to step S147. In step S147, it is determined that the low-side current has a normal value. Following step S147, operation proceeds to step S148.

In step S148, after the current deviation has been calculated by subtracting the value of the low-side current from the value of the high-side current, a decision is made as to whether the current deviation is higher than a threshold value. Here, the "threshold value" is that indicated by the dotted line DL17 in FIG. 23. If the current deviation is higher than the threshold value, operation proceeds to step S149. In step S149 it is determined that the current deviation is "HI abnormal". Here, "HI abnormal" indicates that the current deviation has an abnormal value, and specifically indicates that the current deviation is higher than the normal value. Following step S149, the processing sequence shown in FIG. 25 is terminated, and operation returns to the processing of FIG. 11.

If it is determined in step S148 that the current deviation is equal to or less than the threshold value, operation proceeds to step S150. In step S150, it is determined that the current deviation has a normal value. Following step S150, the processing sequence shown in FIG. 25 is terminated, and operation returns to the processing of FIG. 11.

In step S26 of FIG. 11 as described above, the fault detector 33 individually sets threshold values for each of respective parameters consisting of the high-side voltage, the sense voltage, the low-side voltage, the high-side current, the low-side current and the current deviation. By comparing each parameter with the threshold value thus set, a decision is made as to whether the parameter has a normal value or an abnormal value. Hence when the processing of step S26 is completed, a condition has been reached in which a determination has been made for each of the parameters, i.e., the high-side voltage etc., as to whether the parameter has a normal value or an abnormal value.

In step S27 following step S26, based on the respective above-described judgement results, a decision is made as to whether there is a fault in any the wiring lines, when the energization to the heater 40 is on. The judgement method will be described referring to FIG. 26.

In the lower part of FIG. 26, that is, the section indicated as "when the heater is on", the relationships are shown between the judgement results obtained for each of the parameters and the mode of a fault that has occurred at that time, for the condition in which the energization of the heater 40 is on.

FIG. 26 shows that, for example when an open-circuit fault occurs in the high-side wiring line 211, the sense voltage becomes LO abnormal, the high-side voltage becomes LO abnormal, the low-side voltage becomes LO abnormal, and the other parameters have normal values. In other words, this shows that when the sense voltage is LO abnormal, the high-side voltage is LO abnormal, the low-side voltage is LO abnormal, and the other parameters have normal values, it can be judged that an open-circuit fault has occurred in the high-side wiring line 211. In that way, based on the combination of the judgement results obtained for the respective parameters, it is possible to identify both the mode of a fault that has occurred and the location where the fault has occurred.

In step S27 of FIG. 11 the mode of a fault that has occurred, and the location where the fault occurred, are identified in accordance with the combination of judgement results that have been obtained in step S26, that is, the combination of judgement results obtained for each of the parameters as to whether the value of the parameter is normal or abnormal.

As shown in FIG. 26, when energization to the heater 40 is on, there is a one-to-one correspondence between the combination of judgement results obtained for the respective parameters and the mode and location of a fault. Hence if the judgement results obtained for each of the parameters consisting of the high-side voltage, the sense voltage, the low-side voltage, the high-side current, the low-side current and the current deviation are compared with FIG. 26, both the mode and the occurrence location of a fault can be identified. However, it is also possible to detect a fault by comparing only a part of the judgement results with FIG. 26, instead of comparing all of the judgement results. Such a fault detection method is described hereinafter.

The case can be envisaged in which the control apparatus 10 does not include the sense voltage acquirer 23, and in which the judgement of step S26 of FIG. 11 is executed only for the high-side voltage, the low-side voltage, the high-side current, the low-side current, and the current deviation. In that case, the combination of judgement results that is obtained when an open-circuit fault occurs in the high-side wiring line 211 completely matches the combination of judgement results obtained when an open-circuit fault occurs in the low-side wiring line 231. Hence in such a case, although it can be determined that an open-circuit fault has occurred, it is not possible to determine which of the high-side wiring line 211 and the low-side wiring line 231 has the open-circuit fault.

However, the control apparatus 10 of the present embodiment includes the sense voltage acquirer 23, and fault detection is performed based on results that include the judgement result obtained with respect to the acquired value of sense voltage. As a result, the combination of judgement results obtained when an open-circuit fault occurs in the high-side wiring line 211 and the combination of judgement results obtained when an open-circuit fault occurs in the low-side wiring line 231 are respectively different, so that it is possible to determine the one of these wiring lines in which the fault has occurred.

Figure 27:
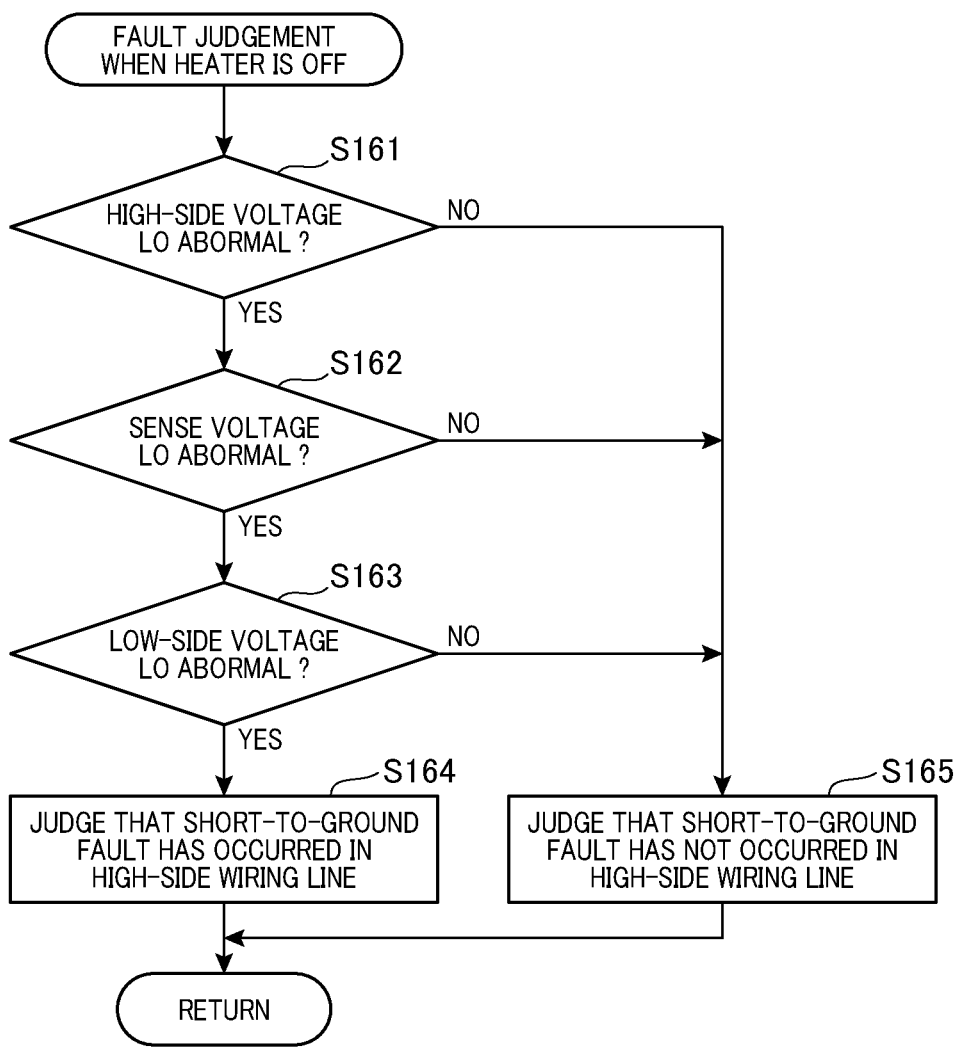
FIG. 27 is a flow diagram showing a flow of processing executed by the control apparatus.

An example of a method of detecting a fault by comparing only a part of the judgement results with FIG. 26, instead of the judgement results obtained for all of the high-side voltage, etc., will be described. The processing sequence shown in FIG. 27 is executed for judging whether a short-to-power fault has occurred in the high-side wiring line 211, when the energization of the heater 40 is off. This processing is performed following the processing of step S23 in FIG. 11, for example.

In the first step S161 of the processing, a decision is made as to whether the high-side voltage is LO abnormal. If the high-side voltage is LO abnormal, operation proceeds to step S162. In step S162 a decision is made as to whether the sense voltage is LO abnormal 1. If the sense voltage is LO abnormal 1, operation proceeds to step S163. In step S163 a decision is made as to whether the low-side voltage is LO abnormal. If the low-side voltage is LO abnormal, operation proceeds to step S164. In step S164 it is determined that a short-to-ground fault has occurred in the high-side wiring line 211.

If it is determined that the high-side voltage is not LO abnormal in step S161, that the sense voltage is not LO abnormal 1 in step S162, and that the low-side voltage is not LO abnormal in step S163, operation proceeds to step S165. In step S165, it is determined that no short-to-ground fault has occurred in the high-side wiring line 211.

In that way, the processing shown in FIG. 27 enables a judgement to be made as to whether a short-to-ground fault has occurred in the high-side wiring line 211, with the judgement being made in accordance with the judgement results obtained with respect to three parameters, consisting of the high-side voltage, the sense voltage, and the low-side voltage. This enables the processing of a program executed for fault detection to be simplified, for example, since it is not necessary for the detection to be based on the judgement results obtained for each of the high-side voltage, sense voltage, low-side voltage, high-side current, low-side current and current deviation parameters.

Figure 28:
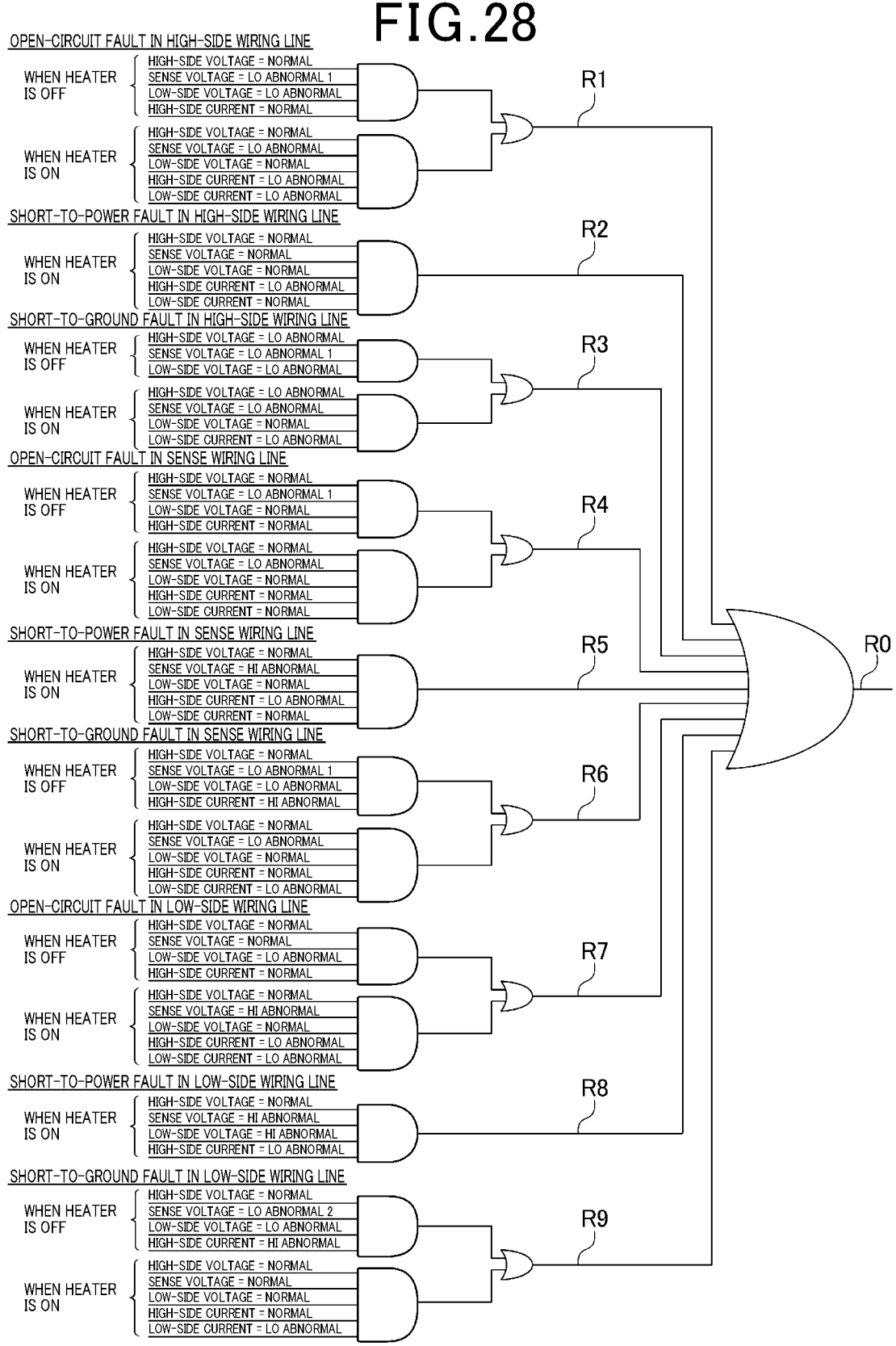
FIG. 28 is a diagram showing a method of identifying the mode and location of a fault, in the form of a logic circuit diagram.

A method of judging whether a short-to-power fault has occurred in the high-side wiring line 211 has been described here, however it would be equally possible for other types of fault to be determined, based on the judgement results obtained for certain parameters. The types and number of parameters used in the judgement can be set appropriately in accordance with the type of fault that is to be determined. FIG. 28 illustrates an example of a method for determining respective faults, shown as a logic circuit diagram.

For example the uppermost portion of the diagram, designated as "OPEN-CIRCUIT FAULT IN HIGH-SIDE WIRING LINE", shows that when the energization to the heater 40 is off, it is determined that an open-circuit fault has occurred in the high-side wiring line 211 if the high-side voltage has a normal value, the sense voltage has become LO abnormal 1, the low-side voltage has become LO abnormal, and the high-side current has a normal value. In addition, when the energization to the heater 40 is on, it is determined that an open-circuit fault has occurred in the high-side wiring line 211 if the high-side voltage has a normal value, the sense voltage has become LO abnormal, the low-side voltage has a normal value, the high-side current has become LO abnormal, and the low-side current has become LO abnormal. In that way, a determination can be made as to whether an open-circuit fault has occurred in the high-side wiring line 211, in accordance with the combination of respective judgement results obtained for four or five parameters. The portion expressing the outputted determination result is labeled as "R1".

Similarly, the portion expressing the result of determining whether a short-to-power fault has occurred in the high-side wiring line 211 is labeled as "R2", and the portion expressing the result of determining whether a short-to-ground fault has occurred in the high-side wiring line 211 is labeled as "R3", In addition, the portion expressing the result of determining whether an open-circuit fault has occurred in the sense wiring line 221 is labeled as "R4", the portion expressing the result of determining whether a short-to-power fault has occurred in the sense wiring line 221 is labeled as "R5, and the portion expressing the result of determining whether a short-to-ground fault has occurred in the sense wiring line 221 is labeled as "R6".

Furthermore, the portion expressing the result of determining whether an open-circuit fault has occurred in the low-side wiring line 231 is labeled as "R7", the portion expressing the result of determining whether a short-to-power fault has occurred in the low-side wiring line 231 is labeled as "R8", and the portion expressing the result of determining whether a short-to-ground fault has occurred in the low-side wiring line 231 is labeled as "R9". By means of R1 to R9 it is possible to identify which one of an open-circuit fault of the high-side wiring line 211, a short-to-power fault of the high-side wiring line 211, a short-to-ground fault of the high-side wiring line 211, an open-circuit fault of the sense wiring line 221, a short-to-power fault of the sense wiring line 221 a short-to-ground fault of the sense wiring line 221, an open-circuit fault of the low-side wiring line 231, a short-to-power fault of the low-side wiring line 231, and a short-to-ground fault of the low-side wiring line 231 has occurred. In FIG. 28, the label "R0" is attached to a portion expressing an outputted determination result that indicates whether the entire control apparatus 10 is normal. If a determination result indicating occurrence of a fault is outputted as any of R1 to R9, then a determination result indicating a fault is outputted as R0.

The method of selecting the parameters used for fault detection is not limited to the examples shown in FIGS. 27 and 28. The processing sequence shown in FIG. 29 is another example of processing performed for determining whether a short-to-ground fault has occurred in the high-side wiring line 211, when energization to the heater 40 is off. This processing can be executed in place of the processing sequence shown in FIG. 27.

In the first step SL171 of the processing, a decision is made as to whether the high-side voltage is LO abnormal. If the high-side voltage is LO abnormal, operation proceeds to step S172. In step S172, it is determined that a short-to-ground fault has occurred in the high-side wiring line 211.

If it is determined in step S171 that the high-side voltage is not LO abnormal, operation proceeds to step S174. In step S173, it is determined that no short-to-ground fault has occurred in the high-side wiring line 211.

As described above, with the processing shown in FIG. 29, a determination as to whether a short-to-ground fault has occurred in the high-side wiring line 211 can be made in accordance with the judgement results obtained for only a single parameter, consisting of the high-side voltage. By reducing the number of parameters used for the determination, the processing of the program for detecting a fault can be further simplified.

An example of a method for determining whether a short-to-power fault has occurred in the high-side wiring line 211 has been described here, however other types of fault can also be determined by methods that are different from that shown in FIG. 28. FIG. 30 shows another example of a method of determining respective faults, expressed as a logic circuit diagram. Since the notation method is the same as that of FIG. 28, detailed description is omitted.

The judgement methods shown in FIGS. 28 and 30 are examples of methods in which fault detection is performed without using the results of judgement of the current deviation. However, it goes without saying that it is equally possible to perform fault detection by also using the results of judgement of the current deviation. The advantages of using the results of judgement of the current deviation, when executing fault detection, are the same as those described for the first embodiment.

As described above, even when the control apparatus 10 is configured as a low-side drive type of control apparatus, fault detection can be performed by the same method as with the first embodiment, and the same effects as those described for the first embodiment can be obtained.

With the present embodiment also, the threshold values can be changed in the same way as has been described referring to FIG. 19. Furthermore, as has been described referring to FIG. 20, the high-side switch 27 or the low-side switch 28 can be switched off when a fault occurs.

The embodiment has been described above referring to specific examples. However, the present disclosure is not limited to these specific examples. Forms of these examples that have had appropriate design modifications added thereto by persons skilled in the art are also contained within the scope of the present disclosure, if they incorporate features of the present disclosure. The elements included in each of the specific examples described above, and their arrangement, conditions, shape, etc., are not limited to those illustrated, and may be changed as appropriate. The elements included in each of the specific examples described above may be appropriately combined, so long as no technical contradiction occurs.

The control apparatus and control method described in the present disclosure include one or more dedicated units which may be realized by using one or more dedicated computers, configured by processors and a memory, and programmed to execute one or more functions that are embodied by a computer program. It would be equally possible for the control apparatus and control method described in the present disclosure to be realized by a dedicated computer configured with a processor incorporating one or more dedicated hardware logic circuits. It would be equally possible for the control apparatus and control method described in the present disclosure to be realized by one or a plurality of dedicated computers configured with a combination of a processor and a memory programmed to perform one or more functions and a processor including one or more hardware logic circuits. The computer program may be stored in a computer-readable non-transitional tangible recording medium, as instructions to be executed by the computer. The dedicated hardware logic circuits and the hardware logic circuits may be realized by digital circuits that include a plurality of logic circuits, or by analog circuits.

What is claimed is:

1. A control apparatus for a heater, comprising:
   a high-side wiring line which is a wiring line connected between the heater and a power supply,
   a low-side wiring line which is a wiring line connected between the heater and a grounded portion,
   a sense wiring line which is a wiring line connected to a heat generating part of the heater,
   a high-side voltage acquirer for acquiring a high-side voltage that is the voltage of the high-side wiring line,
   a low-side voltage acquirer for acquiring a low-side voltage that is the voltage of the low-side wiring line,
   a sense voltage acquirer for acquiring a sense voltage that is the voltage of the sense wiring line,
   a high-side current acquirer for acquiring a high-side current that is a current which flows from the power supply to the high-side wiring line,
   a low-side current acquirer for acquiring a low-side current that is a current which flows from the low-side wiring line to the grounded portion, and
   a fault detector for detecting a fault in any one of the wiring lines that are connected to the heater;
   wherein the fault detector is configured to identify a mode of a fault that has occurred, and a location at which the fault has occurred, based on the high-side voltage, the low-side voltage, the sense voltage, the high-side current and the low-side current.

2. The control apparatus according to claim 1, wherein the fault detector is configured such that:
   for each of respective parameters consisting of the high-side voltage, the low-side voltage, the sense voltage, the high-side current, and the low-side current, the fault detector determines whether the parameter has a normal value or an abnormal value, based on comparing the parameters with threshold values that have been individually set; and,
   the fault detector identifies a mode of a fault that has occurred, and a location where the fault has occurred, with the identification depending on the combination of the judgement results as to a normal value or an abnormal value that have been obtained for the respective parameters.

3. The control apparatus according to claim 2, wherein the fault detector alters the threshold values that are set for the respective parameters, with the alteration depending on the voltage of the power supply.

4. The control apparatus according to claim 1, wherein the modes of fault in a wiring line that are identified by the fault detector include:
   a short-to-power fault which is a condition whereby the wiring line concerned is short-circuited to the potential of the power supply,
   a short-to-power fault which is a condition whereby the wiring line concerned is short-circuited to the potential of the grounded portion, and
   an open-circuit fault which is a condition whereby the wiring line concerned has broken.

5. The control apparatus according to claim 1, further comprising a switch for executing opening/closing change-over of a path for supplying power to the heater, and
   wherein the fault detector is configured to identify the mode of a fault that has occurred and the location at which the fault has occurred based on the high-side voltage, the low-side voltage, the sense voltage, the high-side current and the low-side current, while the switch is left unchanged in either an open state or in a closed state.

6. The control apparatus according to claim 1, further comprising an interrupter for executing processing to interrupt the supplying of electric power to the heater when a fault is detected by the fault detector.

7. The control apparatus according to claim 6, wherein a high-side switch is provided between the power supply and the high-side wiring line, and
   when it is detected by the fault detector that a short-to-ground fault has occurred whereby any one of the wiring lines respectively connected to the heater is in a condition of being short-circuited to the potential of the grounded portion, the interrupter changes the high-side switch to the open state.

8. The control apparatus according to claim 6, wherein a low-side switch is provided between the low-side wiring line and the grounded portion, and when it is detected by the fault detector that a short-to-power fault has occurred whereby any one of the wiring lines respectively connected to the heater is in a condition of being short-circuited to the potential of the power supply, the interrupter changes the low-side switch to the open state.

* * * * *